United States Patent
Kato et al.

(10) Patent No.: US 8,284,463 B2
(45) Date of Patent: Oct. 9, 2012

(54) IMAGE READING APPARATUS

(75) Inventors: Tetsuya Kato, Nagoya (JP); Noriko Misumi, Nagoya (JP); Hiroaki Fujii, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 529 days.

(21) Appl. No.: 12/341,963

(22) Filed: Dec. 22, 2008

(65) Prior Publication Data

US 2009/0180155 A1    Jul. 16, 2009

(30) Foreign Application Priority Data

Dec. 28, 2007    (JP) ................................ 2007-340769
Dec. 28, 2007    (JP) ................................ 2007-340770
Dec. 28, 2007    (JP) ................................ 2007-340771

(51) Int. Cl.
*H04N 1/04* (2006.01)
*G03B 27/32* (2006.01)
*G06K 9/64* (2006.01)

(52) U.S. Cl. ............................ 358/488; 355/25; 382/290

(58) Field of Classification Search .................. 358/448, 358/488, 462, 1.15, 452, 474; 382/274, 199, 382/164, 266; 355/25
See application file for complete search history.

(56) References Cited

U.S. PATENT DOCUMENTS

| | | | |
|---|---|---|---|
| 4,875,104 A | 10/1989 | Kamon | |
| 5,491,759 A | 2/1996 | Nagao et al. | |
| 5,969,795 A * | 10/1999 | Honda | 355/25 |
| 6,433,896 B1 | 8/2002 | Ueda et al. | |
| 6,466,340 B1 * | 10/2002 | Washio | 358/488 |
| 7,072,527 B1 * | 7/2006 | Nako | 382/290 |
| 7,119,926 B2 | 10/2006 | Takeda et al. | |
| 2004/0170324 A1 | 9/2004 | Eguchi et al. | |
| 2005/0226510 A1 | 10/2005 | Eguchi et al. | |
| 2007/0065037 A1 | 3/2007 | Honda et al. | |
| 2009/0185240 A1 | 7/2009 | Kato et al. | |

FOREIGN PATENT DOCUMENTS

JP        S63-280569 A        11/1988
(Continued)

OTHER PUBLICATIONS

Japan Patent Office, Notification of Reasons for Refusal for Japanese Patent Application No. 2007-340770, dispatched Aug. 16, 2011.

(Continued)

*Primary Examiner* — Charlotte M Baker
*Assistant Examiner* — Rury Grisham
(74) *Attorney, Agent, or Firm* — Baker Botts L.L.P.

(57) ABSTRACT

An image reading apparatus includes a document table that is transparent, a read unit that reads a document placed on the document table through the document table so as to generate image data representing a read image of the document, an extraction unit that converts the image data of the read result of the read unit into edge image data representing an edge image and extracts edge points satisfying a predetermined condition as edge points corresponding to a side of the document placed on the document table from the edge image data, an outer margin recognition unit that approximates the edge points corresponding to each side of the document extracted by the extraction unit to a line so as to recognize an outer margin of the document, and a likelihood evaluation unit that evaluates the likelihood of the outer margin recognized by the outer margin recognition unit.

15 Claims, 28 Drawing Sheets

FOREIGN PATENT DOCUMENTS

| | | |
|---|---|---|
| JP | H05-145710 A | 6/1993 |
| JP | H05-330668 A | 12/1993 |
| JP | H06-027547 A | 2/1994 |
| JP | H06-162190 A | 6/1994 |
| JP | H07-245680 A | 9/1995 |
| JP | H07-245681 A | 9/1995 |
| JP | H08-256263 A | 10/1996 |
| JP | H08-256264 A | 10/1996 |
| JP | H10-341332 A | 12/1998 |
| JP | H11-122433 A | 4/1999 |
| JP | H11-177774 A | 7/1999 |
| JP | H11-187207 A | 7/1999 |
| JP | H11-252351 A | 9/1999 |
| JP | H11-331547 A | 11/1999 |
| JP | 2000-078355 A | 3/2000 |
| JP | 2001-036696 A | 2/2001 |
| JP | 2001-268367 A | 9/2001 |
| JP | 2001-309114 A | 11/2001 |
| JP | 2002-142084 A | 5/2002 |
| JP | 2002-185721 A | 6/2002 |
| JP | 2003-283766 A | 10/2003 |
| JP | 2003-348305 A | 12/2003 |
| JP | 2004-201240 A | 7/2004 |
| JP | 2004-282517 A | 10/2004 |
| JP | 2005-285010 A | 10/2005 |
| JP | 2006-071926 A | 3/2006 |
| JP | 2006-087027 A | 3/2006 |
| JP | 2007-082047 A | 3/2007 |
| JP | 2007-088654 A | 4/2007 |
| JP | 2007-143036 A | 6/2007 |

OTHER PUBLICATIONS

Japan Patent Office, Notification of Reasons for Refusal for Japanese Patent Application No. 2007-340769, dispatched Aug. 16, 2011.
Japan Patent Office, Notification of Reason for Refusal for Japanese Patent Application No. 2007-340771, dispatched Aug. 23, 2011.
Japan Patent Office, Notification of Reason for Refusal for Japanese Patent Application No. 2007-340774, dispatched Aug. 23, 2011.
Japan Patent Office, Notification of Reason for Refusal for Japanese Patent Application No. 2007-340776, dispatched Jul. 26, 2011.
Japan Patent Office, Notification of Reason for Refusal for Japanese Patent Application No. 2007-340771, dispatched Feb. 28, 2012.

* cited by examiner

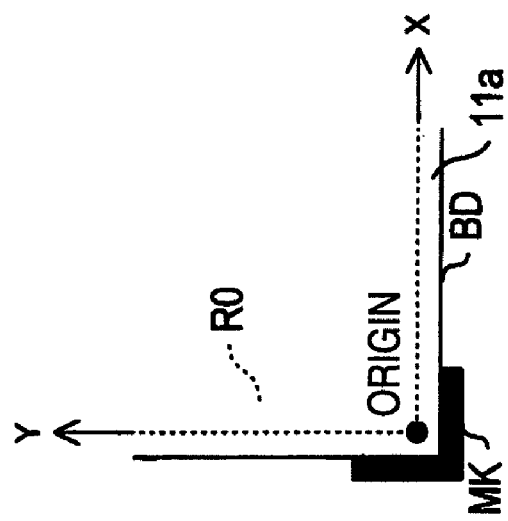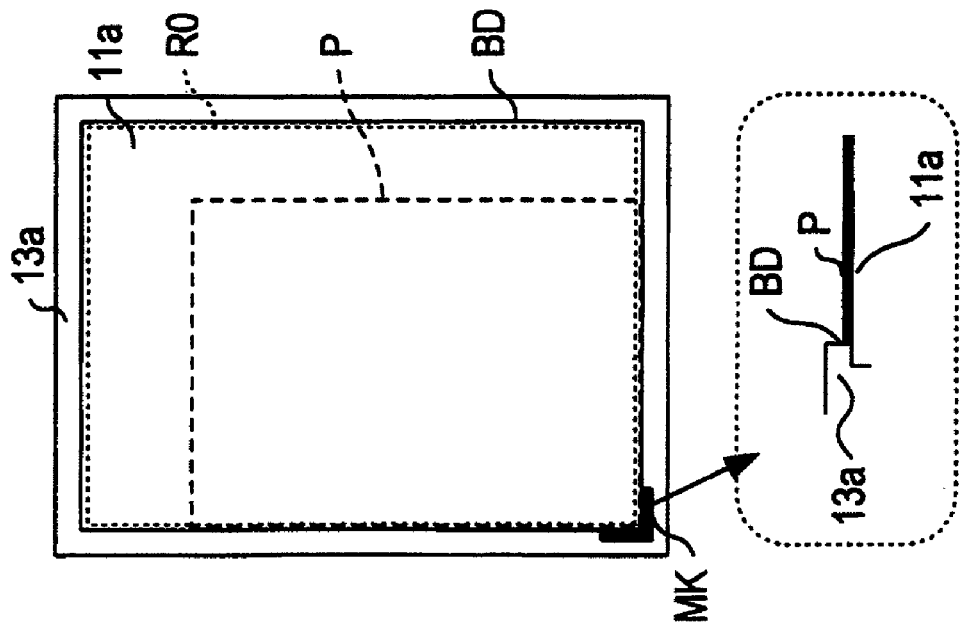

IMAGE READING APPARATUS

CROSS-REFERENCE TO RELATED APPLICATIONS

This application claims priority from, Japanese Patent Application No. 2007-340769 filed on Dec. 28, 2007, Japanese Patent Application No. 2007-340770 filed on Dec. 28, 2007, and Japanese Patent Application No. 2007-340771 filed on Dec. 28, 2007, which are incorporated herein by reference.

TECHNICAL FIELD

Apparatuses consistence with the invention relate to an image reading apparatus for conveying a read unit and reading an image of a document reflected on a document table through the read unit to generate image data representing a read image of the document placed on the document table.

Further, apparatuses consistence with the invention relate to an image reading apparatus for reading an image of a document reflected on a document table through a read unit to generate image data representing a read image of the document placed on the document table.

BACKGROUND

There has been proposed an image reading apparatus including a read unit below read glass for executing read operation through the read unit while conveying the read unit below the read glass so as to read a document placed on the read glass and generate image data representing a read image of the document.

If the image reading apparatus has a copy function, the generated image data is supplied to print processing, for example. That is, the image data representing the read image is supplied to print processing, whereby a copy image of the read document is printed on a record sheet of paper. As for such an image reading apparatus having the copy function, there has been proposed a digital multi-function device having a printer function, a fax function, etc., as well as the copy function.

Further, there has also been proposed an image reading apparatus for keeping track of an area where a document is placed on read glass by prescanning and then at the scanning time, limiting the read area to the area where the document is placed rather than the whole area below the read glass and conveying a read unit in the read area for reading the document.

In addition, there has been proposed an image reading apparatus for detecting the size of a document tabled on the read result of the document through a read unit. For example, an image reading apparatus for detecting an edge of a document from the read result and detecting the document size from the detection result has been proposed (refer to JP-A-2004-201240, JP-A-2005-285010, JP-A-7-245681, and JP-A-2001-036696).

The detection result of the document size obtained in such a manner is used, for example, for the automatic setting operation of a read area at the scanning time and the automatic setting operation of a scaling factor at the copy time. For example, the scaling factor is set conforming to the ratio between the document size and the record sheet size from the detected document size and the record sheet size, the read image is scaled up or down conforming to the setup scaling factor, and a copy image of the document is printed on the record sheet at the scaling factor suited to the sheet size.

In addition, there has been proposed an image reading apparatus for detecting the size and the inclination of a document tabled on the read result of the document through a read unit (refer to JP-A-11-252351, JP-A-2007-082047, and JP-A-2007-088654). An image reading apparatus using the detection result of the size and the inclination of a document for the automatic setting operation of a read area at the scanning time and the automatic setting operation of a scaling factor and the inclination correction operation at the copying time has also been proposed.

For example, the scaling factor is set conforming to the ratio between the document size and the record sheet size from the detected document size and the record sheet size, the rotation amount is set from the inclination of the document, the image data as the read result is rotated for correcting the inclination and is scaled up or down conforming to the setup scaling factor, and the image of the read document is printed on the record sheet at the scaling factor matched with the record sheet size.

SUMMARY

One aspect of the invention provides an image reading apparatus capable of suppressing adversely affecting the subsequent processing (copy operation, etc.,) using the detection result because of erroneous detection of a document edge.

Another aspect of the invention provides a technique capable of estimating the document size, inclination, placement area, etc., efficiently and precisely in an image reading apparatus for conveying a read unit and reading a document placed on a document table through the read unit.

BRIEF DESCRIPTION OF THE DRAWINGS

FIGS. 2A and 2B are schematic representations to show a readable area of read glass;

DETAILED DESCRIPTION

General Overview

Figure 1A:
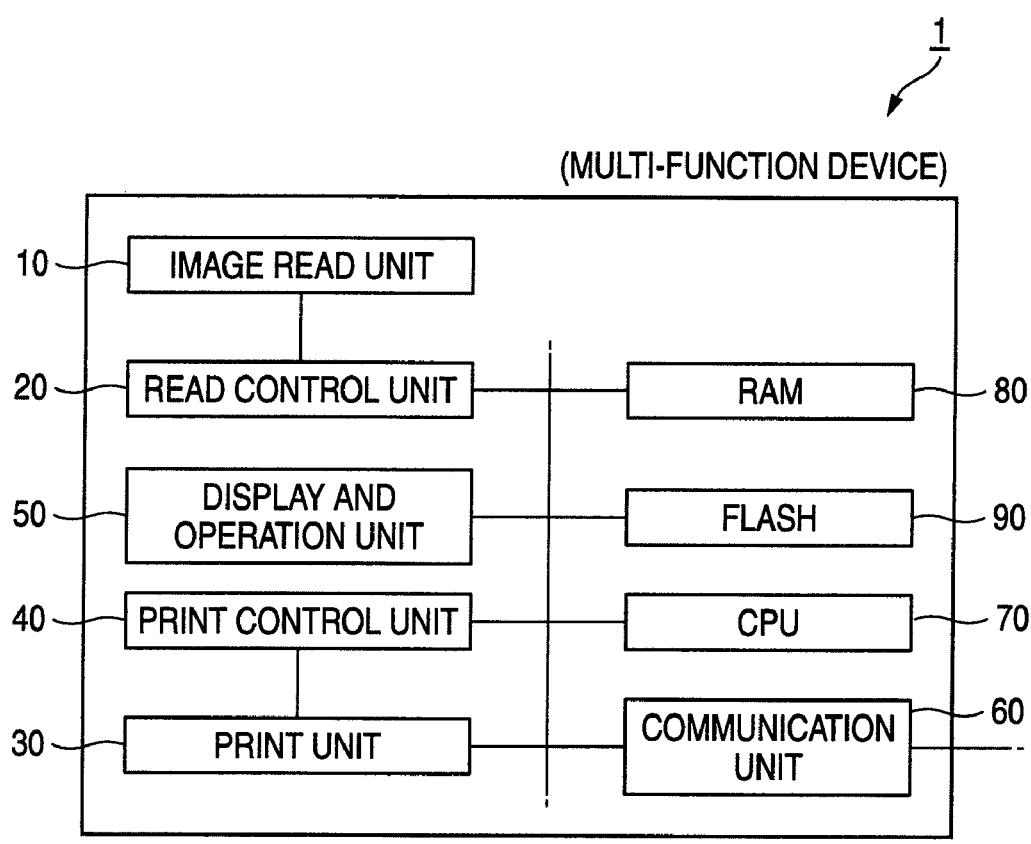
FIGS. 1A to 1C are block diagrams of a multi-function device.

The related art described above has some disadvantageous. For example, the method of detecting the document size based on the read result of the document through the read unit involves a problem in that there is a possibility that it may be erroneously detected that a ruled line, etc., in a document is a document edge.

As for a document edge detection method, there has been proposed a method of passing image data read through a read unit through an image filter (differential filter), converting the read image data into edge image data representing an edge image, and detecting a document edge of an outer margin of the document from the edge image data. However, if the read image data is passed through an image filter, a continuous pattern of edge points is detected in the outer margin of the document. In addition, a continuous pattern of edge points similar to the outer margin of the document is also detected in a point where a ruled line exists in the document.

In contrast, all of the document to be read does not necessarily fall within a readable area of a document table. For example, an end of a document is placed out of a readable area because the user places the document roughly, the document to be read, such as newspaper, is too large and an end of a document does not fall within a readable area, or the like.

Therefore, although an end of a document is not read, if an attempt is made to detect a document edge from the edge image data of the read result and detect the document size, the document size is erroneously detected. If such erroneous detection of the document size occurs, for example, a scaling factor setting mistake occurs and a situation in which the copy function does not well work occurs.

Further, in the technique of reading the whole document and finding the size, the inclination, the placement area, etc., of the document from the whole image, how a j document of what size is placed is unknown before the read operation. Thus, the read unit must be conveyed over the readable area below the read glass for executing the read operation and time is required for the read operation of the document. That is, fruitless read operation must be executed for an area where the document does not exist.

JP-A-2007-082047 discloses a technique of estimating the document size based on the read result of a partial area of a document. However, the technique of conveying a document to be read, determining the document range and the document range outside from change in read data before and after the passage of the document, and estimating the document size is premised on conveying of the document. Thus, if the technique is diverted for an image reading apparatus for conveying a read unit and reading an image of a document with the document standing still on read glass, it may be difficult to solve the problem described above.

That is, to divert the technique for the image reading apparatus for conveying the read unit and reading an image of a document with the document standing still on the read glass, an image with no document placed on the read glass needs to be read and fruitless read operation may be required to be executed for the area where no document exists.

One aspect of the invention provides an image reading apparatus capable of suppressing adversely affecting the subsequent processing (copy operation, etc.,) using the detection result because of erroneous detection of a document edge.

Another aspect of the invention provides a technique capable of estimating the document size, inclination, placement area, etc., efficiently and precisely in an image reading apparatus for conveying a read unit and reading a document placed on a document table through the read unit.

According to a first aspect of the invention, there is provided an image reading apparatus comprising: a document table that is transparent; a read unit that reads a document placed on the document table through the document table so as to generate image data representing the read image of the document; an extraction unit that converts the image data of the read result of the read unit into edge image data representing an edge image and extracts edge points satisfying a predetermined condition as edge points corresponding to a side of the document placed on the document table from the edge image data; an outer margin recognition unit that approximates tire edge points corresponding to each side of the document extracted by the extraction unit to a line so as to recognize an outer margin of the document; and a likelihood evaluation unit that evaluates the likelihood of the outer margin recognized by the outer margin recognition unit.

Incidentally, according to a second aspect of the invention, the likelihood evaluation unit evaluates the likelihood of the outer margin recognized by the outer margin recognition unit based on a distribution of the edge points in a margin side area of the document table from the outer margin of the document recognized by the outer margin recognition unit.

The extraction unit converts the image data of the read result of the read unit into edge image data representing an edge image and extracts edge points satisfying a predetermined condition as edge points corresponding to a side of the document placed on the document table from the edge image data.

In contrast, the outer margin recognition unit approximates the edge points corresponding to each side of the document extracted by the extraction unit to a line, thereby recognizing an outer margin of the document, and the likelihood evaluation unit evaluates the likelihood of the outer margin recognized by the outer margin recognition unit as high, or low based on a distribution of the edge points in a margin side area of the document table from the outer margin of the document recognized by the outer margin recognition unit.

As the configuration of the image reading apparatus, it is possible to estimate the document size, the document inclination, and the placement area of the document on the document table based on information of the outer margin of the document recognized by the outer margin recognition unit and execute scanning based on the information of the estimation result, it is possible to extract and output data of the document from the read result, or the like. In the described image reading apparatus, if the subsequent processing is executed although the outer margin recognition unit erroneously recognizes the outer margin of the document, an error also occurs in the subsequent processing. Thus, the processing result desired by the user may not be provided.

Therefore, if it is estimated that the outer margin recognition unit makes erroneous recognition, preferably the subsequent processing is switched or the user is informed that there is a possibility of erroneous recognition. However, since a technique of determining erroneous recognition is not available, the subsequent processing is adversely affected.

Then, in the invention, the likelihood evaluation unit is provided for evaluating the likelihood of the outer margin recognized by the outer margin recognition unit as high or low based on the distribution of the edge points in the margin side area of the document table from the outer margin of the document recognized by the outer margin recognition unit.

In the outside area of the document placed on the document table, usually there is nothing except dust, etc., and if the outer margin of the document is precisely recognized, no edge points should exist outside the recognized outer margin. Therefore, if likelihood evaluation is made as in the invention, whether or not the outer margin recognized by the outer-margin recognition unit is precise can be evaluated with high accuracy.

Thus, according to the invention, the image reading apparatus that can switch the subsequent processing in response to the likelihood of the recognition result, can suppress the adverse effect of erroneous recognition on the subsequent processing, and is hard to receive complaint caused by the erroneous recognition can be provided for the user.

According to a third aspect of the invention, in the image reading apparatus, the likelihood evaluation unit calculates the amount of the edge points distributed in the margin side area of the document table from the outer margin of the document recognized by the outer margin recognition unit, if the calculated amount of the edge points exceeds a threshold value, the likelihood evaluation unit evaluates the likelihood of the outer margin recognized by the outer margin recognition unit as low, and if the calculated amount of the edge points is equal to or less than the threshold value, the likelihood evaluation unit evaluates the likelihood of the outer margin as high.

The described image reading apparatus can be configured as follows:

That is, according to a fourth aspect of the invention, the image reading apparatus further comprises: a prescanning unit, which conveys the read unit in a partial area of a readable area of the document table that can be read through the read unit, and which controls the read unit to execute read operation in the partial area, wherein the extraction unit is configured to: convert the image data of the read result of the read unit into edge image data representing an edge image; and extract edge points satisfying a predetermined condition as edge points corresponding to a side of the document placed on the document table from the edge image data.

As the configuration of the image reading apparatus, it is possible to read only a partial area of a document and estimate the document size, etc., from the read result. However, to recognize the outer margin of a document tabled on image data on which the whole image of the document is not reflected, this technique is inferior in accuracy to a technique of reading the whole document and recognizing the outer margin of the document from the read result.

Therefore, if the concept of the invention is applied to such an image reading apparatus, a problem caused by erroneous recognition can be lessened by switching processing, etc., and a highly convenient image reading apparatus can be provided for the user.

If the outer margin of a document is recognized by prescanning a partial area, the document size, etc., can be estimated more efficiently than a technique of prescanning the whole readable area and recognizing the outer margin of the document. Thus, if the invention is applied to such an image reading apparatus, an image reading apparatus operating at high processing speed and less adversely affected by malfunction can be provided for the user.

In addition, to configure an image reading apparatus so as to recognize the outer margin of a document by prescanning a partial area, specifically the image reading apparatus may be configured as follows:

That is, according to a fifth aspect of the invention, in the image reading apparatus, the document table has a substantially quadrangular shape, and one specific corner of four corners defined as a position with which a corner of the document is to be matched, and the prescanning unit assumes that an area from an end margin of the document table forming one side of the document table extending from the specific corner on the document table to a position at a predetermined distance from the end margin of the document table to the inside of the document table, the area corresponding to the readable area, is the partial area.

If the image reading apparatus is thus configured, an image of the document placed on the document table is easily reflected on the image data of the prescanning result and it becomes easy to keep track of the outer margin of the document from the image data.

According to a sixth aspect of the invention, the image reading apparatus further comprises: a document size estimation unit that estimates the size of the document placed on the document table, wherein, if the likelihood evaluation unit evaluates the likelihood as high, the document size estimation unit estimates the size of the document placed on the document table from the outer margin of the document recognized by the outer margin recognition unit, and wherein, if the likelihood evaluation unit evaluates the likelihood as low, the document size estimation unit estimates that the size of the document placed on the document table is a predetermined size.

If the image reading apparatus is configured so as to thus switch the document size estimation technique according to whether the likelihood evaluated by the likelihood evaluation unit is high or low, the adverse effect of erroneous recognition of the outer margin recognition unit on the subsequent processing can be suppressed.

For example, although the likelihood of the recognition result of the outer margin recognition unit is low, if the document size is estimated based on the recognition result, how the document size estimation unit estimates the document size for the true document size cannot be predicted and the effect of the estimation result on the subsequent processing cannot be controlled. However, when the likelihood of the recognition result of the outer margin recognition unit is low, if the document size is estimated to be a specific document size without estimating the document size based on the recognition result, the effect of the estimation result on the subsequent processing can be controlled regardless of whether or not the estimation result matches the true document size.

Therefore, according to the invention, the effect of erroneous recognition of the outer margin recognition unit on the subsequent processing can be suppressed independently of whether or not the estimation result of the document size is correct. Specifically, when the likelihood of the recognition result of the outer margin of the document provided by scanning is low, if the size of the document placed on the document table is estimated to be tire maximum size, the read area at the scanning time can be prevented from becoming narrower than the correct read area because of erroneous recognition of the outer margin recognition unit in an image reading apparatus for automatically setting a read area, Consequently, at the scanning time, the whole image of the document desired by the user can be read correctly.

If the image reading apparatus is configured so as to switch the document size estimated by the document size estimation unit in accordance with a user command when the likelihood evaluation unit evaluates the likelihood as low, the user can be allowed to specify the document size least adversely affected by erroneous recognition and the adverse effect of erroneous recognition of the outer margin recognition unit on the subsequent processing can be suppressed effectively.

In addition, to recognize the outer margin of a document by prescanning a partial area, the image reading apparatus may be configured as follows for estimating the document size:

That is, according to a seventh aspect of the invention, in the image reading apparatus, the extraction unit extracts the edge points corresponding to each of three sides of the document placed on the document table as the side of the document placed on the document table, the outer margin recognition unit recognizes that two intersection points of three lines to which the edge points corresponding to the sides extracted by the extraction unit are approximated are corners of the document placed on the document table, the image reading apparatus further comprises: a document size estimation unit that estimates the size of the document placed on the document table, if the likelihood evaluation unit evaluates the likelihood as high, the document size estimation unit estimates the size of the document placed on the document table based on the distance between the two intersection points recognized as the corners of the document by the outer margin recognition unit on the assumption that the document placed on the document table is a blank form, and if the likelihood evaluation unit evaluates the likelihood as low, the document size estimation unit estimates that the size of the document placed on the document table is a predetermined size.

If the image reading apparatus is thus configured, both the height and the width of the document can be derived as the document size even from tire prescanning result of the partial area, and the outer shape of the whole document placed on the placement base can be grasped precisely for the most part from the prescanning result of the partial area.

In the image reading apparatus with a specific corner of a document table defined as a position with which a corner of a document is to be matched and including the above-described prescanning unit, specifically the extraction unit and the likelihood evaluation unit may be configured as follows:

That is, according to an eighth aspect of the invention, in the image reading apparatus, the extraction unit extracts the edge points corresponding to the side of the document placed on the document table opposed to the side of the document table extending from the specific corner on the document table, and the likelihood evaluation unit calculates the occupation amount of the edge points in the area of the edge image data corresponding to the area surrounded by an approximate line of the edge points corresponding to the side of tire document placed on the document table opposed to the side of the document table extending from the specific corner on the document table and the outer margin of the document table as the amount of the edge points distributed in the margin side area of the document table from the outer margin of the document recognized by the outer margin recognition unit, if the calculated amount of the edge points exceeds a threshold value, the likelihood evaluation unit evaluates the likelihood of the outer margin recognized by the outer margin recognition unit as low, and if the calculated amount of the edge points is equal to or less than the threshold value, the likelihood evaluation unit evaluates the likelihood of the outer margin as high.

In the image reading apparatus defined so that a document is matched with a specific corner, the position of the document placed by the user is determined generally on the document table and thus the document image can be captured for estimating the document size, etc., in the prescanning operation of the partial area described above. In this case, however, the side of the document extending from the corner of the document matched with the specific corner becomes hard to read by prescanning.

That is, the side of the document extending from the corner of the document matched with the specific corner becomes easy to protrude from the readable area of the document table and cannot be read by prescanning. Consequently, the possibility that edge points of any other part than the sides of the document, such as a ruled line drawn in the document, may be extracted as the edge points corresponding to the side of the document from the edge image data becomes high.

Therefore, if such an image reading apparatus is provided with the likelihood evaluation unit described above, whether or not the edge points corresponding to "the side of tire document placed on the document table" opposed to "the side of the document table extending from the specific corner on the document table" are correctly extracted can be evaluated. Consequently, the likelihood of the recognition result of the outer margin recognition unit can be evaluated correctly and the adverse effect of erroneous recognition on the subsequent processing can be suppressed as much as possible.

According to a ninth aspect of the invention, the image reading apparatus further comprises: a read area determination unit that determines the read area of the read unit based on information of the document size estimated by the document size estimation unit; and a scanning unit, which conveys the read unit in the read area determined by the read area determination unit, and which controls the read unit to execute read operation so as to generate image data representing a read image of the document placed on the document table.

In the image reading apparatus for thus executing the scanning, there is a possibility that erroneous recognition of the outer margin recognition unit may adversely affect setting of the read area finally. In the invention, however, if the likelihood of the recognition result of the outer margin recognition unit is low, the document size is estimated to be a fixed size, so that the adverse effect of the erroneous recognition of the outer margin recognition unit on the setting of the read area can be suppressed more than was previously possible.

According to a tenth aspect of the invention, in the image reading apparatus according to the first aspect, a specific part of the end margin of the document table is defined as a reference line with which a side of the document is to be matched, and the likelihood evaluation unit evaluates the likelihood of the outer margin recognized by the outer margin recognition unit based on the position relationship between the outer margin of the document recognized by the outer margin recognition unit and the reference line.

The extraction unit converts the image data of the read result of the read unit into edge image data representing an edge image and extracting edge points satisfying a predetermined condition as edge points corresponding to a side of the document placed on the document table from the edge image data.

In contrast, the outer margin recognition unit for approximating the edge points corresponding to each side of the document extracted by the extraction unit to a line, thereby recognizing an outer margin of the document, and the likelihood evaluation unit evaluates the likelihood of the outer margin recognized by the outer margin recognition unit as high or low.

Specifically, in the image reading apparatus of the invention, a specific part of the end margin of the document table is defined as a reference line with which a side of the document is to be matched, and the likelihood evaluation unit evaluates the likelihood of the outer margin recognized by the outer margin recognition unit as high or low based on the position relationship between the outer margin of the document recognized by the outer margin recognition unit and the reference line.

As the configuration of the image reading apparatus, it is possible to estimate the document size, the document inclination, and the placement area of the document on the document table based on information of the outer margin of the document recognized by the outer margin recognition unit and execute scanning based on the information of the estimation result, it is possible to extract and output data of the document from the read result, or the like. In tire described image reading apparatus, if the subsequent processing is executed although the outer margin recognition unit erroneously recognizes the outer margin of the document, an error also occurs in the subsequent processing and the processing result desired by the user cannot be provided.

Therefore, if it is estimated that the outer margin recognition unit makes erroneous recognition, preferably the subsequent processing is switched or the user is informed that there is a possibility of erroneous recognition. However, since a technique of determining erroneous recognition is not available, the subsequent processing is adversely affected.

Then, in the invention, the likelihood evaluation unit is provided for evaluating the likelihood of the outer margin recognized by the outer margin recognition unit as high or low based on the position relationship between the outer margin of the document recognized by the outer margin recognition unit and the reference line.

If the reference line with which a side of the document is to be matched is determined and the user is instructed to match a side of the document with the end margin of the document table (reference line), the side of the document matched with the end margin of the document table protrudes from the readable area of the document table and becomes hard to read. When the edge points corresponding to the side of the document are extracted according to the edge image data, there is a possibility that the edge points corresponding to a ruled line drawn in the document may be extracted as the edge points corresponding to the side of the document by mistake. In this case, the outer margin recognition unit recognizes the outer margin of the document erroneously, of course.

In such a case, however, generally the erroneously recognized outer margin of the document appears at a large distance from the reference line. For this reason, the likelihood of the outer margin recognized by the outer margin recognition unit is evaluated as high or low according to the technique described above.

If the likelihood of the outer margin recognized by the outer margin recognition unit is evaluated as high or low according to the technique, the likelihood of the outer margin can be evaluated precisely and if the outer margin recognition unit erroneously recognizes the outer margin, the subsequent processing can be switched. Therefore, according to the invention, the image reading apparatus that can suppress the adverse effect of erroneous recognition on the subsequent processing and is hard to receive complaint caused by the erroneous recognition can be provided for the user.

According to an eleventh aspect of the invention, in the image reading apparatus, the outer margin recognition unit recognizes the outer margin of the document that is opposed to the reference line, if the outer margin of the document recognized by the outer margin recognition unit is at a predetermined distance or longer from the reference line, the likelihood evaluation unit evaluates the likelihood as low, and if the outer margin of the document recognized by the outer margin recognition unit is not at the predetermined distance or longer from the reference line, the likelihood evaluation unit evaluates the likelihood as high.

In the image reading apparatus wherein the document table is made quadrangular and two sides of four sides of the document table extending in orthogonal directions from a specific corner are defined as the reference lines, the likelihood evaluation unit can be configured as follows:

That is, according to a twelfth aspect of the invention, in the image reading apparatus, the document table has a substantially quadrangular shape, and two sides of four sides of the document table extending in orthogonal directions from a specific corner are defined as the reference lines, the likelihood evaluation unit determines whether or not the outer margin of the document recognized by the outer margin recognition unit is at a predetermined distance or longer from the reference line for each of the two reference lines, if the likelihood evaluation unit determines that the outer margin of the document recognized by the outer margin recognition unit is at the predetermined distance or longer from neither of the two reference lines, the likelihood evaluation unit evaluates the likelihood as high, and if the likelihood evaluation unit determines that the outer margin of the document recognized by the outer margin recognition unit is at tire predetermined distance or longer from either of the two reference lines, the likelihood evaluation unit evaluates the likelihood as low.

According to the image reading apparatus, the likelihood of the outer margin (side) recognized by the outer margin recognition unit can be evaluated with still higher accuracy.

Further, according to a thirteenth aspect of the invention, the image reading apparatus further comprises; a prescanning unit, which conveys the read unit in a partial area of a readable area of the document table that can be read through the read unit, the readable area belonging to a rectangular area from one side defined as the reference line, of the four sides of the document table made quadrangular to a position at a predetermined distance from the one side to the inside of the document table, and which controls the read unit to execute read operation in the partial area, wherein tire extraction unit is configured to; convert tire image data of the read result of the read unit provided by the operation of the prescanning unit into edge image data representing an edge image; and extract edge points satisfying a predetermined condition as edge points corresponding to a side of the document placed oil the document table from the edge image data.

As the configuration of the image reading apparatus, it is possible to read only a partial area of a document and estimate the document size, etc., from the read result. However, to recognize the outer margin of a document tabled on image data on which the whole image of the document is not reflected, this technique is inferior in accuracy to a technique of reading the whole document and recognizing the outer margin of the document from the read result.

Therefore, if the concept of the invention is applied to such an image reading apparatus, a problem caused by erroneous recognition can be lessened by switching processing, etc., and a highly convenient image reading apparatus can be provided for the user.

According to a fourteenth aspect of the invention, the image reading apparatus further comprises: a document size estimation unit that estimates the size of the document placed on the document table, wherein, if the likelihood evaluation unit evaluates the likelihood as high, the document size estimation unit estimates the size of the document placed on the document table from the outer margin of the document recognized by the outer margin recognition unit, and wherein, if the likelihood evaluation unit evaluates the likelihood as low, the document size estimation unit estimates that the size of the document placed on the document table is a predetermined size. More preferably, the document size estimation unit may be configured so as to switch the estimated document size in accordance with a user command if the likelihood evaluation unit evaluates the likelihood as low.

If the image reading apparatus is configured so as to thus switch the document size estimation technique according to whether the likelihood evaluated by the likelihood evaluation unit is high or low, the adverse effect of erroneous recognition of the outer margin recognition unit on the subsequent processing can be suppressed.

For example, although the likelihood of the recognition result of the outer margin recognition unit is low, if the document size is estimated based on the recognition result, how the document size estimation unit estimates the document size for the true document size cannot be predicted and the effect of the estimation result on the subsequent processing cannot be controlled. However, when the likelihood of the recognition result of the outer margin recognition unit is low, if the document size is estimated to be a specific document size without estimating the document size, based on the recognition result, the effect of the estimation result on the subsequent processing can be controlled regardless of whether or not the estimation result matches the true document size.

Therefore, according to tire invention, the effect of erroneous recognition of the outer margin recognition unit on the subsequent processing can be suppressed independently of whether or not the estimation result of the document size is correct. Specifically, when the likelihood of the recognition result of the outer margin of the document provided by scanning is low, if the size of the document placed on the document table is estimated to be the maximum size, the read area at the scanning time can be prevented from becoming narrower than the correct read area because of erroneous recognition of the outer margin recognition unit in an image reading apparatus for automatically setting a read area. Consequently, at the scanning time, the whole image of the document desired by the user can be read correctly.

If the image reading apparatus is configured so as to switch the document size estimated by the document size estimation unit in accordance with a user command when the likelihood evaluation unit evaluates the likelihood as low, the user can be allowed to specify the document size least adversely affected by erroneous recognition and the adverse effect of erroneous recognition of the outer margin recognition unit on the subsequent processing can be suppressed effectively.

In addition, to recognize the outer margin of a document by prescanning a partial area, the image reading apparatus may be configured as follows for estimating the document size:

That is, according to a fifteenth aspect of the invention, in the image reading apparatus, the extraction unit extracts the edge points corresponding to each of three sides of the document placed on the document table as the side of the document placed on the document table, the outer margin recognition unit recognizes that two intersection points of three lines to which the edge points corresponding to the sides extracted by the extraction unit are approximated are corners of the document placed on the document table, the image reading apparatus further comprises: a document size estimation unit that estimates the size of the document placed on the document table, if the likelihood evaluation unit evaluates the likelihood as high, the document size estimation unit estimates the size of the document placed on the document table based on the distance between the two intersection points recognized as the corners of the document by the outer margin recognition unit on the assumption that the document placed on the document table is a blank form, and if the likelihood evaluation unit evaluates the likelihood as low, the document size estimating unit estimates that the size of the document placed on the document table is a predetermined size.

The document size estimation unit may estimate the size of the document placed on the document table based on the distance between the two intersection points recognized as the corners of the document by the outer margin recognition unit on the assumption that the document placed on the document table is a blank form if the likelihood evaluation unit evaluates the likelihood as high and may estimate that the size of the document placed on the document table is a predetermined size if the likelihood evaluation unit evaluates the likelihood as low.

If the image reading apparatus is thus configured, both the height and the width of the document can be derived as the document size even from the prescanning result of the partial area, and the outer shape of the whole document placed on the placement base can be grasped precisely for the most part from the prescanning result of the partial area.

According to a sixteenth aspect of the invention, the image reading apparatus further comprises: a read area determination unit that determines the read area of the read unit based on information of the document size estimated by the document size estimation unit; and a scanning unit, which conveys the read unit in the read area determined by the read area determination unit, and which controls the read unit to execute read operation so as to generate image data representing a read image of the document placed on the document table.

In the image reading apparatus for thus executing the scanning, there is a possibility that erroneous recognition of the outer margin recognition unit may adversely affect setting of the read area finally, hi the invention, however, if the likelihood of the recognition result of the outer margin recognition unit is low, the document size is estimated to be a fixed size, so that the adverse effect of the erroneous recognition of the outer margin recognition unit on the Setting of the read area can be suppressed more than was previously possible.

<Exemplary Embodiments>

Exemplary embodiments of the invention will be described with reference to the accompanying drawings.

(First Exemplary Embodiment)

FIG. 1A is a block diagram to represent the configuration of a digital multi-function device 1 of a first exemplary embodiment of the invention. As shown in FIG. 1A, the digital multi-function device 1 of the exemplary embodiment includes an image read unit 10, a read control unit 20, a print unit 30, a print control unit 40, a display and operation unit 50, a communication unit 60, a CPU 70, RAM 80, and flash memory 90. It executes various types of processing by the CPU 70 based on a program recorded in the flash memory 90 and controls the whole apparatus.

Figure 1B:
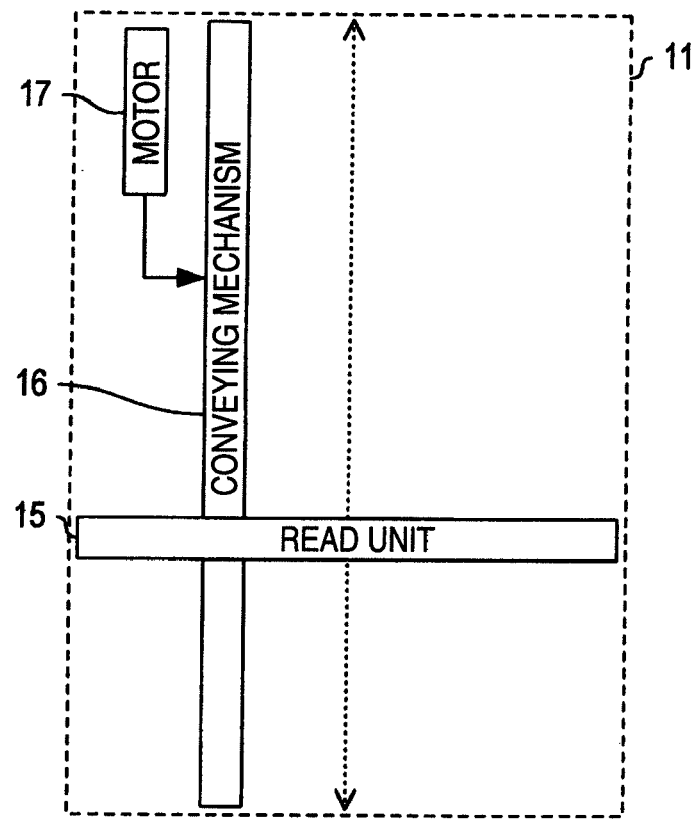
Figure 1C:
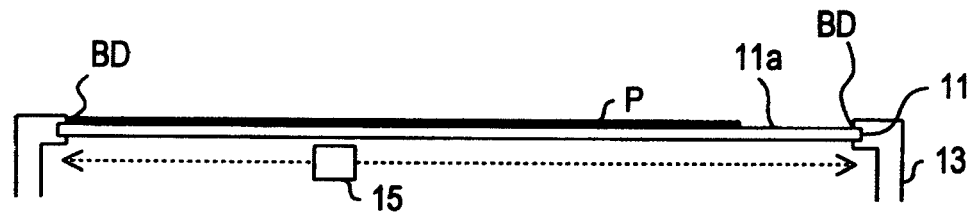

Specifically, the image read unit 10 has the configuration shown in FIGS. 1B and 1C. FIGS. 1B and 1C are schematic representations to show the configuration of the image read unit 10. In the image read unit 10, transparent plate read glass 11 on which a document P to be read is placed is supported on a cabinet 13. The image read unit 10 includes a read unit 15 for optically reading an image reflected on the read glass 11 in a main scanning direction, a conveying mechanism 16 for conveying the read unit 15 in a subscanning direction, and a drive motor 17 for driving the conveying mechanism 16, which are below the read glass 11 in the cabinet 13.

The image read unit 10 drives the conveying mechanism 16 by the rotation force of the motor 17 in accordance with a control signal input from the read control unit 20, thereby conveying the read unit 15 in the subscanning direction (in the dotted arrow direction shown in FIGS. 1B and 1Q below the read glass 11, and executes the read operation through the read unit 15 at the conveying time.

The read unit 15 is a contact image sensor (CIS) for moving in the subscanning direction, reading an image reflected on the read glass 11 for each line, and outputting a line image signal representing the read image under the control of the read control unit 20. The line image signal output from the read unit 15 is converted into digital data (line image data) by an A/D converter (not shown) and the digital data (line image data) is input to the read control unit 20.

Like a scanner, the image read unit 10 is provided with a lid (not shown) that can cover the read glass 11 as the lid can be opened and closed. When the read operation is executed through the read unit 15, the user closes the lid so as to put the lid on a document placed on the read glass 11 by manual operation. The inside of the lid opposed to the read glass 11 is formed of a white member so as to prevent an image of the lid from being reflected on the read image of the document.

In contrast, the read control unit 20 executes read control processing in accordance with a command from the CPU 70 and controls a move of the read unit 15 in the subscanning direction and also controls the read operation of the read unit 15 in the read control processing.

By performing the control, the read control unit 20 reads an image reflected on a read area of the read glass 11 specified from the CPU 70 through the read unit 15 while conveying the read unit 15 in the subscanning direction below the read glass 11, and records the image data representing the image reflected on the read area of the read glass 11 in the RAM 80. As the operation is performed, the image data representing the read image of the document P placed on the read area of the read glass 11 is recorded in the RAM 80.

The read control unit 20 once stores each piece of line image data input from the image read unit 10 in an internal buffer and executes image processing of a shading correction, etc., for the line image data and then records the line image data in the RAM 80.

In addition, the print unit 30 conveys a record sheet of paper placed on a tray (not shown) to a record position in accordance with a control signal input from the print control unit 40 and forms an image corresponding to the control signal on the record sheet according to a record system of ink jet, laser print, etc.

The print control unit 40 controls the print unit 30 to form an image on a record sheet. It prints an image based on the print data specified from the CPU 70 on a record sheet through the print unit 30 in accordance with a command from the CPU 70.

The communication unit 60 is made up of interfaces for communicating with external machines; it is made up of a USB interface, a LAN interface, a fax modem, etc. That is, the multi-function device 1 can conduct fax communications with an external fax machine through the fax modem included in the communication unit 60 and can communicate with an external personal computer through the USB interface or the LAN interface.

In addition, the display and operation unit 50 includes a liquid crystal display (not shown) for information display and various operation keys. It displays user-oriented information on the liquid crystal display and inputs a command entered by the user through the operation key to the CPU 70 under the control of the CPU 70.

The CPU 70 implements a copy function, a fax function, a scanner function, a printer function, and the like in accordance with a command entered through the operation key and a command input from an external personal computer, etc., through the communication unit 60 by executing a program.

For example, when the user enters a copy command through the operation key provided on the display and operation unit 50, the CPU 70 executes copy control processing (see FIG. 3), controls the units in the apparatus, and prints a read image of a document P placed on the read glass 11 on a record sheet. More specifically, the CPU 70 estimates the size of the document P placed on the read glass 11 based on the read result of the read unit 15, sets a scaling factor from the estimated document size and the record sheet size, scales up or down the read image of the document P to the size fitted to the record sheet size, and prints the read image on the record sheet through the print unit 30 (automatic scaling copy processing).

The copy control processing will be specifically described. Prior to the description, the characteristic of the image read unit 10 of the exemplary embodiment will be discussed with FIGS. 2A and 2B.

FIGS. 2A and 2B are schematic representations to show a readable area R0 of the read glass 11. In the multi-function device 1, the read glass 11 of a rectangular glass plate is provided so as to close an opening of the cabinet 13 shaped like a rectangular parallelepiped with one face opened, and the surrounding of the read glass 11 is supported by the cabinet 13.

The read glass 11 is provided slightly below the upper face of the cabinet 13, and a boundary BD between an area 11a of the read glass 11 exposed from the cabinet 13 (which will be hereinafter referred to as "document table") and the cabinet 13 is formed with a step against which a document P can be struck. (Hereinafter, a part of the cabinet 13 positioned above the read glass 11 (a part forming the step) 13a will be hereinafter referred to as "frame."

In the image read unit 10, from the relationship between the line width of the read unit 15 and the size of the document table 11a, the quadrangular area R0 slightly narrower than the whole area of the quadrangular document table 11a is defined as the readable area R0 wherein a document can be read through the read unit 15. Specifically, the readable area R0 is an area having an outer periphery at a position at a minute distance (in the exemplary embodiment, 3 mm) from the boundary BD between the frame 13a and the read glass 11 as indicated by the dotted line in FIGS. 2A and 2B.

In the image read unit 10, a mark MK to allow the user to strike a corner of a document P as an indication is put in the lower-left portion of the frame 13a. In the exemplary embodiment, the corner of the document table 11a on which the mark MK is put is defined "lower-left corner," the corner of the document table 11a positioned at a point distant in the main scanning direction from the lower-left corner is defined as "lower-right corner," and the corner of the document table 11a positioned at a point distant in the subscanning direction from the lower-left corner is defined as "upper-left corner."

That is, in the multi-function device 1, the lower-left corner of the document table 11a (in other words, the inner lower-left corner of the frame 13a) is defined as the position with which the corner of the document P is to be matched. The multi-function device 1 estimates the document size, etc., and realizes the copy operation of the document on the assumption that the user places the document P so as to be matched with the mark MK for the most part.

Figure 3:
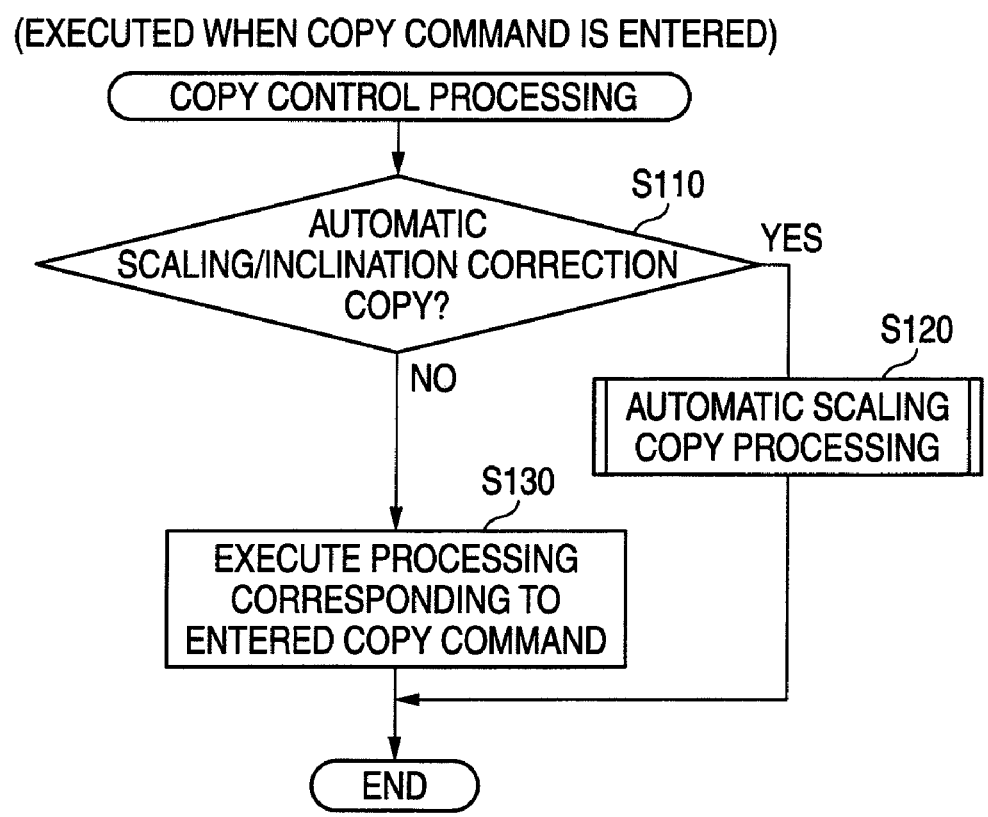
FIG. 3 is a flowchart to represent copy control processing in a first exemplary embodiment of the invention, executed by a CPU.

In addition, in the multi-function device 1 of the exemplary embodiment, an XY coordinate system wherein the lower-left corner of the readable area R0 corresponding to the lower-left corner of the inside of the frame 13a on which the mark MK is put is an origin, the main scanning direction is an X axis, and the subscanning direction is a Y axis is introduced (see FIG. 2B), The CPU 70 uses the XY coordinate system to execute copy control processing shown in FIG. 3.

Subsequently, the copy control processing executed by the CPU 70 will be discussed. FIG. 3 is a flowchart to represent the copy control processing executed by the CPU 70 when the user enters a copy command through the operation key.

When starting the copy control processing, the CPU 70 determines whether or not the copy command entered through the operation key is an "automatic scaling/inclination correction" copy command (S110). If the CPU 70 determines that the entered copy command is an "automatic scaling/inclination correction" copy command (YES at S110), the CPU 70 executes second copy processing shown in FIG. 4 at S120. Then, the CPU 70 completes the copy control processing.

In contrast, if the copy command entered through the operation key is any other copy command than tire "automatic scaling/inclination correction" copy command (for example, a normal copy command involving no automatic scaling or inclination correction command), the CPU 70 executes processing corresponding to the entered copy command at S130 and then completes the copy control processing.

Figure 4:
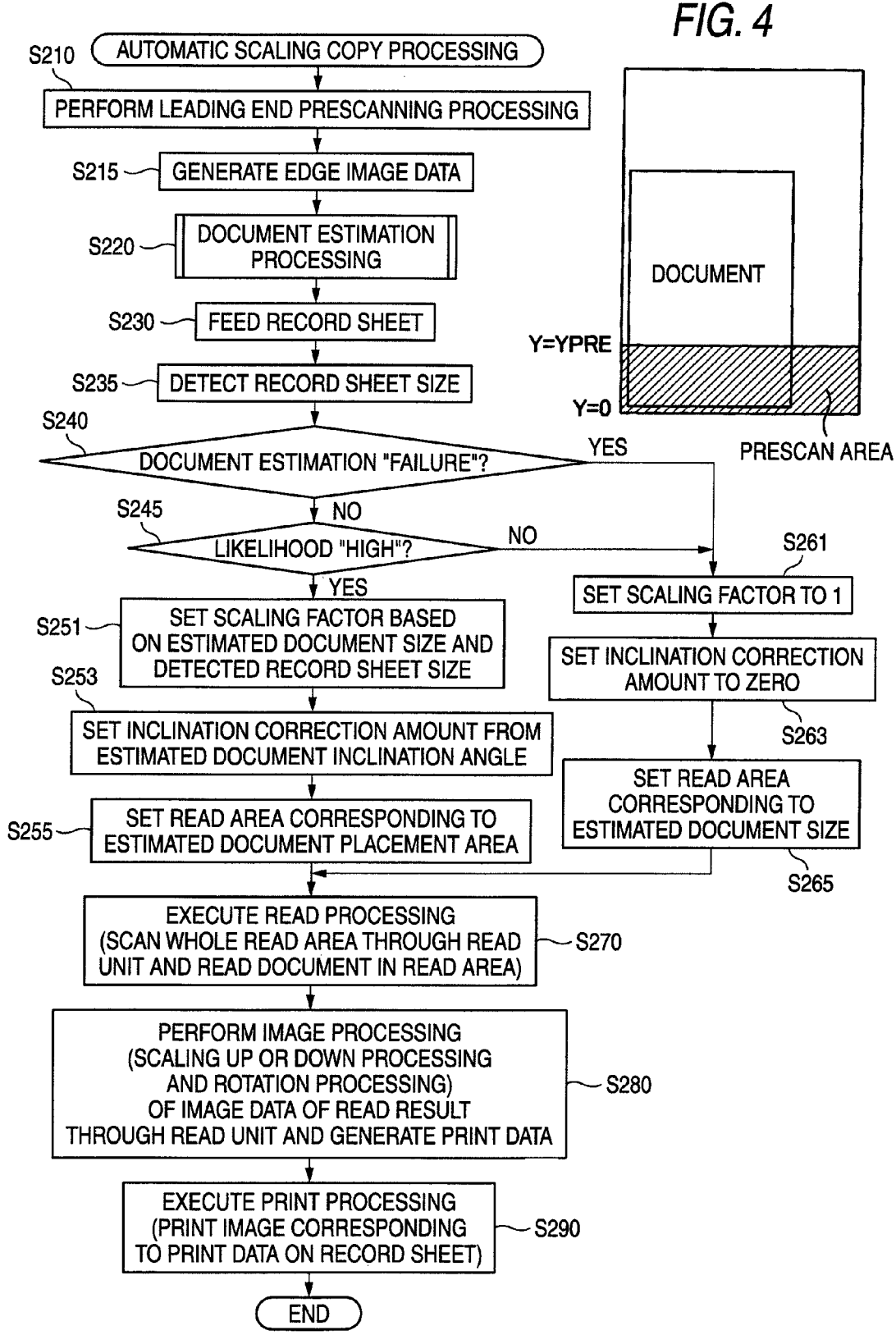
FIG. 4 is a flowchart to represent automatic scaling copy processing executed by the CPU.

Subsequently, the automatic scaling copy processing executed at S120 by the CPU 70 will be discussed. FIG. 4 is a flowchart to represent the automatic scaling copy processing executed by the CPU 70.

When starting the automatic scaling copy processing executed at S120, first the CPU 70 sets the document read start position to the lower end (Y=0) of the readable area R0 and the document read termination position to a position (Y=YPRE) at a predetermined distance from the lower end of the readable area R0 predetermined at the design stage, thereby setting a part of the readable area R0 corresponding to the area from the document read start position to the document read termination position to the read area, and causes an image read unit 10 to execute the prescanning operation over the read area through a read control unit 20 (S210: Leading end prescanning processing).

That is, at S210, the image read unit 10 is caused to execute the prescanning operation from the lower end of the readable area R0 to a point at a predetermined distance from the lower end of the readable area R0 to the inside of the readable area R0 (in the exemplary embodiment, to a point at a distance of 30 mm from the lower end of the readable area R0) rather than caused to execute the prescanning operation over the whole readable area R0. Accordingly, the CPU 70 acquires the image data representing the read result Of the partial area of the readable area R0 as the prescanning result from the image read unit 10.

As the prescanning direction, the image read unit 10 executes the operation of conveying the read unit 15 in the subscanning direction at speed corresponding to the resolution for prescanning from one end to the other of the setup read area, causing the read unit 15 to read an image of the read area, and records low-resolution image data as the prescanning result (which will be hereinafter referred to as "prescan image data") in RAM 80 through the read control unit 20.

After S210, then the CPU 70 executes edge detection processing for the prescan image data recorded in the RAM 80 and generates edge image data corresponding to the image data (S215). That is, the CPU 70 passes the prescan image data recorded in the RAM 80 through an image filter for edge detection (such as differential filter) and generates edge image data representing an edge image corresponding to the image data.

Figure 5:
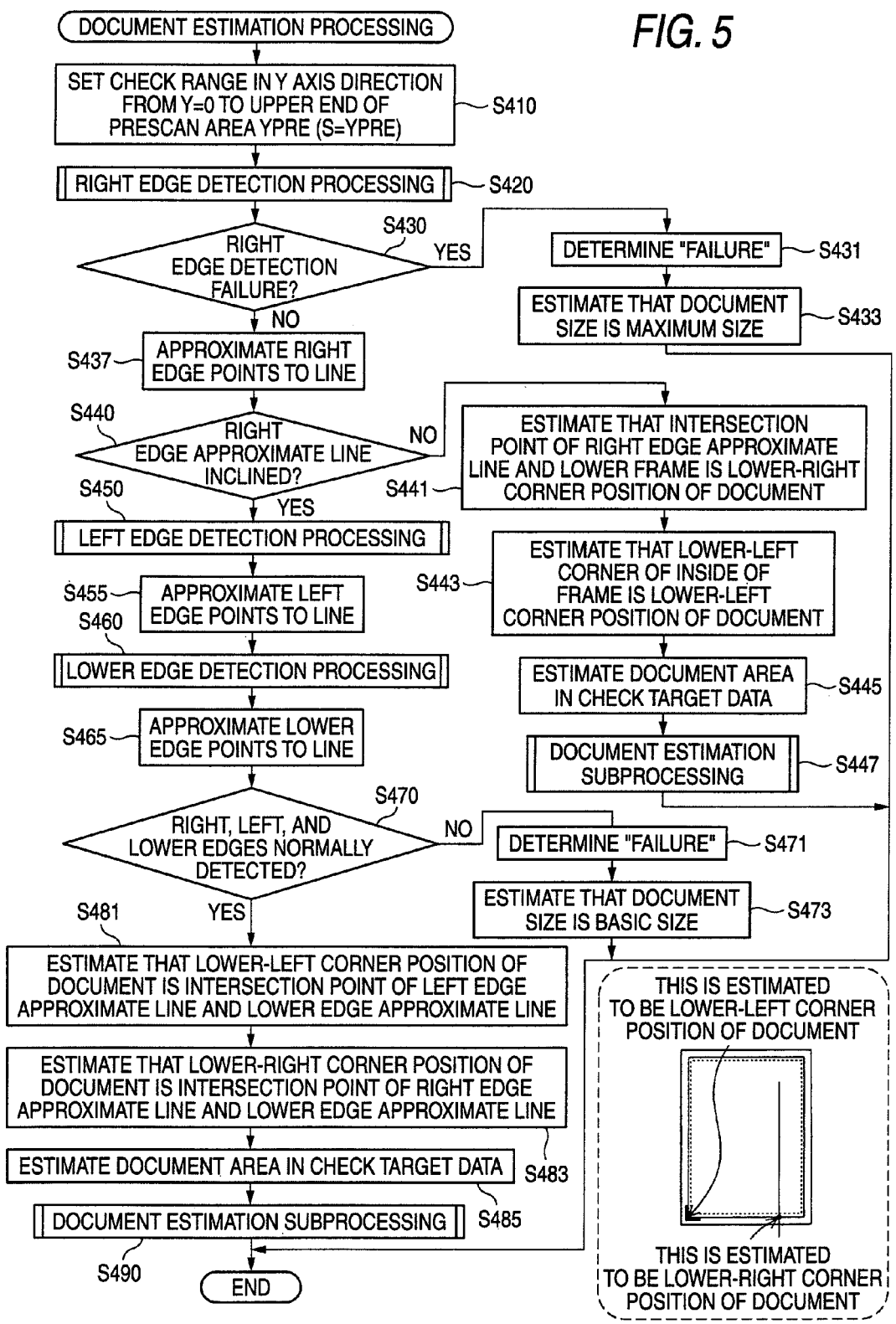
FIG. 5 is a flowchart to represent document estimation processing in the first exemplary embodiment of the invention, executed by the CPU.

After S215, the CPU 70 sets the generated edge image data to check target data and executes document estimation processing shown in FIG. 5 (S220). Although described later in detail, in the document estimation processing, the check target data (the edge image data provided at S215) is analyzed, and the size (height×width) of the document placed on the document table 11a, an inclination angle θ of the document, and the placement area of the document on the document table 11a are estimated.

Specifically, an edge of the document placed on the document table 11a is detected in the check target data on the assumption that the document placed on the document table 11a is quadrangular, the lower-left corner position and the lower-right corner position of the document are estimated from the detection result, the document area in the check target data is estimated, and the likelihood of the estimated document area is evaluated from the distribution of the edge points in the area outside the document area of the check target data.

If the likelihood of the document area is high, the size of the document placed on the document table 11a, an inclination angle θ of the document, and the placement area of the document on the document table 11a are estimated from the information of the estimated corner positions on the assumption that the document placed on the document table 11a is a black form. Here, it is assumed that the angle of the lower side of the document with respect to the X axis is the document inclination angle θ of the document (see FIG. 8).

In contrast, if the likelihood of the document area is low or if a document edge cannot normally be detected, it is assumed that the document placed on the document table 11a is a document of a predetermined fixed size. At S220, the described processing is executed.

After S220, the CPU 70 causes the print unit 30 to execute the sheet feed operation through a print control unit 40 (S230) and also detects the size of the fed record sheet (S235). The size of the record sheet can be detected according to a technique using a sensor provided in the conveying passage of the record sheet, for example.

After S235, the CPU 70 determines whether or not "failure" determination is made at S431 (see FIG. 5) or S471 (S240) as the cause of failure of the detection of a document edge in the immediately preceding document estimation processing (S220). If the CPU 70 determines that "failure" determination is made (YES at S240), the CPU 70 goes to S261. In contrast, if the CPU 70 determines that "failure" determination is not made (NO at S240) in the immediately preceding document estimation processing (S220), the CPU 70 goes to S245.

At S245, the CPU 70 determines whether or not "likelihood high" determination is made in the immediately preceding document estimation processing. In the document estimation processing, the document size estimation method is switched in response to whether the likelihood of the estimated document area is high or low as described above. Here, whether or not the likelihood of the document area is low and the document size is estimated to be the fixed size is determined by whether or not "likelihood high" determination is made in the immediately preceding document estimation processing.

If the CPU 70 determines that "likelihood low" determination is made (NO at S245), the CPU 70 goes to S261; if the CPU 70 determines that "likelihood high" determination is made (YES at S245), the CPU 70 goes to S251.

At S251, the CPU 70 sets the scaling factor according to a predetermined calculation expression based on the document size estimated at S220 and the record sheet size detected at S235. Specifically, the CPU 70 sets the scaling factor to the scaling factor corresponding to the ratio between the document size and the record sheet size (for example, record sheet short side length document short side length) so that a copy image of the document is printed on the record sheet as it is scaled up according to the scaling factor corresponding to the ratio between the document size and the record sheet size (or is scaled down if the scaling factor is less than 1) in the subsequent processing.

After S251, the CPU 70 sets the inclination correction amount of the image data from the document inclination angle $\delta$ estimated at S220 (S253). Specifically, the CPU 70 sets the inclination correction amount so that the copy image of the document is printed on the record sheet straightly without any inclination. However, if the estimated document inclination angle $\theta$ is a minute amount (in the exemplary embodiment, $-0.5$ degrees$\leqq\theta\leqq 0.5$ degrees), an error is also considered and the inclination correction amount is set to zero.

After S253, the CPU 70 sets the document read start position and the document read termination position based on information of the document placement area estimated at S220, and makes the read area defined by the document read start position and the document read termination position correspond to the placement area of the document on the document table 11a (S255).

Specifically, to enable the read unit 15 to read the whole placement area of the document, the document read start position is set to the position corresponding to the end point of the document at the lowest position in the subscanning direction and the document read termination position is set to the position corresponding to the end point of the document at the uppermost position in the subscanning direction so that the read area is made to correspond to the placement area of the document on the document table 11a. After S255, the CPU 70 goes to S270.

In contrast, at S261, the CPU 70 sets the scaling factor to 1 so that a copy image of the document is printed on the record sheet at 1× scaling factor, and sets the inclination correction amount to zero (S263). Further, the CPU 70 sets the document read start position and the document read termination position based on information of the document size estimated in the immediately preceding document estimation processing, and makes the read area defined by the document read start position and the document read termination position correspond to the placement area of the document on the document table 11a (S265).

Specifically, at S265, assuming that the lower-left corner of the document is matched with the lower-left corner of the document table 11a (the lower-left corner of the inside of the frame) and the document is placed correctly on the document table 11a, the CPU 70 sets the document read start position to the lower end of the readable area R0 (Y=0) and sets the document read termination position to a position at a distance as much as the estimated height of the document from the lower end margin of the document table 11a (in other words, the inside of the lower side of the frame 13a). At S265, the CPU 70 thus makes the read area correspond to the placement area of the document on the document table 11a.

At S265, however, since the read area need not be set larger than the record sheet size because the copy operation is realized at 1× scaling factor in the subsequent processing, if the record sheet size is smaller than the document size, the read area may be made to correspond to the record sheet size. After S265, the CPU 70 goes to S270.

At S270, the CPU 70 controls the image read unit 10 through the read control unit 20, thereby causing the image read unit 10 to convey the read unit 15 in the subscanning direction from the document read start position to the document read termination position and while the read unit 15 is conveyed, causing the read unit 15 to execute the read operation for each line so as to read an image of the setup read area and record the image data representing the read result of the read area in the RAM 80 (S270).

Then, the CPU 70 performs scaling up or down processing of the image data representing the read result recorded in the RAM 80 according to the preset scaling factor, performs rotation processing of the image data as much as the preset inclination correction amount, converts tire image data representing the read result into image data for print, and sets the provided image data in print data (S280). However, if the inclination correction amount is set to zero, the rotation processing is skipped at S280.

After S280, the CPU 70 executes print processing about the print data (S290). That is, the CPU 70 causes the print unit 30 to print an image based on the print data on the fed record sheet through the print control unit 40. Then, the copy control processing is completed.

Thus, in the automatic scaling copy processing, the document size, etc., is estimated based on the prescanning result of the partial area in the readable area R0 and from the result, the read area at the scanning time (S270 executing time) is determined and the scaling factor and the inclination correction amount are also determined. Specifically, if detection of a document edge results in failure or if the likelihood of the document area estimated based on the detected document edge is low, the automatic scaling function is turned off and the copy operation is realized at 1× scaling factor; otherwise, the automatic scaling function is turned on and the copy image of the document is scaled up or down to die size corresponding to the ratio between the document size and the record sheet size and then is printed on the record sheet.

Subsequently, the document estimation processing executed at S220 by the CPU 70 will be discussed with FIG. 5. FIG. 5 is a flowchart to represent the document estimation processing of the first exemplary embodiment executed by the CPU 70.

Figure 6:
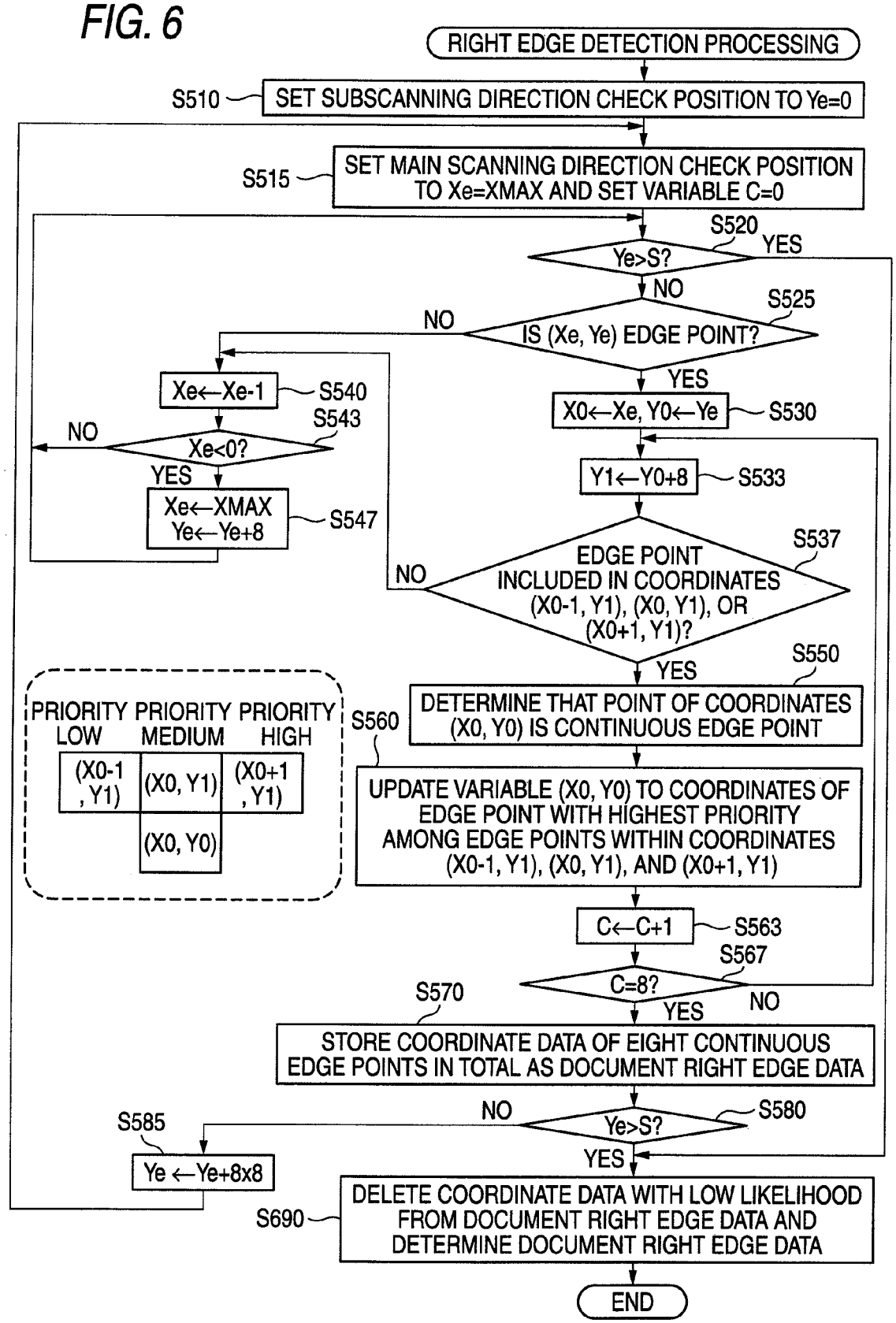
FIG. 6 is a flowchart to represent right edge detection processing executed by the CPU.

When starting the document estimation processing, first the CPU 70 sets a variable S in YPER of the Y coordinate of the upper end of the prescan area described above (S=YPRE), thereby setting the check range in the Y axis direction from Y=0 to Y=S=YPRE (S410). Then, the CPU 70 goes to S420 and executes right edge detection processing. FIG. 6 is a flowchart to represent the right edge detection processing executed by the CPU 70.

When starting the right edge detection processing, first the CPU 70 sets a subscanning direction check position Ye to the lower end Y coordinate of the readable area R0 (Ye=0) at S510 and sets a main scanning direction check position Xe to the right end X coordinate of the readable area R0 (Xe=XMAX) and also initializes a variable C to a value of zero (C=0) at S515. Then, the CPU 70 determines whether or not the subscanning direction check position Ye exceeds the check range (S520). Specifically, the CPU 70 determines whether or not Ye>S.

Figure 7:
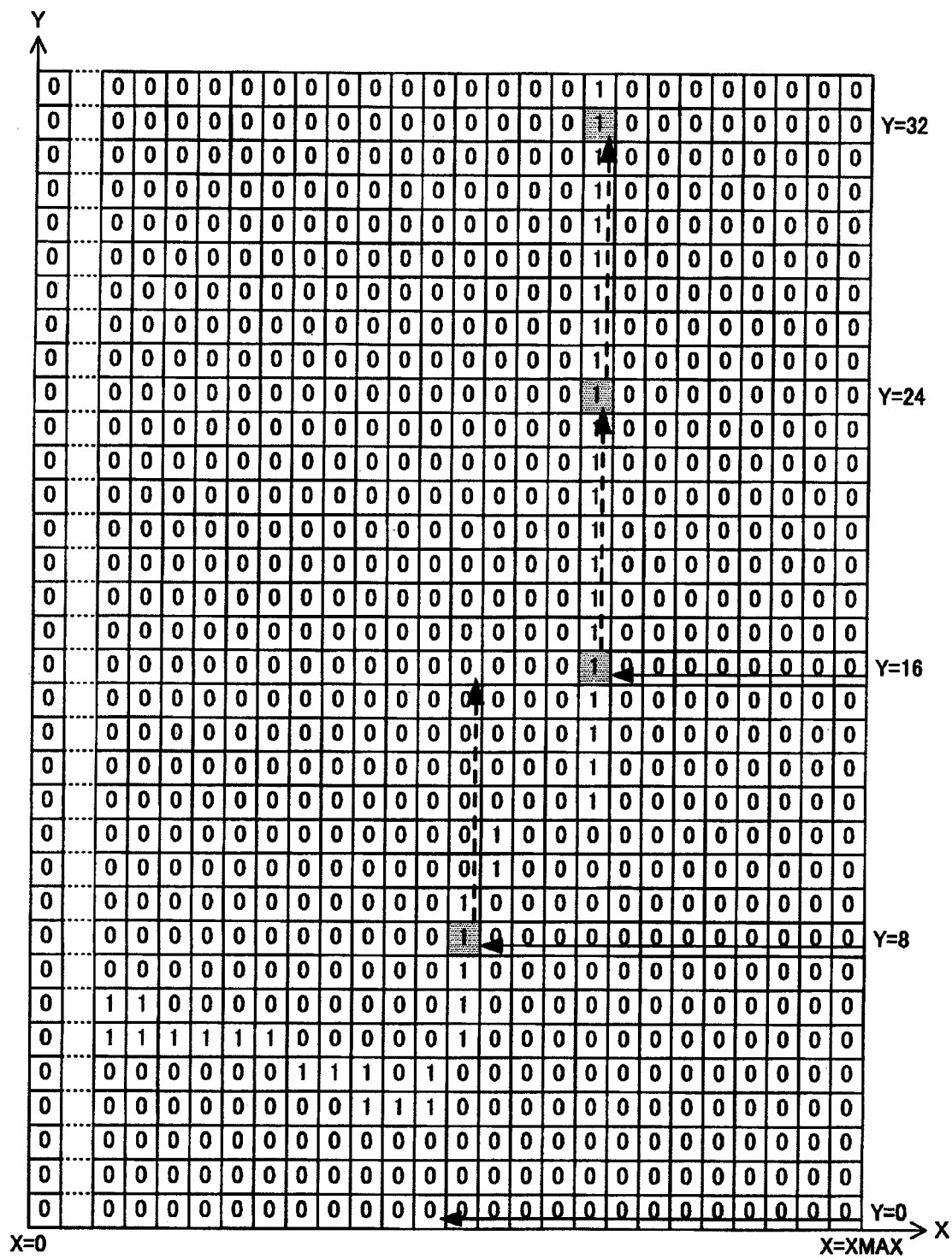
FIG. 7 is a schematic representation to show the composition of edge image data.

If the CPU 70 determines that the subscanning direction check position Ye does not exceed the check range (NO at S520), the CPU 70 references the pixel value of the check target data corresponding to the check position (X, Y) (Xe, Ye) defined by the main scanning direction check position Xe and the subscanning direction check position Ye, thereby determining whether or not the check position (Xe, Ye) is an edge point (S525). FIG. 7 is a schematic representation to show the composition of edge image data in an extraction manner and further represent the locus of edge points traced by executing the right edge detection processing. In the example shown in FIG. 7, the point of a pixel value "1" corresponds to the edge point.

If the CPU 70 determines that the check position (Xe, Ye) is not an edge point (NO at S525), the CPU 70 goes to S540 and updates the main scanning direction check position Xe to a position with one pixel moved in the X axis minus direction from the main scanning direction check position Xe (Xe<-Xe−1) and determines whether or not the post-updated main scanning direction check position Xe protrudes from the left end of the readable area R0. Specifically, the CPU 70 determines whether or not Xe<0 (S543).

If the CPU 70 determines that the main scanning direction check position Xe does not protrude from the left end of the readable area R0 (NO at S543), the CPU 70 goes to S520 and determines whether or not the subscanning direction check position Ye exceeds the check range (Ye>S). If the CPU 70 determines that the subscanning direction check position Ye does not exceed the check range (NO at S520), the CPU 70 goes to S525; if the CPU 70 determines that the subscanning direction check position Ye exceeds the check range (YES at S520), the CPU 70 goes to S590.

In contrast, if the CPU 70 determines at S543 that the main scanning direction check position Xe protrudes from the left end of the readable area R0 (Xe<0), the CPU 70 goes to S547 and sets the main scanning direction check position Xe to the right end (XMAX) of the readable area R0 (Xe=XMAX) and updates the subscanning direction check position Ye to a value resulting from adding eight to the current value Ye (Ye<-Ye+8). That is, the CPU 70 sets the subscanning direction check position Ye to a position with eight pixels advanced in the Y axis direction from the subscanning direction check position Ye. Then, the CPU 70 goes to S520 and executes the processing described above.

If the CPU 70 determines that the check position (Xe, Ye) is an edge point (YES at S525), the CPU 70 goes to S530 and sets the coordinate value of the current check position (Xe, Ye) in a variable (X0, Y0) (X0<-Xe, Y0<-Ye). The CPU 70 also updates a variable Y1 to a coordinate value Y1 with eight pixels advanced in the Y axis direction from coordinate Y=Y0 (Y1=Y0+8) (S533).

Then, the CPU 70 determines whether or not at least one of the point of coordinates (X0−1, Y1), the point of coordinates (X0, Y1), and the point of coordinates b (X0+1, Y1) is an edge point (S537). If none of the point of coordinates (X0−1, Y1), the point of coordinates (X0, Y1), and the point of coordinates (X0+1, Y1) is an edge point (NO at S537), the CPU 70 goes to S540 and updates the main scanning direction check position Xe to a position with one pixel moved in the X axis minus direction from the main scanning direction check position Xe (Xe<-Xe−1).

In contrast, if the CPU 70 determines that at least one of the point of coordinates (X0−1, Y1), the point of coordinates (X0, Y1), and the point of coordinates (X0+1, Y1) is an edge point (YES at S537), the CPU 70 goes to S550 and determines that the point of coordinates (X0, Y0) is a continuous edge point and temporarily stores the coordinates (X0, Y0) as the coordinate data of the continuous edge point.

After S550, the CPU 70 goes to S560 and selects one edge point from among the point of coordinates (X0−1, Y1), the point of coordinates (X0, Y1), and the point of coordinates (X0+1, Y1) according to predetermined priority.

Specifically, in the right edge detection processing, the coordinates nearer to the right end of the readable area R0 is assigned the higher priority. That is, the point of coordinates (X0+1, Y1) near to the right end of the readable area R0 is assigned priority "high," the point of coordinates (X0, Y1) is assigned priority "medium," and the point of coordinates (X0−1, Y1) is assigned priority "low."

The reason why the priority is thus set is that nothing should exist on the document table 11*a* and no edge point should exist on the right from the right end of the document and that the nearer the edge point to the right end of the readable area R0, the higher the possibility that the edge point may be the edge point corresponding to the right end of the document.

That is, at S560, the CPU 70 selects the edge point with the highest priority from among the point of coordinates (X0−1, Y1), the point of coordinates (X0, Y1), and the point of coordinates (X0+1, Y1) according to the priority. The CPU 70 updates the variable X0 to the X coordinate of the selected point and the variable Y0 to the Y coordinate of the selected point. Then, the CPU 70 adds one to the variable C to update the variable C (S563).

After S563, the CPU 70 determines whether or not the post-updated value of the variable C is 8 (C=8). If the CPU 70 determines that the value of the variable C is not 8 (NO at S567), the CPU 70 goes to S533 and updates the variable Y1 to the Y coordinate of the point with eight pixels advanced in the Y axis direction from coordinate Y=Y0 (Y1=Y0+8). Then, the CPU 70 executes S537 and the later steps.

The CPU 70 executes the processing, thereby checking whether or not edge points are continuous in the Y axis direction every eight pixels in the Y axis direction as shown in FIG. 7. If the CPU 70 determines that the value of the variable C is 8 (YES at S567), the CPU 70 stores the coordinate data of the eight points in total determined to be continuous edge points at S550 repeated eight times in the RAM 80 as document right edge data (S570).

After S570, the CPU 70 goes to S580 and determines whether or not the subscanning direction check position Ye exceeds the check range (Ye>S). If the CPU 70 determines that tire subscanning direction check position Ye does not exceed the check range (NO at S580), the CPU 70 updates the subscanning direction check position Ye to a position with 64 pixels advanced from the subscanning direction check position Ye (S585) and goes to S515.

The CPU 70 thus detects eight continuous edge points as one set repeatedly. When the subscanning direction check position Ye exceeds the check range (YES at S520 or YES at S580), the CPU 70 goes to S590 and deletes the coordinate data with low likelihood as the right edge (edge points representing the right end of the document) from the coordinate data stored as the document right edge data at S570 and determines the document right edge data.

Figure 8:
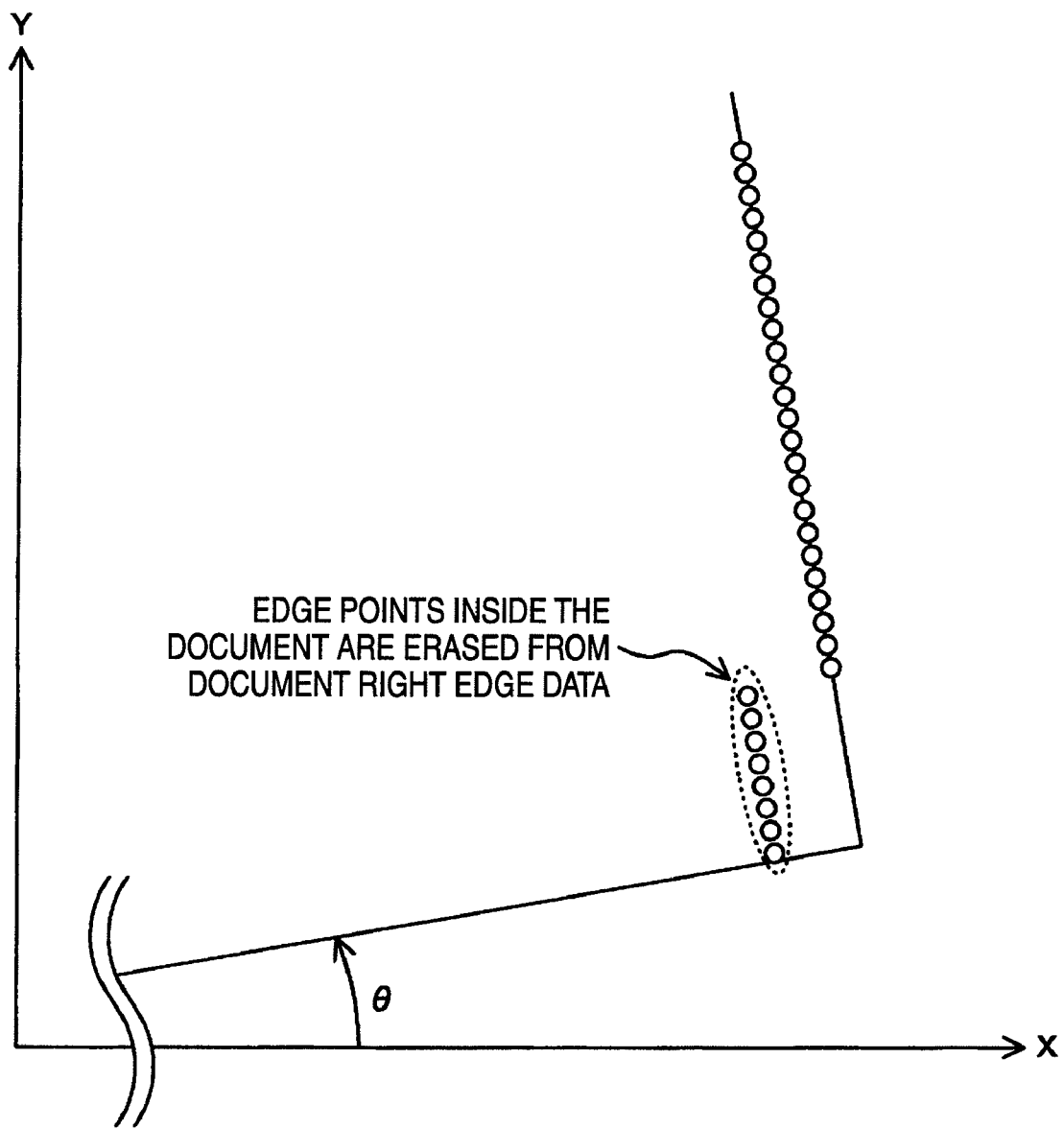
FIG. 8 is a schematic representation to describe a determining technique of document right edge data.

Specifically, as shown in FIG. 8, obviously discontinuous coordinate data at a position largely shifting to the document inside area relative to the continuous coordinate data among the coordinate data stored as the document right edge data is deleted from the document right edge data and the document right edge data is determined. Then, the right edge detection processing is exited. However, S590 is a step for enhancing the document edge detection accuracy and therefore may be skipped in the right edge detection processing.

When thus exiting the right edge detection processing, the CPU 70 returns to the document estimation processing and goes to S430 and determines whether or not the right edge detection results in failure in the immediately preceding right edge detection processing. Specifically, if there is no coordinate data registered as the document right edge data in the immediately preceding right edge detection processing, the CPU 70 determines that the right edge detection results in failure; if there is coordinate data registered as the document right edge data, the CPU 70 determines that the right edge detection results in success.

However, exceptionally, if the coordinate data registered as the document right edge data exists in the proximity of the left end (Y=0) of the readable area R0, it may be assumed that the coordinate data of the left edge (edge points representing the left end of the document) is erroneously registered as the document right edge data and even if there is coordinate data registered as the document right edge data, it may be determined that the right edge detection results in failure.

As the case where the right edge detection results in failure, the case where the document size is larger than the size of the document table 11*a* and the right end of the document protrudes from the document table 11*a* or the like can be named.

If the CPU 70 determines that the right edge detection results in failure (YES at S430), the CPU 70 goes to S431 and makes "failure" determination and estimates that the size (height×width) of the document placed on the document table 11*a* is the maximum size (the size corresponding to the readable area R0) of the document that can be placed on the document table 11*a* (S433). After S433, the CPU 70 exits the document estimation processing. If "failure" determination is made at S431, the determination at S240 described above is YES.

In contrast, if the CPU 70 determines that the right edge detection results in success (NO at S430), the CPU 70 goes to S437 and approximates the points indicated by the document right edge data determined in the right edge detection processing to a line and calculates an approximate line of the points indicated by the document right edge data (which will be hereinafter represented as "right edge approximate line").

Then, the CPU 70 goes to S440 and determines whether or not the right edge approximate line is inclined larger than a predetermined angle with respect to the Y axis. In the exemplary embodiment, specifically, the CPU 70 determines whether or not the right edge approximate line is inclined larger than 0.5 degrees with respect to the Y axis.

If the CPU 70 determines that the inclination of the right edge approximate line is equal to or less than the predetermined angle (NO at S440), the CPU 70 estimates that the document is struck against the lower-left corner of the inside of the frame 13*a* and is placed correctly on the document table 11*a*, and estimates that the intersection point of the right edge approximate line and the lower end margin of the document table 11*a* (in other words, the inside of the lower side of the frame 13*a* (which will be hereinafter represented as "lower frame")) is the lower-right corner position of the document (S441), as shown at the right of FIG. 5.

After S441, the CPU 70 estimates that the lower-left corner position of the document is the point of the lower-left corner of the document table 11*a* (in other words, the lower-left corner of the inside of the frame 13*a*) (S443), and estimates an area representing the document image in the check target data (which will be hereinafter represented as "document area") (S445).

Specifically, at S445, the document area in the check target data is estimated from the estimated lower-left corner position and lower-right corner position on the assumption that the document placed on the document table 11*a* is quadrangular. That is, the area of the check target data surrounded by a line connecting the lower-left corner position and the lower-right corner position, a line extending in the Y axis direction from the lower-right corner position, and a line extending in the Y axis direction from the lower-left corner position is estimated to be the document area (see FIG. 9B).

Figure 9A:
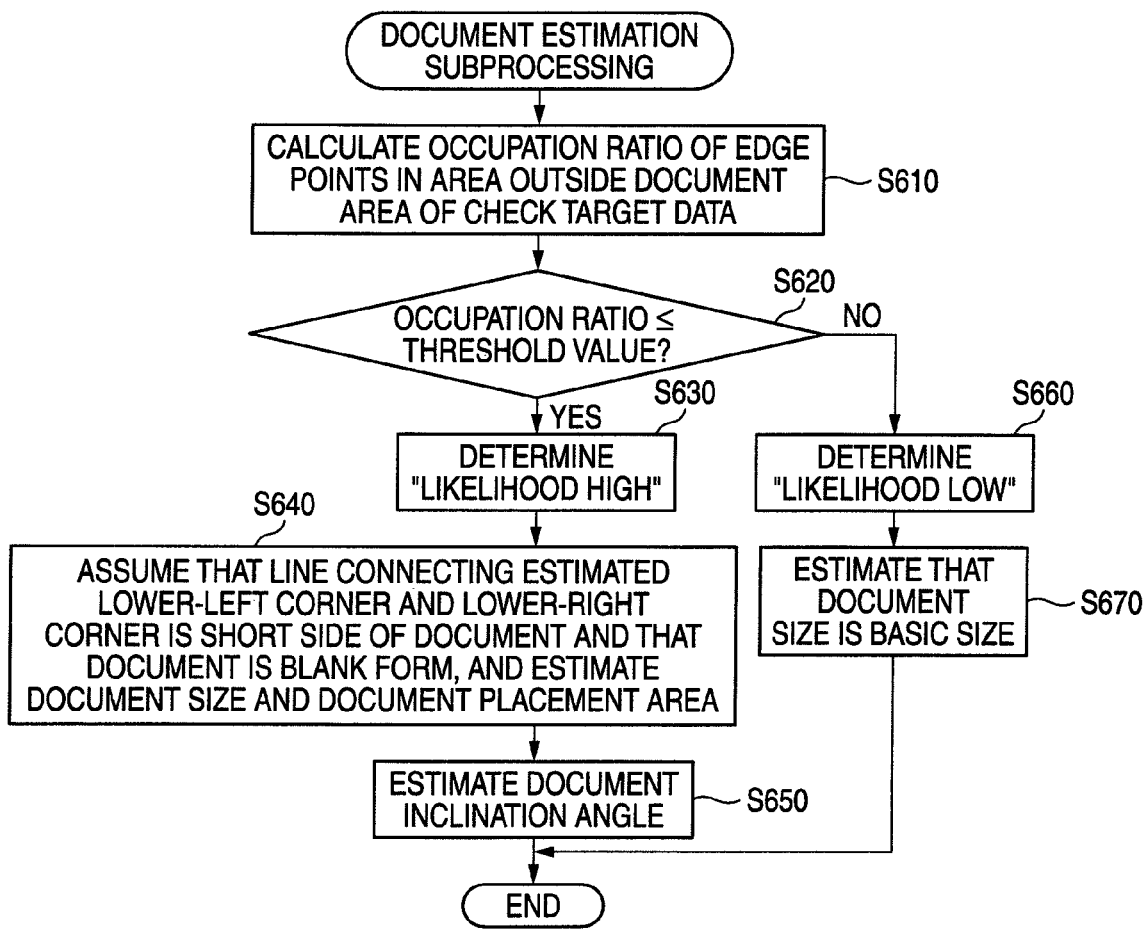
FIG. 9A is a flowchart to represent document estimation subprocessing in the first exemplary embodiment of the invention, executed by the CPU.

After S445, the CPU 70 goes to S447 and executes document estimation subprocessing shown in FIG. 9A. FIG. 9A is a flowchart to represent the document estimation subprocessing executed by the CPU 70.

When starting the document estimation subprocessing at S447, first the CPU 70 calculates the occupation ratio of edge points in an area outside the document area of the check target data based on information of the previously estimated document area (S610). That is, the CPU 70 calculates the occupation ratio of edge points in the area outside the document area of the check target data according to a calculation expression of "occupation ratio= number of edge points outside document area÷total number of pixels outside document area" (S610).

Figure 9B:
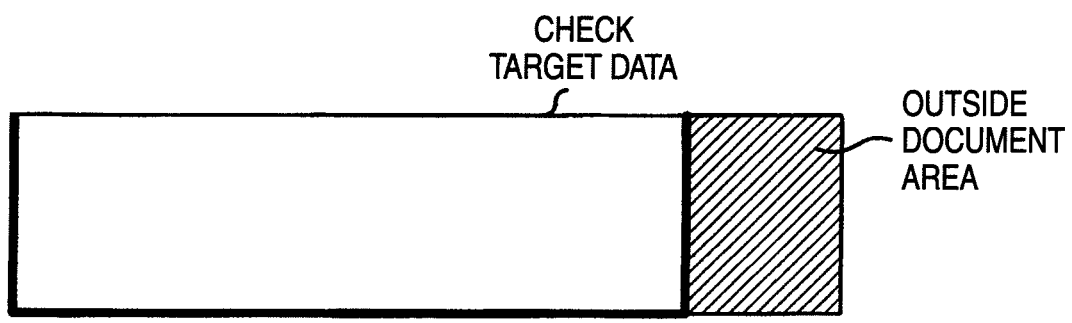
FIGS. 9B and 9C are schematic representations relevant to an occupation ratio calculation area.

FIG. 9B is a schematic representation to show a specific example of the area of the check target data handled as the area outside the document area in the document estimation subprocessing executed at S447 as the area is hatched.

However, here, exceptionally, it is assumed that if the edge points registered as the document right edge data are outside the document area, they are not counted as the number of the edge points outside the document area. That is, in the document estimation subprocessing executed at S447, it is assumed that the number of the edge points registered as the document right edge data and existing outside the document area is not contained in the "number of edge points outside document area" in the expression mentioned above.

After S610, the CPU 70 determines whether or not the occupation ratio calculated at S610 is equal to or less than a predetermined threshold value (for example, 0.05 or less) (S620). If the CPU 70 determines that the calculated occupation ratio is equal to or less than the threshold value (YES at S620), the CPU 70 evaluates the likelihood of the previously estimated document area as high and makes a determination of "likelihood high" (S630). If the CPU 70 makes a determination of "likelihood high" at S630, the CPU 70 makes a determination of YES at S245 described above in the subsequent processing.

After S630, the CPU 70 goes to S640 and assumes that the line connecting the previously estimated lower-left corner position and lower-right corner position of the document is the short side of the document and that the document placed on the document table 11*a* is a blank form, and estimates the size of the document placed on the document table 11a and the placement area of the document on the document table 11a.

That is, the CPU 70 estimates that the length from the estimated lower-left corner position to the estimated lower-right corner position of the document is the short side length (width) of the document, estimates that √2 times the short side length is the long side length (height) of the document, and estimates the document size. The CPU 70 derives the coordinates of the positions of the upper-left corner and the upper-right corner of the document by assuming that the document of the size mentioned above is placed on the document table 11a based on the estimated lower-left corner position and the estimated lower-right corner position, and estimates that the area in a quadrangle formed by connecting the four concerns is the document placement area (S640). The reason why it is estimated that √2 times the short side length of the document is the long side length of the document is that the ratio of the short side length of the blank form: the long side length is 1:√2.

After S640, the CPU 70 estimates the inclination angle of the document placed on the document table 11a (S650). In the document estimation subprocessing executed at S447, the corner positions are found by assuming that the document is struck precisely against the lower-left corner of the document table 11a and is placed on the document table 11a at S441 and S443 just before S447. Thus, it is estimated at S650 that the document inclination angle is zero (no inclination). Then, the CPU 70 exits the document estimation subprocessing.

In contrast, if the CPU 70 determines that the occupation ratio calculated at S610 exceeds the threshold value (NO at S620), the CPU 70 evaluates the likelihood of the previously estimated document area as low and makes a determination of "likelihood low" (S660). If the CPU 70 makes a determination of "likelihood low" at S660, the CPU 70 makes a determination of NO at S245 described above in the subsequent processing.

By the way, the reason why the likelihood of the document area is evaluated as low at S660 is that so long as the estimated document area is correct, basically no edge points should exist outside the document area although some edge points detected in the presence of dust, etc., can exist outside the document area.

In other words, if a large number of edge points exist outside the document area, the possibility that an erroneous area may be estimated to be the document area in the presence of a ruled line, etc., drawn in tire document placed on the document table 11a is high and the possibility that a true document area may exist beyond the estimated document area is high. Then, if the occupation ratio is high, the likelihood of the previously estimated document area is evaluated as low and a determination of "likelihood low" is made.

If the CPU 70 makes a determination of "likelihood low" at S660, the CPU 70 goes to S670 and estimates that the size of the document placed on the document table 11a is a preset basic size without using the information of the estimated lower-left and lower-right corner positions. Then, the CPU 70 exits the document estimation subprocessing.

The multi-function device 1 of the exemplary embodiment is configured so as to be able to previously obtain information of the basic size as setup information through operation of the operation key from the user. That is, at S670, the CPU 70 estimates that the size of the document placed on the document table 11a is the basic document size previously specified by the user. However, since tire possibility that the Size of the document placed on tire document table 11a may be larger man the size of the readable area R0 is high in a situation in which a determination of "likelihood low" is made at S660, preferably the setup value of the basic size at the product shipment time is preset to the maximum size of the document that can be placed on the document table 11a.

When thus exiting the document estimation subprocessing at S447, the CPU 70 also exits tire document estimation processing at S220, returns to the automatic scaling copy processing, goes to S230, and executes the subsequent processing. That is, the CPU 70 sets the read area, etc., based on the information of the document size estimated in the document estimation processing and realizes the copy operation.

Figure 10:
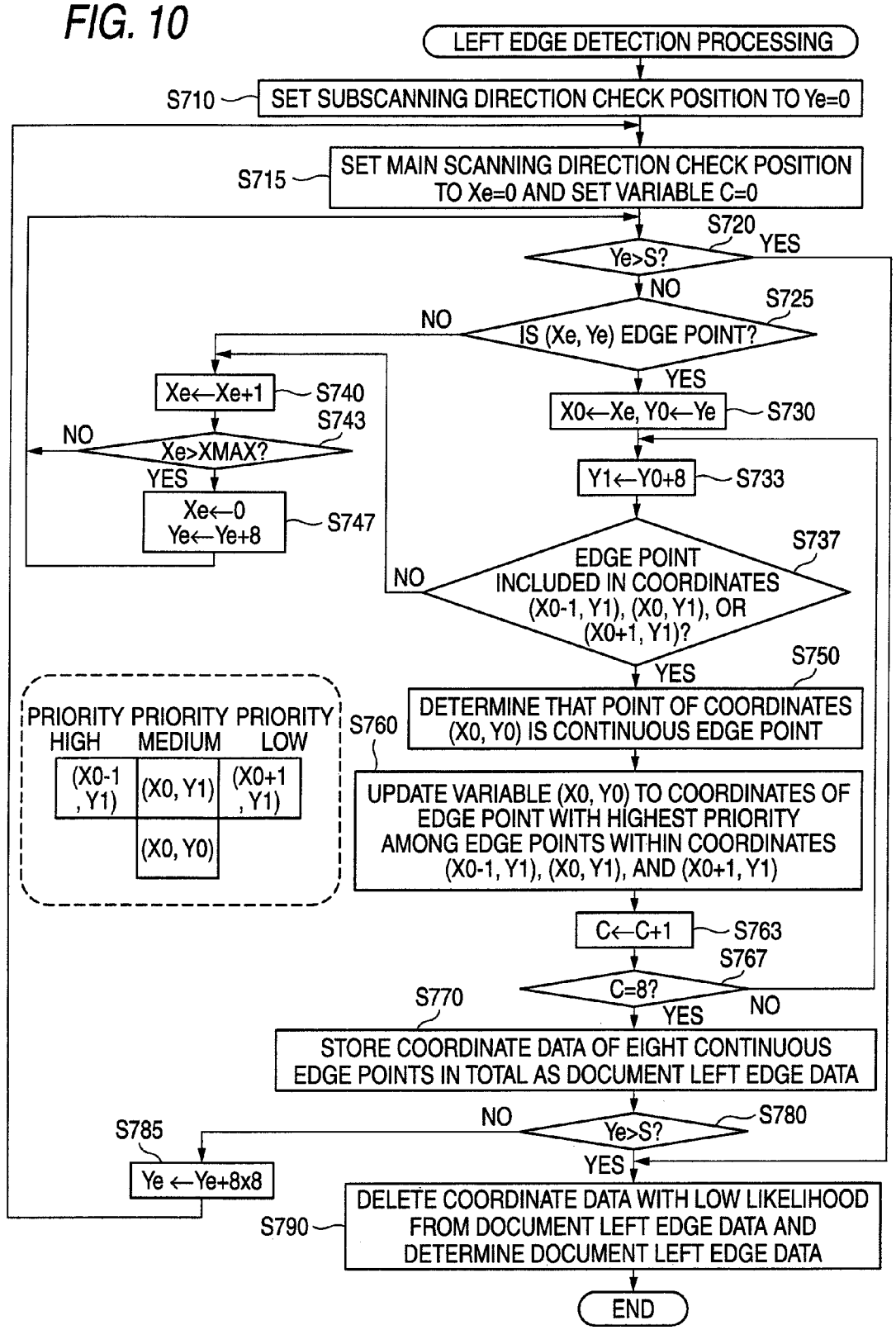
FIG. 10 is a flowchart to represent left edge detection processing executed by the CPU.

Referring again to FIG. 5, at S440 of the document estimation processing, if the CPU 70 determines that the right edge approximate line is inclined larger than the predetermined angle with respect to the Y axis (YES at S440), the CPU 70 goes to S450 and executes left edge detection processing shown in FIG. 10. FIG. 10 is a flowchart to represent the left edge detection processing executed by the CPU 70.

When starting the left edge detection processing, the CPU 70 sets the subscanning direction check position Ye to 0 (Ye=0) at S710 and sets the main scanning direction check position Xe to the left end X coordinate of the readable area R0 (Xe=0) and also initializes the variable C to a value of zero (C=0) at S715.

Then, the CPU 70 determines whether or not the subscanning direction check position Ye exceeds the check range (namely, Ye>S) (S720). If the CPU 70 determines that the subscanning direction check position Ye does not exceed the check range (NO at S720), the CPU 70 references the pixel value of the check target data corresponding to the check position (X, Y)=(Xe, Ye) and determines whether or not the check position (Xe, Ye) is an edge point (S725).

If the CPU 70 determines that the check position (Xe, Ye) is not an edge point (NO at S725), the CPU 70 goes to S740 and updates the main scanning direction check position Xe to a position with one pixel moved in the X axis plus direction from the main scanning direction check position Xe (Xe<-Xe+1) and determines whether or not the updated main scanning direction check position Xe protrudes from the right end of the readable area R0. Specifically, the CPU 70 determines whether or not Xe>MAX (S743). If the CPU 70 determines that the main scanning direction check position Xe does not protrude from the right end of the readable area R0 (NO at S743), the CPU 70 goes to S720.

In contrast, if the CPU 70 determines at S743 that the main scanning direction check position Xe protrudes from the right end of the readable area R0 (Xe>MAX), the CPU 70 goes to S747 and sets the main scanning direction check position Xe to the left end of the readable area R0 (Xe=0) and updates the subscanning direction check position Ye to a position with eight pixels advanced in the Y axis direction from the subscanning direction check position Ye (Ye<-Ye+8). Then, the CPU 70 goes to S720.

If the CPU 70 determines that the check position (Xe, Ye) is an edge point (YES at S725), the CPU 70 goes to S730 and sets the coordinate value of the current check position (Xe, Ye) in the variable (X0, Y0) (X0<-Xe, Y0<-Ye) and also updates the variable Y1 to value Y1=Y0+8 (S733).

Then, the CPU 70 determines whether or not at least one of the point of coordinates (X0−1, Y1), the point of coordinates (X0, Y1), and the point of coordinates (X0+1, Y1) is an edge point (S737), If none of the point of coordinates (X0−1, Y1), the point of coordinates (X0, Y1), and the point of coordinates (X0+1, Y1) is an edge point (NO at S737), the CPU 70 goes to S740.

In contrast, if the CPU 70 determines that at least one of the point of coordinates (X0−1, Y1), the point of coordinates (X0, Y1), and the point of coordinates (X0+1, Y1) is an edge point (YES at S737), the CPU 70 goes to S750 and determines that the point of coordinates (X0, Y0) is a continuous edge point and temporarily stores the coordinates (X0, Y0) as the coordinate data of the continuous edge point.

After S750, the CPU 70 goes to S760 and selects one edge point from among the point of coordinates (X0−1, Y1), the point of coordinates (X0, Y1), and the point of coordinates (X0+1, Y1) according to predetermined priority.

Specifically, in the left edge detection processing, the coordinates nearer to the left end of the readable area R0 is assigned the higher priority. That is, the point of coordinates (X0−1, Y1) near to the left end of the readable area R0 is assigned priority "high," the point of coordinates (X0, Y1) is assigned priority "medium," and the point of coordinates (X0+1, Y1) is assigned priority "low." The reason why the priority is thus set is that nothing should exist on the document table 11a and no edge point should exist on the left from the left end of the document and that the nearer the edge point to the left end of the readable area R0, the higher the possibility that the edge point may be the edge point corresponding to the left end of the document.

Therefore, at S760, the CPU 70 selects the edge point with the highest priority from among the point of coordinates (X0−1, Y1), the point of coordinates (X0, Y1), and the point of coordinates (X0+1, Y1) according to the priority. The CPU 70 updates the variable X0 to the X coordinate of the selected point and the variable Y0 to the Y coordinate of the selected point. Then, the CPU 70 adds one to the variable C to update the variable C (S763).

After S763, the CPU 70 determines whether or not the post-updated value of the variable C is 8 (C=8). If the CPU 70 determines that the value of the variable C is not 8 (NO at S767), the CPU 70 goes to S733 and updates the variable Y1 to Y1=Y0+8. Then, the CPU 70 executes S737 and the later steps.

According to the processing procedure, the CPU 70 checks whether or not edge points are continuous in the Y axis direction every eight pixels in the Y axis direction as in the right edge detection processing (see FIG. 7). If the CPU 70 determines C=8 (YES at S767), the CPU 70 stores the coordinate data of the eight points in total determined to be continuous edge points at S750 in the RAM 80 as document left edge data (S770).

After S770, the CPU 70 goes to S780 and determines whether or not the subscanning direction check position Ye exceeds the check range (Ye>S). If the CPU 70 determines that the subscanning direction check position Ye does not exceed the check range (NO at S780), the CPU 70 updates the subscanning direction check position Ye to a position with 64 pixels advanced from the subscanning direction check position Ye (S785) and goes to S715.

The CPU 70 thus detects eight continuous edge points at a time repeatedly. When the subscanning direction check position Ye exceeds the check range (YES at S720 or YES at S780), the CPU 70 goes to S790 and deletes the coordinate data with low likelihood as the left edge (edge points representing the left end of the document) from the coordinate data stored as the document left edge data at S770 and determines the document left edge data.

Specifically, as at S590, obviously discontinuous coordinate data at a position largely shifting to the document inside area relative to the continuous coordinate data among the coordinate data stored as the document left edge data is deleted from the document left edge data and the document left edge data is determined. Then, the left edge detection processing is exited. However, S790 may be skipped in the left edge detection processing.

When thus exiting the left edge detection processing, the CPU 70 returns to the document estimation processing and goes to S455. The CPU 70 approximates the points indicated by the document left edge data determined in the left edge detection processing to a line and calculates an approximate line of the points indicated by the document left edge data (which will be hereinafter referred to as "left edge approximate line"). Then, the CPU 70 goes to S460.

However, if there is no coordinate data registered as the document left edge data in the immediately preceding left edge detection processing, the CPU 70 determines that the left edge detection results in failure and goes to S460 without calculating the left edge approximate line. In addition, if all or a part of the coordinate data registered as the document left edge data is also registered as the document right edge data, it may be assumed that the coordinate data of the right edge (edge points representing the right end of the document) is erroneously registered as the document left edge data and even if there is coordinate data registered as the document left edge data, it may be determined that the left edge detection results in failure and the CPU 70 may go to S460 without calculating the left edge approximate line.

Figure 11:
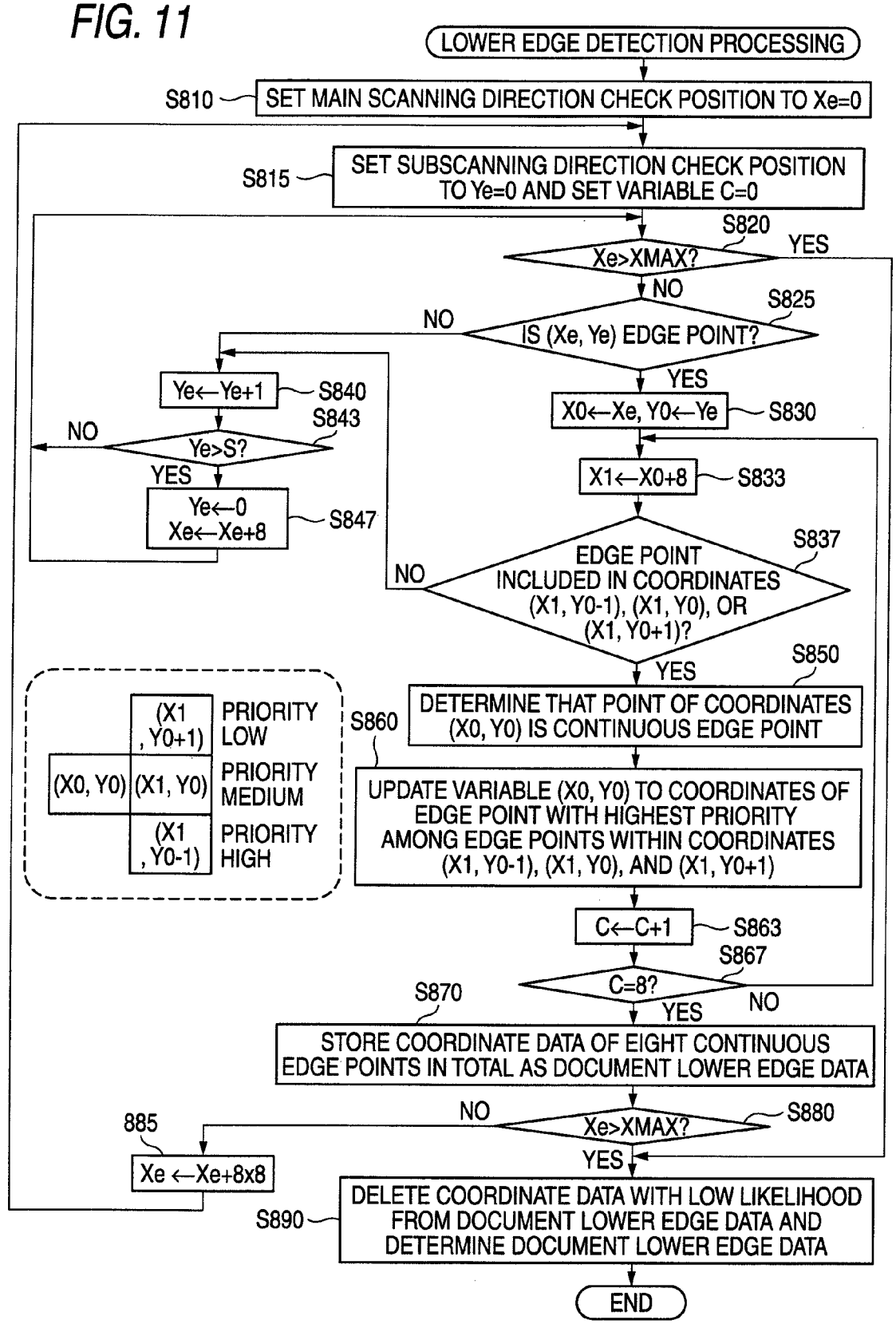
FIG. 11 is a flowchart to represent lower edge detection processing executed by the CPU.

At S460, the CPU 70 executes lower edge detection processing shown in FIG. 11. FIG. 11 is a flowchart to represent the lower edge detection processing executed by the CPU 70.

When starting the lower edge detection processing, the CPU 70 sets a main scanning direction check position Xe to the left end X coordinate of the readable area R0 (Xe=0) at S810 and sets a subscanning direction check position Ye to the lower end Y coordinate of the readable area R0 (Ye=0) at S 815. The CPU 70 also initializes the variable C to a value of zero (C=0) at S815.

Then, the CPU 70 determines whether or not the main scanning direction check position Xe exceeds the right end of the readable area R0 (namely, Xe>MAX) (S820). If the CPU 70 determines that the main scanning direction check position Xe does not exceed the right end of the readable area R0 (NO at S820), the CPU 70 references the pixel value of the check target data corresponding to the check position (X, Y)=(Xe, Ye) and determines whether or not the check position (Xe, Ye) is an edge point (S825).

If the CPU 70 determines that the check position (Xe, Ye) is not an edge point (NO at S825), the CPU 70 goes to S840 and updates the subscanning direction check position Ye to a position with one pixel moved in the Y axis plus direction from the subscanning direction check position Ye (Ye<-Ye+1) and determines whether or not the post-updated subscanning direction check position Ye exceeds the check range (Ye>S) (S843).

If the CPU 70 determines that the subscanning direction check position Ye does not exceed the check range (NO at S843), the CPU 70 goes to S820.

In contrast, if the CPU 70 determines at S843 that the subscanning direction check position Ye exceeds the check range (Ye>S), the CPU 70 goes to S847 and sets the subscanning direction check position Ye to the lower end of the readable area R0 (Ye=0) and also sets the main scanning direction check position Xe to a position with eight pixels advanced in the X axis direction from the main scanning direction check position Xe (Xe<-Xe+8). Then, the CPU 70 goes to S820.

In addition, if the CPU 70 determines that the check position (Xe, Ye) is an edge point (YES at S825), the CPU 70 goes to S830 and sets the coordinate value of the current check position (Xe, Ye) in the variable (X0, Y0) (X0<-Xe, Y0<-Ye). The CPU 70 also updates a variable X1 to value X1=X0+8 (S833).

Then, the CPU 70 determines whether or not at least one of the point of coordinates (X1, Y0−1), the point of coordinates (X1, Y0), and the point of coordinates (X1, Y0+1) is an edge point (S837). If none of the point of coordinates (X1, Y0−1), the point of coordinates (X1, Y0), and the point of coordinates (X1, Y0+1) is an edge point (NO at S837), the CPU 70 goes to S840.

In contrast, if the CPU 70 determines that at least one of the point of coordinates (X1, Y0−1), the point of coordinates (X1, Y0), and the point of coordinates (X1, Y0+1) is an edge point (YES at S837), the CPU 70 goes to S850 and determines that the point of coordinates (X0, Y0) is a continuous edge point and temporarily stores the coordinates (X0, Y0) as the coordinate data of the continuous edge point.

After S850, the CPU 70 goes to S860 and selects one edge point from among the point of coordinates (X1, Y0−1), the point of coordinates (X1, Y0), and the point of coordinates (X1, Y0+1) according to predetermined priority.

Specifically, in the lower edge detection processing, the coordinates nearer to the lower end of the readable area R0 is assigned the higher priority. That is, the point of coordinates (X1, Y0−1) near to the lower end of the readable area R0 is assigned priority "high," the point of coordinates (X1, Y0) is assigned priority "medium," and the point of coordinates (X1, Y0+1) is assigned priority "low."

The reason why the priority is thus set is that nothing should exist on the document table 11*a* and no edge point should exist below the lower end of the document and that the nearer the edge point to the lower end of the readable area R0, the higher the possibility that the edge point may be the edge point corresponding to the lower end of the document.

Therefore, at S860, the CPU 70 selects the edge point with the highest priority from among the point of coordinates (X1, Y0−1), the point of coordinates (X1, Y0), and the point of coordinates (X1, Y0+1) according to the priority. The CPU 70 updates the variable X0 to the X coordinate of the selected point and the variable Y0 to the Y coordinate of the selected point. Then, the CPU 70 adds one to the variable C to update the variable C (S863).

After S863, the CPU 70 determines whether or not the post-updated value of the variable C is 8 (C=8) (S867). If the CPU 70 determines that the value of the variable C is not 8 (NO at S867), the CPU 70 goes to S833 and updates the variable X1 to X1= X0+8. Then, the CPU 70 executes S837 and the later steps.

The CPU 70 executes the processing, thereby checking whether or not edge points are continuous in the X axis direction every eight pixels in the X axis direction. If the CPU 70 determines C=8 (YES at S867), the CPU 70 stores the coordinate data of the eight points in total determined to be continuous edge points at S850 in the RAM 80 as document lower edge data (S870).

After S870, the CPU 70 goes to S880 and determines whether or not the main scanning direction check position Xe exceeds the right end of the readable area R0 (Xe>XMAX). If the CPU 70 determines that the main scanning direction check position Xe does not exceed the right end of the readable area R0 (NO at S880), the CPU 70 updates the main scanning direction check position Xe to a point with 64 pixels advanced from the main scanning direction check position Xe (S885) and goes to S815.

The CPU 70 thus detects eight continuous edge points at a time repeatedly. When the main scanning direction check position Xe exceeds the right end of the readable area R0 (YES at S820 or YES at S880), the CPU 70 goes to S890 and deletes the coordinate data with low likelihood as the lower edge (edge points representing the lower end of the document) from the coordinate data stored as the document lower edge data at S870 and determines the document lower edge data.

Specifically, as at step S590, obviously discontinuous coordinate data at a position largely shifting to the document inside area relative to the continuous coordinate data among the coordinate data stored as the document lower edge data is deleted from the document lower edge data and the document lower edge data is determined. Then, the lower edge detection processing is exited. However, S890 may be skipped in the lower edge detection processing.

When thus exiting the lower edge detection processing, the CPU 70 returns to the document estimation processing and goes to S465. The CPU 70 approximates the points indicated by the document lower edge data determined in the lower edge detection processing to a line and calculates an approximate line of the points indicated by the document lower edge data (which will be hereinafter referred to as "lower edge approximate line"). Then, the CPU 70 goes to S470. However, if there is no coordinate data registered as the document lower edge data in the immediately preceding lower edge detection processing, the CPU 70 determines that the lower edge detection results in failure and goes to S470 without calculating the lower edge approximate line.

At S470, the CPU 70 determines whether or not the document edges are detected correctly in the right edge detection processing (S420), the left edge detection processing (S450), and the lower edge detection processing (S460) from the correlation among the right edge approximate line, the left edge approximate line, and the lower edge approximate line. That is, the CPU 70 determines whether or not all of the right edge, the left edge, and the lower edge are normally detected.

Specifically, if the right edge approximate line and the left edge approximate line are parallel with each other, the right edge approximate line and the lower edge approximate line are orthogonal to each other, and the left edge approximate line and the lower edge approximate line are orthogonal to each other, it is assumed mat the document edges are detected correctly and the determination at S470 is YES.

In contrast, if detection of any of the right edge, the left edge, or the lower edge results in failure or if the relationship among the right edge, the left edge, and the lower edge is not correct, the determination at S470 is NO. That is, it is assumed that the document edges are not correctly detected and the determination at S470 is NO except for the case where the right edge approximate line and the left edge approximate line are parallel with each other, the right edge approximate line and the lower edge approximate line are orthogonal to each other, and the left edge j approximate line and the lower edge approximate line are orthogonal to each other. However, the determination of the correlation should be executed considering an error.

If the CPU 70 determines that the document edges are not correctly detected (NO at S470), the CPU 70 goes to S471 and makes a "failure" determination. Then, at S473, the CPU 70 estimates that the size of the document placed on the document table 11*a* is the preset basic size as at S670. Then, the CPU 70 exits the document estimation processing, returns to tire automatic scaling copy processing, and executes S230 and tire later steps, thereby setting the read area, etc., based on the information of the document size estimated at S473 (S265) and realizing the copy operation at scaling factor 1 and with inclination correction amount zero.

Figure 12:
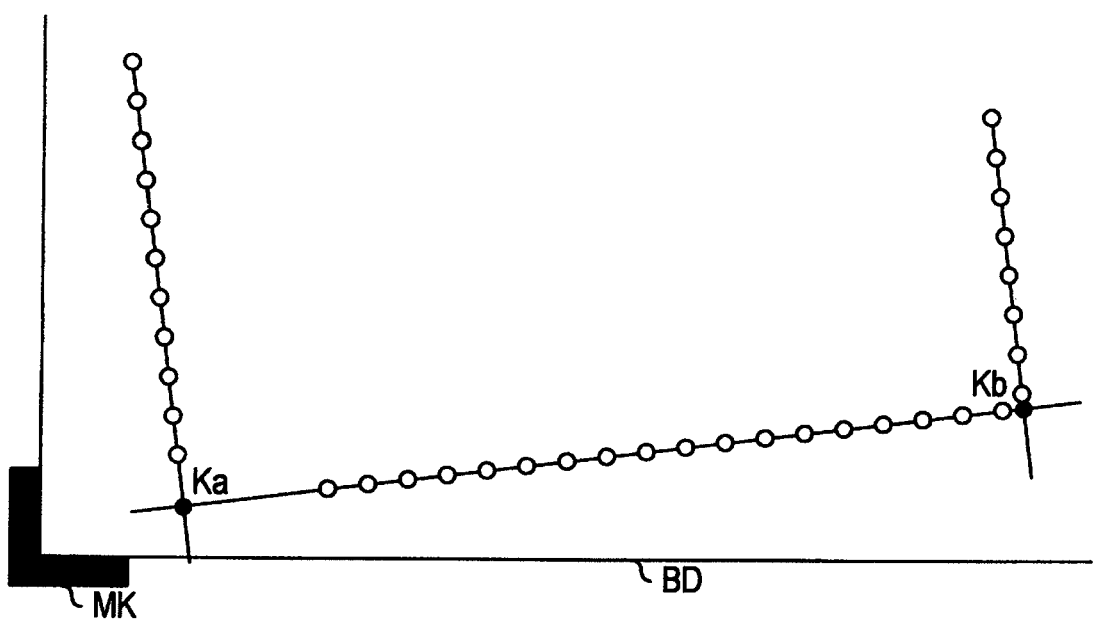
FIG. 12 is a schematic representation to show an estimation method of a document lower-left corner position and a document lower-right corner position.

In contrast, if the CPU 70 determines that the document edges are detected correctly (YES at S470), the CPU 70 goes to S481 and estimates that the lower-left corner position of the document is the intersection point of the left edge approximate line and the lower edge approximate line and calculates the coordinate value of the position (S483). FIG. 12 is a schematic representation to show an estimation method of a document lower-left corner position Ka and a document lower-right corner position Kb at S481 and S483. In the figure, an open circle represents art edge point and filled circles represent the corner positions Ka and Kb.

After S483, tire CPU 70 goes to S485 and estimates the document area in the check target data as at S445 from the relationship between tire lower-left corner position and the lower-right corner position of the document estimated as described above.

Figure 9C:
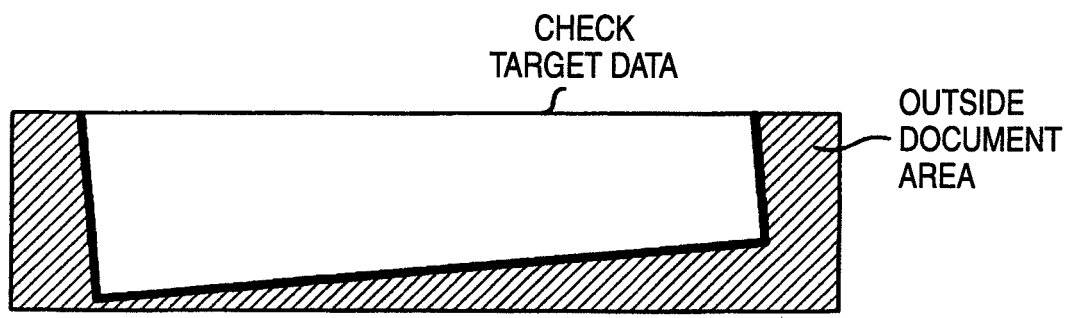

Specifically, at S485, the area in the check target data surrounded by the line of the lower edge approximate line from the point corresponding to the lower-left corner position of the document to the point corresponding to the lower-right corner position of the document, the line of the right edge approximate line from the point corresponding to the lower-right corner position of the document to the end margin of the check target data in the Y axis plus direction, and the line of the left edge approximate line from the point corresponding to the lower-left corner position of the document to the end margin of the check target data in the Y axis plus direction is estimated to be the document area (see FIG. 9C).

After S485, the CPU 70 goes to S490 and executes the document estimation subprocessing shown in FIG. 9A as at S447.

That is, at S610, the CPU 70 calculates the occupation ratio of the edge points in the area outside the document area of the check target data based on the information j of the document area estimated at S485. However, at S610 of the document estimation subprocessing executed at S490, to calculate the occupation ratio according to the calculation expression, the number of the edge points outside the document area and registered in any of the document right edge data, the document left edge data, or the document lower edge data is not contained in the "number of edge points outside document area" mentioned above. That is, at S610, exceptionally, the edge points registered in any of the document right edge data, the document left edge data, or the document lower edge data are not counted as the number of the edge points outside the document area even if the edge points exist outside the document area.

FIG. 9C is a schematic representation to show a specific example of the area of the check target data handled as the area outside the document area in the document estimation subprocessing executed at S490 as the area is hatched.

After S610, the CPU 70 determines whether or not the occupation ratio calculated at S610 is equal to or less than the threshold value (S620). If the CPU determines that the calculated occupation ratio is equal to or less than the threshold value (YES at S620), the CPU 70 evaluates the likelihood of the document area estimated at S485 as high and makes a determination of "likelihood high" (S630). If the CPU 70 makes a determination of "likelihood high" at S630, the CPU 70 makes a determination of YES at S245.

After S630, the CPU 70 goes to S640. At S640, assuming mat the line connecting the lower-left corner position and the lower-right corner position of the document estimated at S481 and S483 is the short side of tire document and that the document placed on the document table 11a is a blank form, the CPU 70 estimates the size of the document placed on the document table 11a and the placement area of the document on the document table 11a and also estimates the inclination angle θ of the document placed on the document table 11a based on the right edge approximate line (S650). That is, at S650, the CPU 70 estimates that the angle of the right edge approximate line with respect to the Y axis is the inclination angle θ of the document. Then, the CPU 70 exits the document estimation subprocessing.

In contrast, if the CPU 70 determines that the occupation ratio calculated at S610 exceeds the threshold value (NO at S620), the CPU 70 evaluates the likelihood of the previously estimated document area as low and makes a determination of "likelihood low" (S660) and estimates that the size of the document placed on the document table 11a is the preset basic size without using tire information of the lower-left and lower-right corner positions estimated at S481 and S483 (S670). Then, the CPU 70 exits the document estimation subprocessing. If the CPU 70 makes a determination of "likelihood low" at S660, the CPU 70 makes a determination of NO at S245.

When thus exiting the document estimation subprocessing at S490, the CPU 70 also exits the document estimation processing at S220, returns to the automatic scaling copy processing, goes to S230, and executes the subsequent processing.

As the CPU 70 performs the operation, if the likelihood of the document area estimated from the edge image data (check target data) provided by prescanning is high, the CPU 70 estimates the size of the document placed on tire document table 11a and the inclination angle θ of the document tabled on the information of the lower-left and lower-right corner positions of the document estimated according to the edge image data on the assumption that the document is a black form. Based on the estimation result, the CPU 70 sets the scaling factor and the inclination correction amount (S251 and S253) and further sets the read area (S255). Then, the CPU 70 goes to S270 (scanning).

In the scanning (S270), the CPU 70 conveys the read unit 15 in the setup read area and reads an image reflected on the read area through the read unit 15. The CPU 70 performs scaling up or down processing of the read result in response to the setup scaling factor and performs rotation processing in response to the setup inclination correction amount to generate image data for print. The CPU 70 uses the image data as print data and executes print processing, thereby printing a copy image of the document automatically scaled up or down and further subjected to the inclination correction on the record sheet through the print unit.

In contrast, if the likelihood of the document area estimated from the edge image data provided by prescanning is low, the CPU 70 estimates that the document is a document of the basic size (S670). Assuming that the lower-left corner of the document is matched with the lower-left corner of the document table 11a and the document is placed thereon straightly and precisely, the CPU 70 sets the inclination correction amount to zero (S263) and further sets the scaling factor to 1 so as to turn off the automatic scaling function (S261).

The CPU 70 sets the read area conforming to the estimated document size (S265) and goes to S270 (scanning). A copy image of the document is printed on the record sheet at the scaling factor 1 through the print unit 30.

The configuration of the digital multi-function device 1 of the exemplary embodiment has been described. In the multi-function device 1 of the exemplary embodiment a partial area of the readable area R0 is prescanned and the document state (the document size, the document inclination, and the document placement area) is estimated based on the read result. Therefore, according to the exemplary embodiment, the prescanning operation can be completed at higher speed than tire prescanning technique of the whole readable area R0 as former and the document, state can be estimated efficiently.

However, if the technique of prescanning the partial area rather than the whole readable area R0 is adopted, it becomes impossible to read the whole image of the document by prescanning and there is a possibility that the estimation accuracy of the document state may worsen.

Then, in the exemplary embodiment, as described above, the likelihood of the document area estimated from the edge image data provided by prescanning is evaluated and if the likelihood is high, the document size (height×width) is estimated from the information of the position coordinates of the lower-left and lower-right corners of the document on which deriving of tire document area is based; if the likelihood is low, it is estimated that the document size is the size predetermined by the user.

Therefore, according to the exemplary embodiment, if an error occurs in the estimation of the document area in the presence of a pattern of a ruled line, etc., drawn in a document in the process in which the document area is estimated from the edge image data, the mode can be switched appropriately and processing matching the user's desire (user-specified size) can be executed. Therefore, according to the exemplary embodiment, execution of copy operation unnecessary for the user as an erroneous scaling factor and an erroneous read area are set because of erroneous estimation can be suppressed. Thus, according to the exemplary embodiment, the multi-function device 1 highly convenient for the user can be provided.

In the exemplary embodiment, when determination of "likelihood low" is made at S660, the CPU 70 goes to S670 without informing the user of the fact. However, at S660, the user may be informed that determination of "likelihood low" is made through a display of the display and operation unit 50.

In addition, at S660, the following sequence may be adopted: The user is informed that determination of "likelihood low" is made through the display of the display and operation unit 50 and the user is also requested to make an answer as to whether or not to continue the subsequent processing. If the user enters an answer of continuing the subsequent processing through the operation key, the CPU 70 goes to S670; if the user enters an answer of skipping the subsequent processing through the operation key, the CPU 70 does not go to S670 and terminates the copy control processing corresponding to the copy command leading to S660 and invalidates the copy command.

Figure 13A:
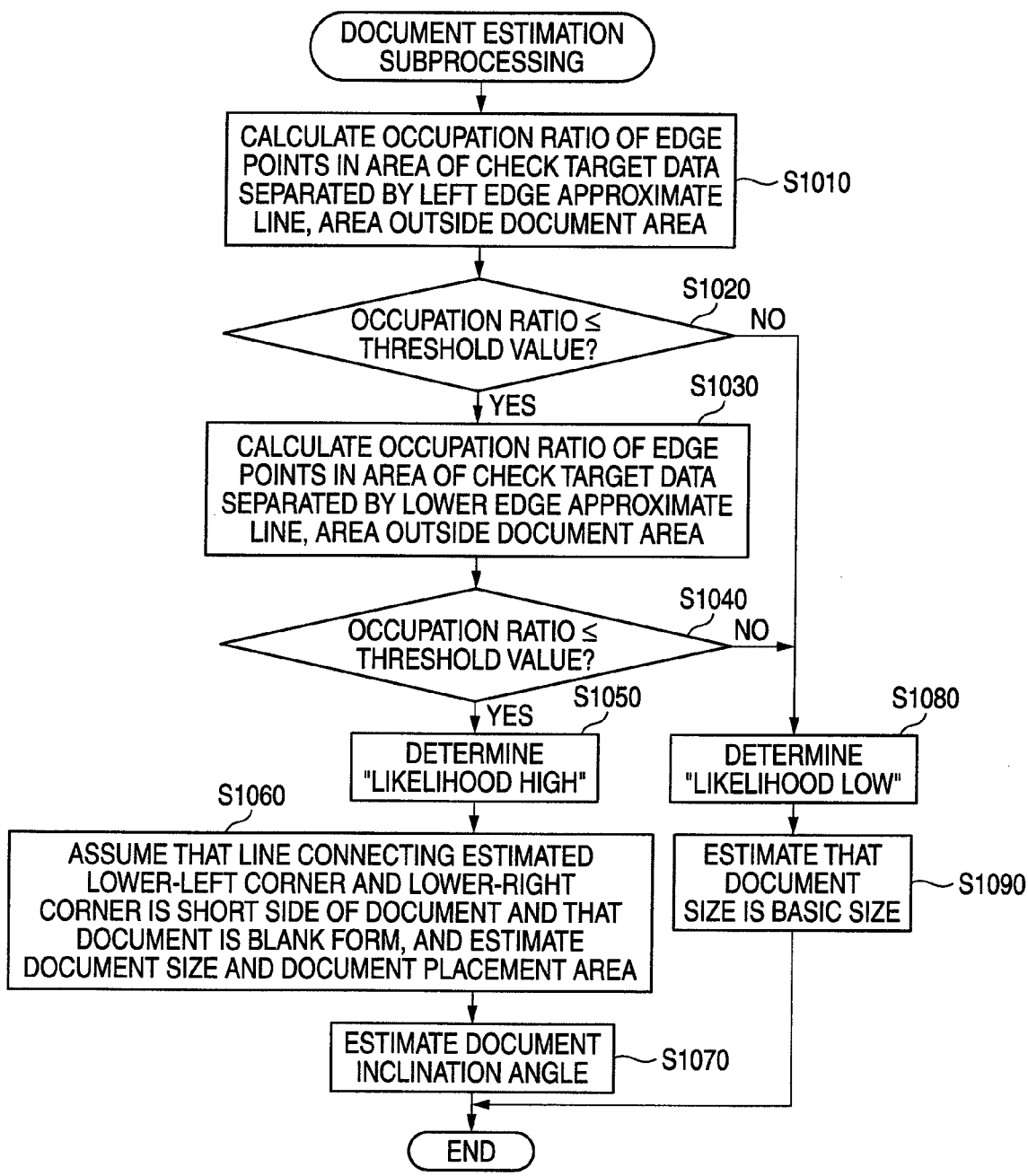
FIG. 13A is a flowchart to represent document estimation subprocessing in a modified example of the first exemplary embodiment of the invention, executed by the CPU.

The document estimation subprocessing executed at S490 may be changed to processing shown in FIG. 13A.

(Modified Example of First Exemplary Embodiment)

Figure 13B:
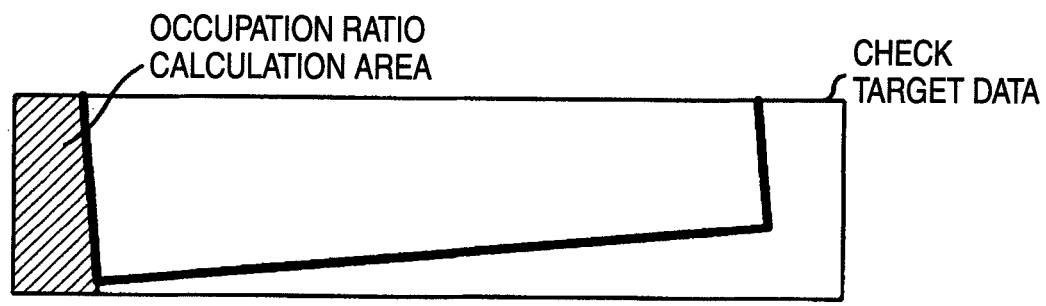
FIGS. 13B and 13C are schematic representations relevant to an occupation ratio calculation area.

FIG. 13A is a flowchart to represent the document estimation subprocessing of a modified example of the first exemplary embodiment executed at S490 by the CPU 70. When starting the document estimation subprocessing shown in FIG. 13A, the CPU 70 sets an area of check target data separated by the left edge approximate line estimated at S450, the area outside the document area to an occupation ratio calculation area, and calculates the occupation ratio of the edge points in the occupation ratio calculation area (S1010). FIG. 13B is a schematic representation to show a specific example of the occupation ratio calculation area set at S1010, In the figure, the solid line represents the outer margin of the estimated document area and the hatched area represents the occupation ratio calculation area.

Specifically, at S1010, the occupation ratio of the edge points in the occupation ratio calculation area is calculated according to a calculation expression of "occupation ratio=number of edge points in occupation ratio calculation area÷total number of pixels in occupation ratio calculation area." However, here, exceptionally, it is assumed that if the edge points registered as the document left edge data are in the occupation ratio calculation area, they are not counted as the number of the edge points in the occupation ratio calculation area. That is, at S1010, it is assumed that the number of the edge points registered as the document left edge data and existing in the occupation ratio calculation area is not contained in the "number of edge points in occupation ratio calculation area" in the expression mentioned above.

After S1010, the CPU 70 determines whether or not the occupation ratio calculated at S1010 is equal to or less than a predetermined threshold value (S1020). If the CPU 70 determines that the calculated occupation ratio exceeds the threshold value (NO at S1020), the CPU 70 goes to S1080 and executes subsequent steps S1080 and S1090 similar to S660 and S670 described above. Then, the CPU 70 exits the document estimation subprocessing.

In contrast, if the CPU determines that the calculated occupation ratio is equal to or less than the threshold value (YES at S1020), the CPU 70 goes to S1030 and sets an area of check target data separated by the lower edge approximate line estimated at S460, the area outside the document area to an occupation ratio calculation area, and calculates the occupation ratio of the edge points in the occupation ratio calculation area according to a calculation expression similar to that at S1010 (S1030).

Figure 13C:
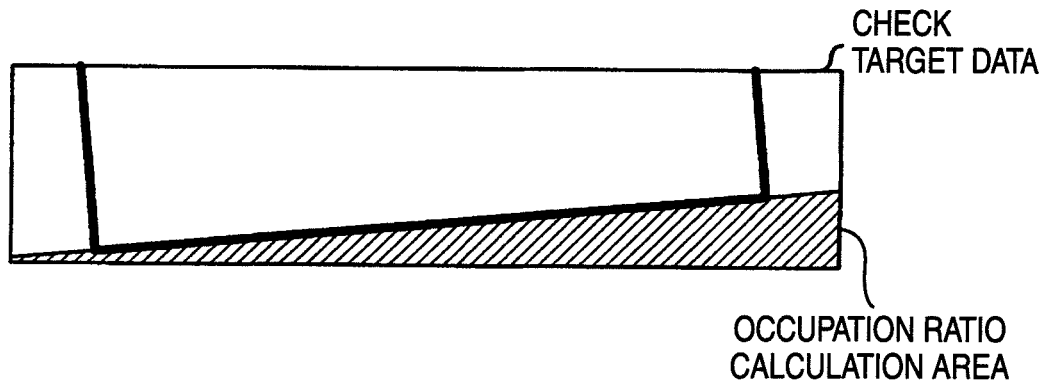

FIG. 13C is a schematic representation to show a specific example of the occupation ratio calculation area set at S1030. In the figure, the solid line represents the outer margin of the estimated document area and the hatched area represents the occupation ratio calculation area. However, here, exceptionally, it is assumed that if the edge points registered as the document lower edge data are in the occupation ratio calculation area, they are not counted as the number of the edge points in the occupation ratio calculation area. That is, at S1030, it is assumed that the number of the edge points registered as the document lower edge data and existing in the occupation ratio calculation area is not contained in the "number of edge points in occupation ratio calculation area" in the expression mentioned above.

After S1030, the CPU 70 determines whether or not the occupation ratio calculated at S1030 is equal to or less than a predetermined threshold value (S1040). If the CPU 70 determines that the calculated occupation ratio exceeds the threshold value (NO at S1040), the CPU 70 goes to S1080 and executes subsequent steps S1080 and S1090 similar to S660 and S670 described above. Then, the CPU 70 exits the document estimation subprocessing.

In contrast, if the CPU determines that the calculated occupation ratio is equal to or less than the threshold value (YES at S1040), the CPU 70 goes to S1050 and executes subsequent steps S1050 to S1070 similar to S630 and S650 described above. Then, the CPU 70 exits the document estimation subprocessing.

The document estimation subprocessing of the modified example of the first exemplary embodiment has been described. If the described document estimation subprocessing is executed at S490, a similar advantage to that of the document estimation subprocessing shown in FIG. 9A can be provided for the most part.

The first exemplary embodiment of the invention has been described. In the exemplary embodiment, an extraction unit of the invention is implemented as S215, S420, S450, and S460 executed by the CPU 70, an outer margin recognition unit is implemented as S437, S455, S465, S441 to S445, and S481 to S485, and a likelihood evaluation unit is implemented as S610 to S630, S660, S1010 to S1050, and S1080.

A prescanning unit is implemented as S210 executed by the CPU 70 and the operation of the read control unit 20, a document size estimation unit is implemented as S640, S670, S1060, and S3090, a read area determination unit is implemented as S255 and S265, and a scanning unit is implemented as S270 and the operation of the read control unit 20.

(Second Exemplary Embodiment)

A second exemplary embodiment of tire invention will be discussed. Components similar to those of the first exemplary embodiment are denoted by the same reference numerals and will not be discussed again in detail.

In the second exemplary embodiment, in the document estimation processing in FIG. 4 (S220), assuming that a document placed on a document table 11a is quadrangular, an edge of the document placed on the document table 11a is detected in check target data, the lower-left corner position and the lower-right corner position of the document are estimated from the detection result, an area representing an image of the document in the check target data (which will be hereinafter represented as "document area") is estimated, and the likelihood of the estimated document area is evaluated based on the divergence degree of the document area from the left end margin (left side) of the document table 11a and the divergence degree of the document area from the lower end margin (lower side) of the document table 11a.

In the second exemplary embodiment, an X axis is set to a point at a predetermined distance (3 mm) from the lower end margin of the document table 11a to the inside of the document table 11a and a Y axis is set to a point at the same distance (3 mm) from the left end margin of the document table 11a to the inside of the document table 11a. Thus, a distance D1 of the document area from the Y axis is found as the divergence degree of the document area from the left end margin of the document table 11a, a distance D2 of the document area from the X axis is found as the divergence degree of the document area from the lower end margin of the document table 11a, and the likelihood of the estimated document area is found from the information of the distances (see FIGS. 15A to 15C).

If the likelihood of the document area is high, the size of the document placed on the document table 11a, an inclination angle θ of the document, and the placement area of the document on the document table 11a are estimated from information of the estimated corner positions on the assumption that the document placed on the document table 11a is a blank form. Here, it is assumed that the angle of the lower side of the document with respect to the X axis is the inclination angle θ of the document (see FIG. 8).

In contrast, if the likelihood of the document area is low or if a document edge cannot normally be detected, it is assumed that the document placed on the document table 11a is a document of a predetermined fixed size. At S220, the described processing is executed.

Figure 14:
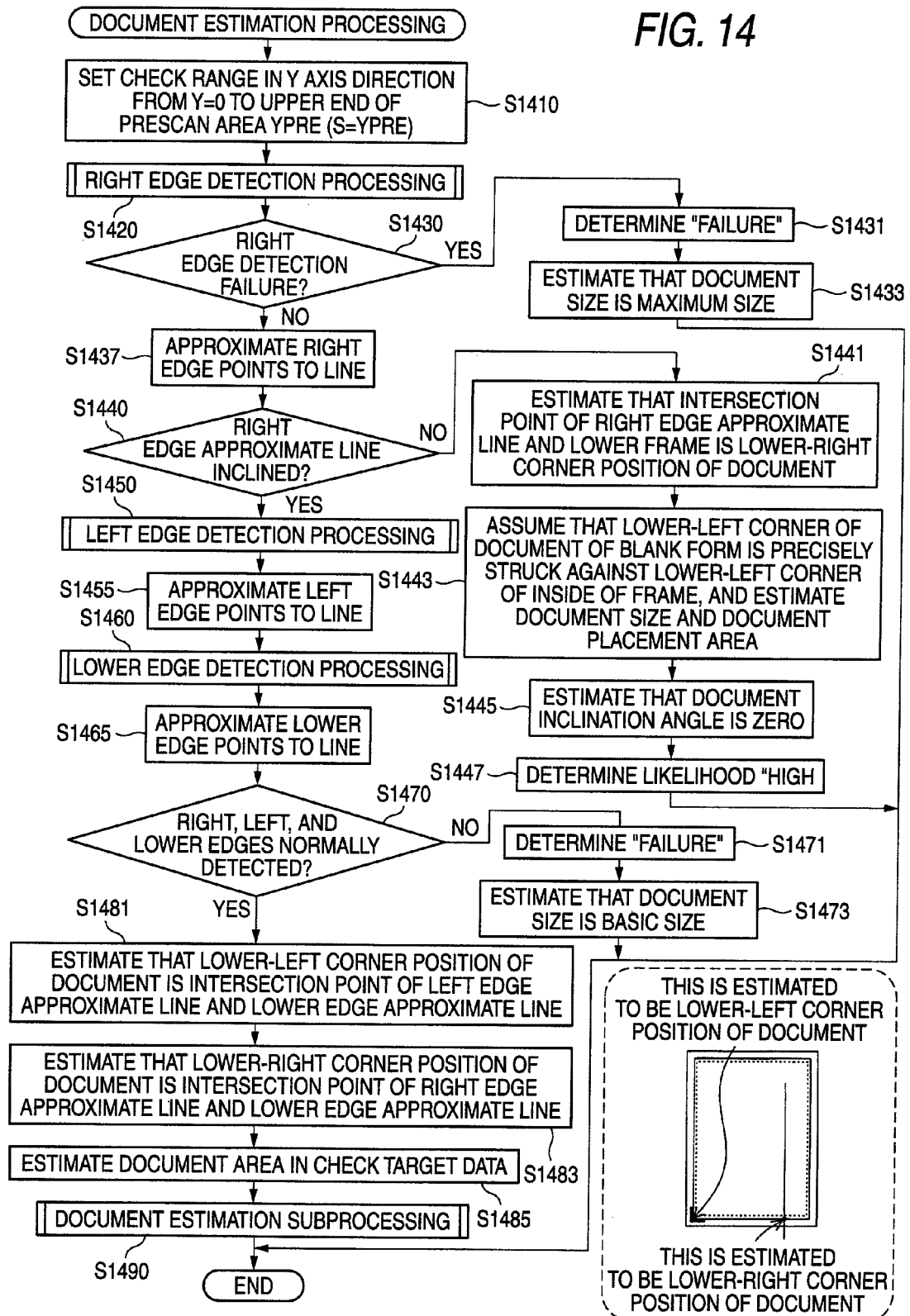
FIG. 14 is a flowchart to represent document estimation processing in a second exemplary embodiment of the invention, executed by a CPU.

Subsequently, document estimation processing of the second exemplary embodiment executed at S220 by a CPU 70 will be discussed with FIG. 14. FIG. 14 is a flowchart to represent the document estimation processing of the second exemplary embodiment executed by the CPU 70.

When starting the document estimation processing, first the CPU 70 executes S1410 to S1440 as at S410 to S440 in the first exemplary embodiment shown in FIG. 5.

At S1440, the CPU 70 determines whether or not the right edge approximate line is inclined larger than a predetermined angle with respect to the Y axis. In the exemplary embodiment, specifically, the CPU 70 determines whether or not the right edge approximate line is inclined larger than 0.5 degrees with respect to the Y axis.

If the CPU 70 determines that the inclination of the right edge approximate line is equal to or less than the predetermined angle (NO at S1440), the CPU 70 estimates that the document is struck against the lower-left corner of the inside of the frame 13a and is placed correctly on the document table 11a, and estimates that the intersection point of the right edge approximate line and the lower end margin of the document table 11a (in other words, the inside of the lower side of a frame 13a (which will be hereinafter represented as "lower frame")) is the lower-right corner position of the document (S1441), as shown at the right of FIG. 14.

After S1441, the CPU 70 estimates that the lower-left corner position of the document is the point of the lower-left corner of the document table 11a (in other words, the lower-left corner of the inside of the frame 13a). Further, the CPU 70 assumes that the line connecting the estimated lower-left corner position and lower-right corner position of the document is the short side of the document and that the document placed on the document table 11a is a blank form, and estimates the size of the document placed on the document table 11a and the placement area of the document on the document table 11a.

That is, the CPU 70 estimates that the length from the estimated lower-left corner position to the estimated lower-right corner position of the document is the short Side length (width) of the document, estimates that √2 times the short side length is the long side length (height) of the document, and estimates the document size. The CPU 70 derives the coordinates of the positions of the upper-left corner and the upper-right corner of the document by assuming that the document of the size mentioned above is placed on the document table 11a based on the estimated lower-left corner position and the estimated lower-right corner position, and estimates that the area in a quadrangle formed by connecting the four concerns is the document placement area. The reason why it is estimated that √2 times the short side length of the document is the long side length of the document is that the ratio of the short side length of the blank form; the long side length is 1:√2.

After S1443, the CPU 70 estimates the inclination angle of the document placed on the document table 11a (S1445). At S1441 and S1443, the corner positions are found by assuming that the document is struck precisely against the lower-left corner of the document table 11a and is placed on the document table 11a. Thus, it is estimated at S1445 that the document inclination angle is zero (no inclination).

Then, the CPU 70 goes to S1447 and makes a determination of "likelihood high." Making a determination of "likelihood high" at S1447 is a formal step to determine YES at S245 of the subsequent processing and go to S251. That is, when the CPU 70 determines NO at S1440, it makes a determination of "likelihood high" at S1447, determines YES at S245, and goes to S251.

After S1447, the CPU 70 exits the document estimation processing (S220), returns to the automatic scaling copy processing, goes to S230, and executes the subsequent processing as in the first exemplary embodiment. That is, based on the information of the document size, the document inclination angle, and the document placement area estimated in the document estimation processing, the CPU 70 sets the scaling factor and the inclination correction amount (S251 and S253) and further sets the read area (S255). Then, the CPU 70 goes to S270 (scanning) and realizes the copy operation.

Referring again to FIG. 14, at S1440 in the document estimation processing, if the CPU 70 determines mat the right edge approximate line is inclined larger than the predetermined angle with respect to the Y axis (YES at S1440), the CPU 70 goes to S1450 and executes the left edge detection processing shown in FIG. 10.

When exiting the left edge detection processing, the CPU 70 returns to the document estimation processing and goes to S1455. The CPU 70 approximates the points indicated by the document left edge data determined in the left edge detection processing to a line and calculates an approximate line of the points indicated by the document left edge data (which will be hereinafter referred to as "left edge approximate line"). Then, the CPU 70 goes to S1460.

However, if there is no coordinate data registered as the document left edge data in the immediately preceding left edge detection processing, the CPU 70 determines that the left edge detection results in failure and goes to S1460 without calculating the left edge approximate line. In addition, if all or a part of the coordinate data registered as the document left edge data is also registered as tire document right edge data, it may be assumed that the coordinate data of the right edge (edge points representing the right end of the document) is erroneously registered as the document left edge data and even if there is coordinate data registered as the document left edge data, it may be determined that the left edge detection results in failure and the CPU 70 may go to S1460 without calculating the left edge approximate line.

At S1460, the CPU 70 executes the lower edge detection processing shown in FIG. 11 as in tire first exemplary embodiment.

When exiting the lower edge detection processing, the CPU 70 returns to the document estimation processing and goes to S1465. The CPU 70 approximates the points indicated by the document lower edge data determined in the lower edge detection processing to a line and calculates an approximate line of the points indicated by the document lower edge data (which will be hereinafter referred to as "lower edge approximate line"). Then, the CPU 70 goes to S1470. However, if there is no coordinate data registered as the document lower edge data in the immediately preceding lower edge detection processing, the CPU 70 determines that the lower edge detection results in failure and goes to S1470 without calculating the lower edge approximate line.

At S1470, the CPU 70 determines whether or not the document edges are detected correctly in the right edge detection processing (S1420), the left edge detection processing (S1450), and the lower edge detection processing (S1460) from the correlation among the right edge approximate line, the left edge approximate line, and the lower edge approximate line as in the first exemplary embodiment. That is, the CPU 70 determines whether or not all of the right edge, the left edge, and the lower edge are normally detected.

If the CPU 70 determines that the document edges are not correctly detected (NO at S1470), the CPU 70 goes to S1471 and makes a "failure" determination. Then, at S1473, the CPU 70 estimates that the size of the document placed on the document table 11a is the preset basic size.

A multi-function device 1 of the second exemplary embodiment is configured so as to be able to previously obtain information of the basic size as setup information through operation of the operation key from tire user. That is, at S1473, the CPU 70 estimates mat the size of the document placed on the document table 11a is the basic document size previously specified by the user.

However, preferably the setup value of the basic size at the product shipment time is preset to the maximum size of the document that can be placed on the document table 11a. Because, if it is estimated that the document size is the maximum size, although the document size differs from the true document size, a smaller read area than the read area corresponding to the true document size is prevented from being set in read area setting operation executed at S265, the whole document placed on the document table 11a can be read in scanning, a copy image of the document can be printed on the record sheet, and it is hard to adversely affect the subsequent processing.

After S1473, the CPU 70 exits the document estimation processing, returns to the automatic scaling copy processing, and executes S230 and the later steps, thereby setting the read area, etc., based on the information of the document size estimated at S1473 (S265) and realizing the copy operation at scaling factor 1 and with inclination correction amount zero.

In contrast, if the CPU 70 determines that the document edges are detected correctly (YES at S1470), the CPU 70 goes to S1481 and estimates that the lower-left corner position of the document is the intersection point of the left edge approximate line and the lower edge approximate line and calculates the coordinate value of the position (S1483). FIG. 12 is a schematic representation to show an estimation method of a document lower-left corner position Ka and a document lower-right corner position Kb at S1481 and S1483. In the figure, an open circle represents an edge point and filled circles represent the corner positions Ka and Kb.

After S1483, the CPU 70 goes to S1485 and estimates the document area in the check target data on the assumption that the document placed on the document table 11a is quadrangular from the relationship between the lower-left corner position and the lower-right corner position of the document estimated as described above.

Figure 15A:
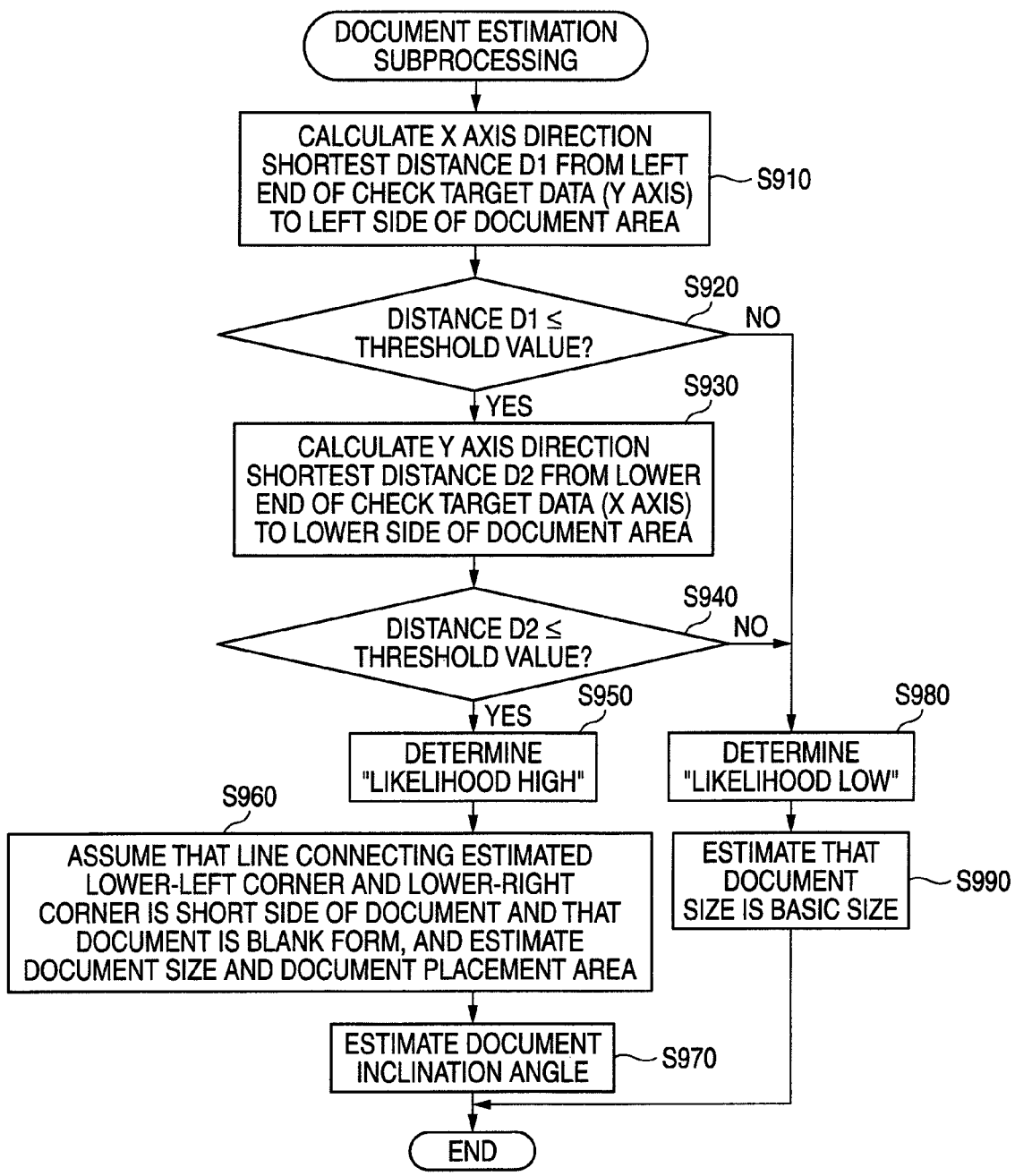
FIG. 15A is a flowchart to represent document estimation subprocessing in the second exemplary embodiment of the invention, executed by the CPU.
Figure 15B:
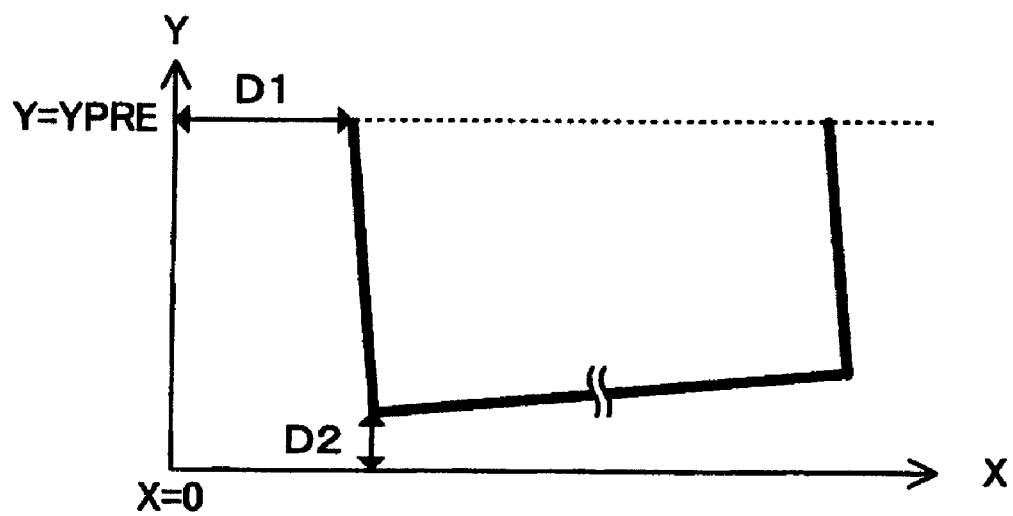
FIGS. 15B and 15C are schematic representations relevant to calculation methods of distances.
Figure 15C:
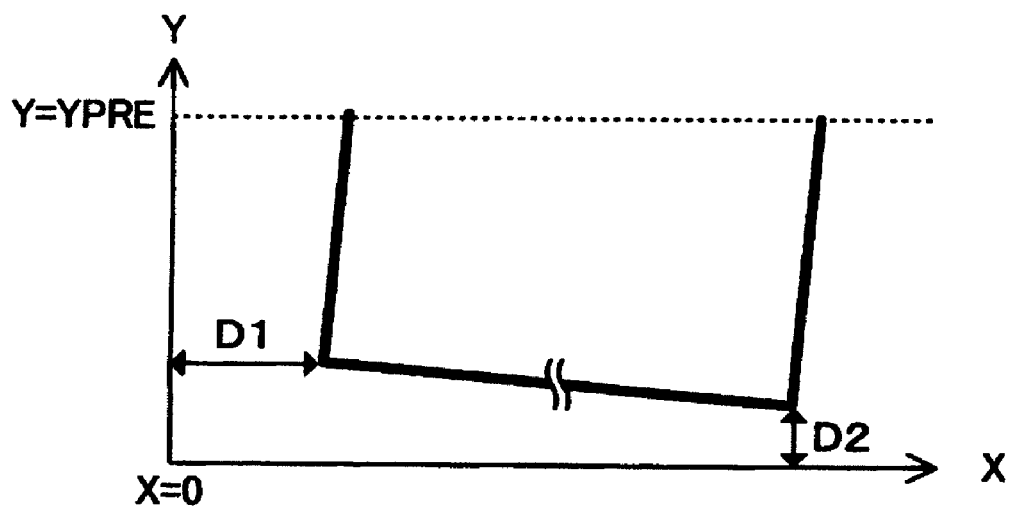

Specifically, at S1485, the area in the check target data surrounded by the line of the lower edge approximate line from the point corresponding to the lower-left corner position of the document to the point corresponding to the lower-right corner position of the document, the line of the right edge approximate line from the point corresponding to the lower-right corner position of the document to the end margin of the check target data in the Y axis plus direction, and tire line of the left edge approximate line from tire point corresponding to the lower-left corner position of the document to the end margin of the check target data in the Y axis plus direction is estimated to be the document area (see FIGS. 15B and 15C).

After S1485, the CPU 70 goes to S1490 and executes the document estimation subprocessing shown in FIG. 15A. FIG. 15A is a flowchart to represent document estimation subprocessing executed by the CPU 70.

When starting the document estimation subprocessing at S1490, first the CPU 70 calculates X axis direction shortest distance D1 from the left end of check target data (in other words, Y axis) to the left side of the document area defined by the line portion of the left edge approximate line (S910).

FIG. 15B is a schematic representation to show a calculation method of distances D1 and D2 when the document is placed as it is inclined to the left on the document table 11a, and FIG. 15C is a schematic representation to show a calculation method of distances D1 and D2 when the document is placed as it is inclined to the right on the document table 11a.

After S910, the CPU 70 determines whether or not the calculated distance D1 is equal to or less than a predetermined threshold value (S920). If the CPU 70 determines that the calculated distance D1 exceeds the threshold value (NO at S920), the CPU 70 goes to S980.

In contrast, if the CPU 70 determines that the calculated distance D1 is equal to or less than the threshold value (YES at S920), the CPU 70 goes to S930 and calculates Y axis direction shortest distance D2 from the lower end of the check target data (in other words, X axis) to the lower side of the document area defined by the line portion of the lower edge approximate line.

Then, the CPU 70 goes to S940 and determines whether or not the calculated distance D2 is equal to or less than a predetermined threshold value. If the CPU 70 determines that the calculated distance D2 exceeds the threshold value (NO at S940), the CPU 70 goes to S980; if the CPU 70 determines that the distance D2 is equal to or less than the threshold value (YES at S940), the CPU 70 goes to S950.

At S950, the CPU 70 evaluates the likelihood of the document area estimated at S1485 as high and makes a determination of "likelihood high," If the CPU 70 makes a determination of "likelihood high" at S950, the CPU 70 makes a determination of YES at S245 in the subsequent processing.

After S950, the CPU 70 goes to S960. At S960, assuming that the line connecting the lower-left corner position and the lower-right corner position of the document estimated at S1481 and S1483 is the short side of the document and that the document placed on the document table 11a is a blank form, the CPU 70 estimates the size of the document placed on the document table 11a and the placement area of the document on the document table 11a and also estimates the inclination angle θ of the document placed on the document table 11a based on tire right edge approximate line (S970).

That is, at S960, the CPU 70 estimates that the length from the estimated lower-left corner position to the estimated lower-right corner position of the document is the short side length (width) of the document, estimates that √2 times the short side length is the long side length (height) of the document, and estimates the document size. The CPU 70 derives the coordinates of the positions of the upper-left corner and the upper-right corner of the document by assuming that the document of the size mentioned above is placed on the document table 11a based on the estimated lower-left corner position and the estimated lower-right corner position, and estimates that the area in a quadrangle formed by connecting the four concerns is the document placement area.

At S970, the CPU 70 estimates that the angle of the right edge approximate line with respect to the Y axis is the inclination angle θ of the document. Then, the CPU 70 exits the document estimation subprocessing.

In contrast, when the CPU 70 goes to S980, it evaluates the likelihood of the document area estimated at S1485 as low and makes a determination of "likelihood low." If the CPU 70 makes a determination of "likelihood low" at S980, the CPU 70 makes a determination of NO at S245 in the subsequent processing.

By the way, the reason why the likelihood of the estimated document area is evaluated as low if either of the distances D1 and D2 exceeds the threshold value is as follows: In the multi-function device 1 of the second exemplary embodiment, a mark MK instructs the user to match the lower-left corner of the document with the lower-left corner of the document table 11a.

That is, in the second exemplary embodiment, the lower end margin of the document table 11a extended from the lower-left corner of the document table 11a and the left end margin of the document table 11a are defined as reference lines with which the sides of a document are to be matched. If the user places a document in accordance with the mark MK, the distances D1 and D2 are calculated each as a value close to zero, of course.

In other words, if the value of the distance D1 or D2 is large, the possibility that edge points of a ruled line, etc., drawn in the document rather than a side of the document may be erroneously detected as a document edge when a document edge is detected is high. Thus, in the second exemplary embodiment, if either of the distances D1 and D2 exceeds the threshold value, the likelihood of the estimated document area is evaluated as low.

If the CPU 70 makes a determination of "likelihood low" at S980 for this reason, the CPU 70 goes to S990 and estimates that the size of the document placed on the document table 11a is the preset basic size as at S1473 without using the information of the lower-left and lower-right corner positions estimated at S1481 and S1483. Then, the CPU 70 exits the document estimation subprocessing.

When thus exiting the document estimation subprocessing at S1490, the CPU 70 also exits the document estimation processing at S220, returns to the automatic scaling copy processing, goes to S230, and executes the subsequent processing.

As the CPU 70 performs the operation, if the likelihood of the document area estimated from the edge image data (check target data) provided by prescanning is high, the CPU 70 estimates the size of the document placed on the document table 11a and the inclination angle θ of the document tabled on the information of the lower-left and lower-right corner positions of the document estimated according to the edge image data on the assumption that the document is a black form (S960 and S970). Based on the estimation result, the CPU 70 sets the scaling factor and the inclination correction amount (S251 and S253) and further sets the read area (S255). Then, the CPU 70 goes to S270 (scanning).

In the scanning (S270), the CPU 70 conveys a read unit 15 in the setup read area and reads an image reflected on the read area through the read unit 15. The CPU 70 performs scaling up or down processing of the read result in response to the setup scaling factor and performs rotation processing in response to the setup inclination correction amount to generate image data for print. The CPU 70 uses the image data as print data and executes print processing, thereby printing a copy image of the document automatically scaled up or down and further subjected to the inclination correction on the record sheet through the print unit.

In contrast, if the likelihood of the document area, estimated from the edge image data provided by prescanning is low, the CPU 70 estimates that the document is a document of the basic size (S990). Assuming that the lower-left corner of the document is matched with the lower-left corner of the document table 11a and the document is placed thereon straightly and precisely, the CPU 70 sets the inclination correction amount to zero (S263) and further sets the scaling factor to 1 so as to turn off the automatic scaling function (S261).

The CPU 70 sets the read area conforming to the estimated document size (S265) and goes to S270 (scanning). A copy image of the document is printed on the record sheet at the scaling factor 1 through a print unit 30.

(Modified Example of Second Exemplary Embodiment)

At S980 in the second exemplary embodiment, the following sequence may be adopted: The user is informed that determination of "likelihood low" is made through the display of a display and operation unit 50 and the user is also requested to make an answer as to whether or not to continue the subsequent processing. If the user enters an answer of continuing the subsequent processing through the operation key, the CPU 70 goes to S990; if the user enters an answer of skipping the subsequent processing through the operation key, the CPU 70 does not go to S990 and terminates the copy control processing corresponding to the copy command leading to S980 and invalidates the copy command.

The second exemplary embodiment of the invention has been described. An extraction unit of the invention is implemented as S215, S1420, S1450, and S1460 executed by the CPU 70, an outer margin recognition unit is implemented as S1437, S1455, S1465, and S1481 to S1485, and a likelihood evaluation unit is implemented as S910 to S950 and S980.

A prescanning unit is implemented as S210 executed by the CPU 70 and the operation of a read control unit 20, a document size estimation unit is implemented as S960 and S990, a read area determination unit is implemented as S255 and S265, and a scanning unit is implemented as S270 and the operation of the read control unit 20.

(Third Exemplary Embodiment)

A third exemplary embodiment of the invention will be discussed. Components similar to those of the first exemplary embodiment are denoted by the same reference numerals and will not be discussed again in detail.

In a multi-function device 1 of a third exemplary embodiment, the lower-left corner of a document table 11a (in other words, the inner lower-left corner of a frame 13a) is defined as the position with which a corner of a document P is to be matched. The multi-function device 1 estimates the document size, etc., and realizes the copy operation of the document on the assumption that the user places the document P so as to be matched with the mark MK for the most part.

In the multi-function device 1 of the third exemplary embodiment, an XY coordinate system wherein the lower-left corner of a readable area R0 corresponding to the lower-left corner of the inside of the frame 13a on which the mark MK is put is an origin, the main scanning direction is an X axis, and the subscanning direction is a Y axis is introduced (see FIG. 2B). The CPU 70 uses the XY coordinate system to execute copy control processing shown in FIG. 16.

Figure 16:
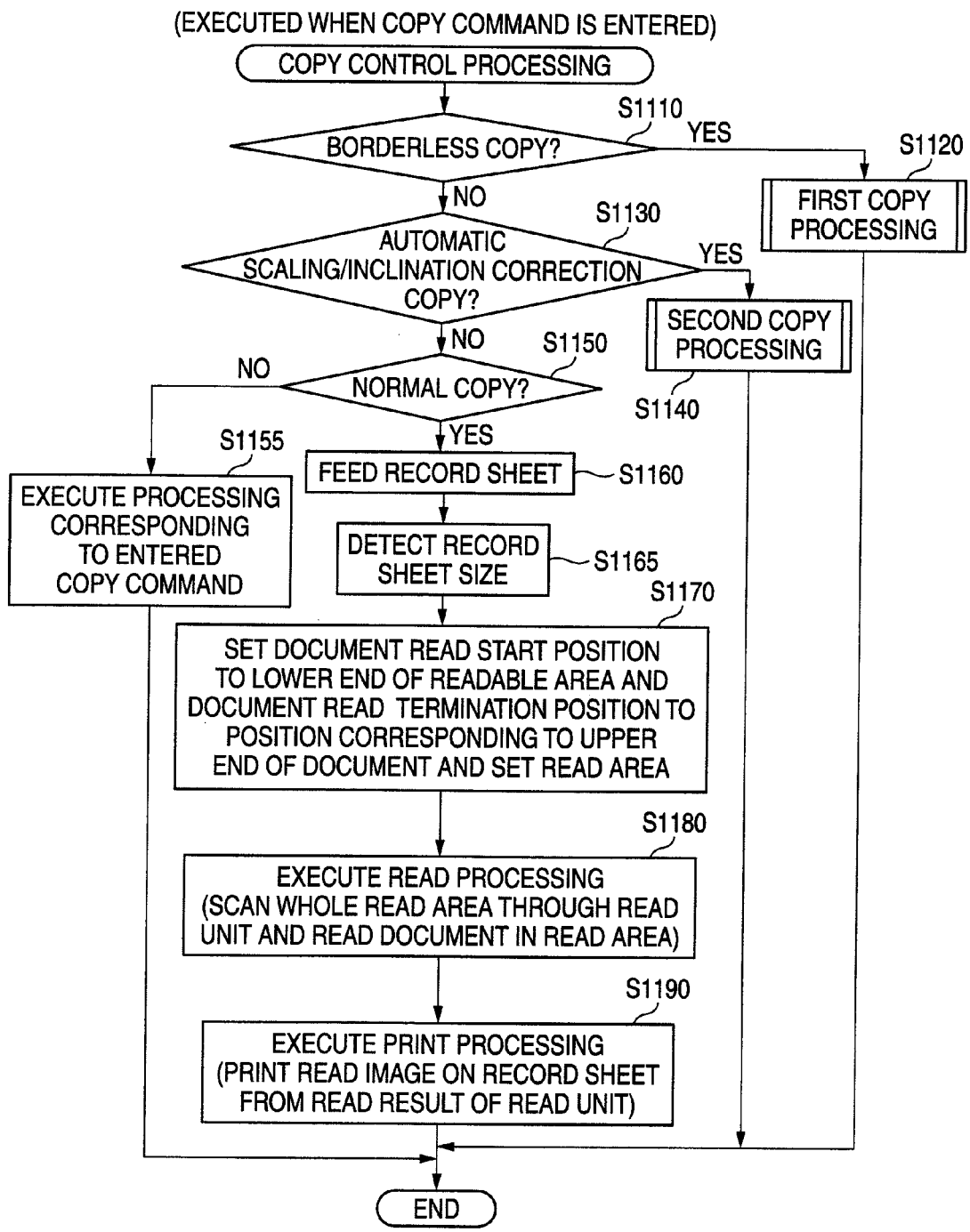
FIG. 16 is a flowchart to represent copy control processing in a third exemplary embodiment of the invention, executed by a CPU.

Subsequently, the copy control processing executed by the CPU 70 will be discussed. FIG. 16 is a flowchart to represent the copy control processing executed by the CPU 70 when the user enters a copy command through the operation key.

When starting the copy control processing, the CPU 70 determines whether or not the copy command entered through the operation key is a "borderless" copy command (S1110). If the CPU 70 determines that the copy command is a "borderless" copy command (Yes at S1110), the CPU 70 goes to S1120 and executes first copy processing shown in FIG. 17A.

Although described later in detail, in the first copy processing, the CPU 70 causes the image read unit 10 to execute the prescanning operation over the whole readable area R0, acquires image data of the read result of the whole readable area R0 as the prescanning result from the image read unit 10, estimates the document size and the inclination angle of the document tabled on the image data, and sets a scaling factor and an inclination correction amount. Then, the CPU 70 causes the image read unit 10 to execute the scanning operation, performs scaling up or down and rotation processing of the image data provided by the scanning operation, and prints a copy image of the document as "borderless" on a record sheet through the print unit 30. When exiting the first copy processing, the CPU 70 completes the copy control processing.

In contrast, if the CPU 70 determines that the copy command is not a "borderless" copy command (NO at S1110), the CPU 70 determines whether or not the copy command is an "automatic scaling/inclination correction" copy command (S1130). If the CPU 70 determines that the entered copy command is an "automatic scaling/inclination correction" copy command (YES at S1130), the CPU 70 executes second copy processing shown in FIG. 17B (S1140).

Although described later in detail, in the second copy processing, the CPU 70 causes the image read unit 10 to execute the prescanning operation in a partial area of the readable area R0, acquires image data of the read result of the document placed in the partial area as the prescanning result from the image read unit 10, estimates the document size and the inclination angle of the document tabled on the image data, and sets a scaling factor and an inclination correction amount. Then, the CPU 70 causes the image read unit 10 to execute the scanning operation, performs scaling up or down and rotation processing of the image data provided by the scanning operation, and prints a copy image of the document subjected to inclination correction on a record sheet in the size corresponding to the record sheet size through the print unit 30. When exiting the second copy processing, the CPU 70 completes the copy control processing.

If the CPU 70 determines that the copy command entered through the operation key is not an "automatic scaling/inclination correction" copy command (NO at S1130), the CPU 70 determines whether or not the entered copy command is a "normal copy" command (S1150). If the CPU 70 determines that the copy command is a "normal copy" command (YES at S1150), the CPU 70 goes to step S1160; if the CPU 70 determines that the copy command is not a "normal copy" command (NO at S1150), the CPU 70 executes the processing corresponding to the entered copy command (S1155) and then completes the copy control processing.

At S1160, the CPU 70 causes the print unit 30 to execute the sheet feed operation through tire print control unit 40 and also detects the size of the fed record sheet (S1165). The size of the record sheet can be detected according to a technique using a sensor provided in the conveying passage of the record sheet, for example.

Then, based on the detection result at S1165, the CPU 70 assumes that the document of the same size as the record sheet size is placed correctly at the specified position on the platen glass 11, and sets the document read start position to the lower end (Y=0) of the readable area R0 and the document read termination position to tire position corresponding to the upper end of the document (S1170). The CPU 70 thus sets the document read start position to the document read termination position in the read area.

Then, the CPU 70 controls the image read unit 10 through the read control unit 20 and causes the image read unit 10 to convey the read unit 15 in the subscanning direction from the document read start position to the document read termination position. While the read unit 15 is conveyed, the CPU 70 causes the read unit 15 to execute the read operation for each line so as to read an image reflected on the read area on the platen glass 11 and record the image data representing the read result of the read area in the RAM 80 (S1180).

Then, the CPU 70 sets the image data representing the read result recorded in the RAM 80 in print data and executes print processing about the print data (S1190). That is, the CPU 70 causes the print unit 30 to print an image based on the print data on the fed record sheet through the print control unit 40. The copy image of tire document is thus printed on the record sheet without scaling up, scaling down, or inclination correction. Then, the copy control processing is completed.

Figure 17A:
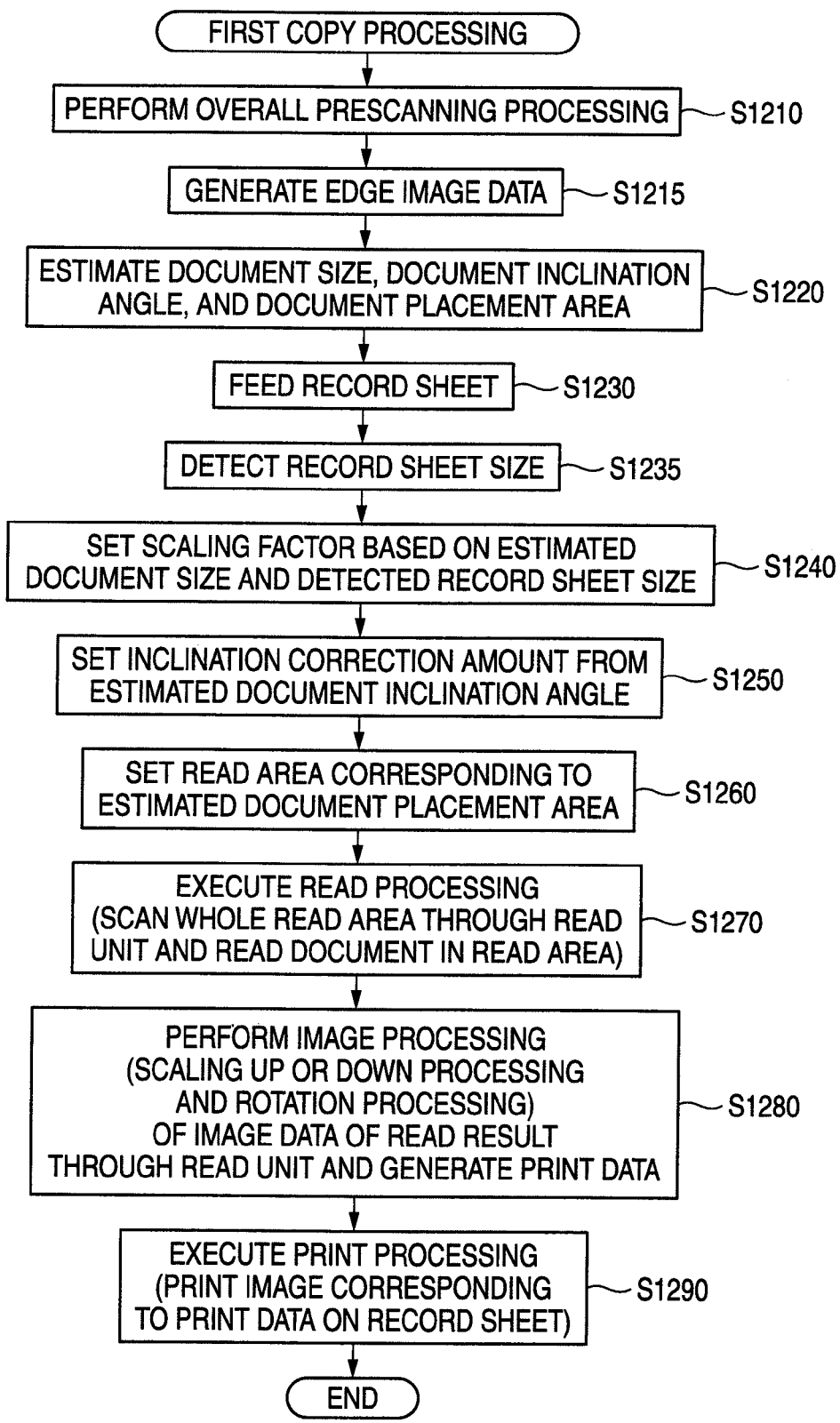
FIG. 17A is a flowchart to represent first copy processing executed by a CPU.

Subsequently, the first copy processing executed at S1120 by the CPU 70 will be discussed. FIG. 17A is a flowchart to represent the first copy processing executed by the CPU 70.

When starting the first copy processing, the CPU 70 sets the document read start position to the lower end (Y=0) of the readable area R0 and the document read termination position to the upper end (Y=YMAX) of the readable area R0, thereby setting the whole readable area R0 to the read area, and causes tire image read unit 10 to execute the prescanning operation through the read control unit 20 (S1210; Overall prescanning processing).

As the prescanning direction, the image read unit 10 executes the operation of conveying the read unit 15 in the subscanning direction at speed corresponding to tire resolution for prescanning from one end to the other of the setup read area, causing the read unit 15 to read an image of the read area, and records low-resolution image data as the prescanning result (which will be hereinafter referred to as "prescan image data") in the RAM 80 through the read control unit 20.

After S1210, the CPU 70 executes edge detection processing for the prescan image data recorded in the RAM 80 and generates edge image data corresponding to the image data (S1215). That is, the CPU 70 passes the prescan image data recorded in the RAM 80 through an image filter for edge detection (such as differential filter) and generates edge image data representing an edge image corresponding to the image data.

Then, the CPU 70 analyzes the generated edge image data and estimates the size (height×width) of the document placed on the document table 11a, an inclination angle θ of the document, and the placement area of the document on tire document table 11a (S1220). Here, it is assumed that the angle of the lower side of the document with respect to the X axis is the inclination angle θ of the document (see FIG. 8).

After S1220, the CPU 70 causes the print unit 30 to execute the sheet feed operation through the print control unit 40 (S1230) and also detects tire size of the fed record sheet (S1235). Further, the CPU 70 sets the scaling factor according to a predetermined calculation expression (specifically, so that the copy image of the document is printed so as to spread to the margin of the record sheet to a maximum extent) based on the document size estimated at S1220 and the record sheet size detected at S1235 (S1240).

In addition, the CPU 70 sets the inclination correction amount of the image data from the document inclination angle θ estimated at S1220 (S1250). Specifically, the CPU 70 sets the inclination correction amount so that the copy image of the document is printed on the record sheet straightly without any inclination. However, if the estimated document inclination angle θ is a minute amount (in the third exemplary embodiment, −0.5 degrees≦θ≦0.5 degrees), an error is also considered and the inclination correction amount is set to zero.

After S1250, the CPU 70 sets the document read start position and the document read termination position based on information of the document placement area estimated at S1220, and makes the read area defined by the document read start position and the document read termination position correspond to the placement area of the document on the document table 11a (S1260).

Specifically, to enable the read unit 15 to read the whole placement area of the document, the document read start position is set to the position corresponding to the end point of the document at the lowest position in the subscanning direction and the document read termination position is set to the position corresponding to the end point of the document at the uppermost position in the subscanning direction so that the read area is made to correspond to the placement area of the document on the document table 11a.

After S1260, the CPU 70 controls the image read unit 10 through the read control unit 20, thereby causing the image read unit 10 to convey the read unit 15 in the subscanning direction from the document read start position to the document read termination position and while the read unit 15 is conveyed, causing the read unit 15 to execute the read operation for each line so as to read an image of the setup read area and record the image data representing the read result of the read area in the RAM 80 (S1270).

Then, the CPU 70 performs scaling up or down processing of the image data representing the read result recorded in the RAM 80 according to the preset scaling factor, performs rotation processing of the image data as much as the preset inclination correction amount, converts the image data representing the read result into image data for print, and sets the provided image data in print data (S1280). However, if the inclination correction amount is set to zero, the rotation processing is skipped at S1280.

After S1280, the CPU 70 executes print processing about the print data (S1290). That is, the CPU 70 causes the print unit 30 to print an image based on the print data on the fed record sheet through the print control unit 40. Then, the copy control processing is completed.

Figure 17B:
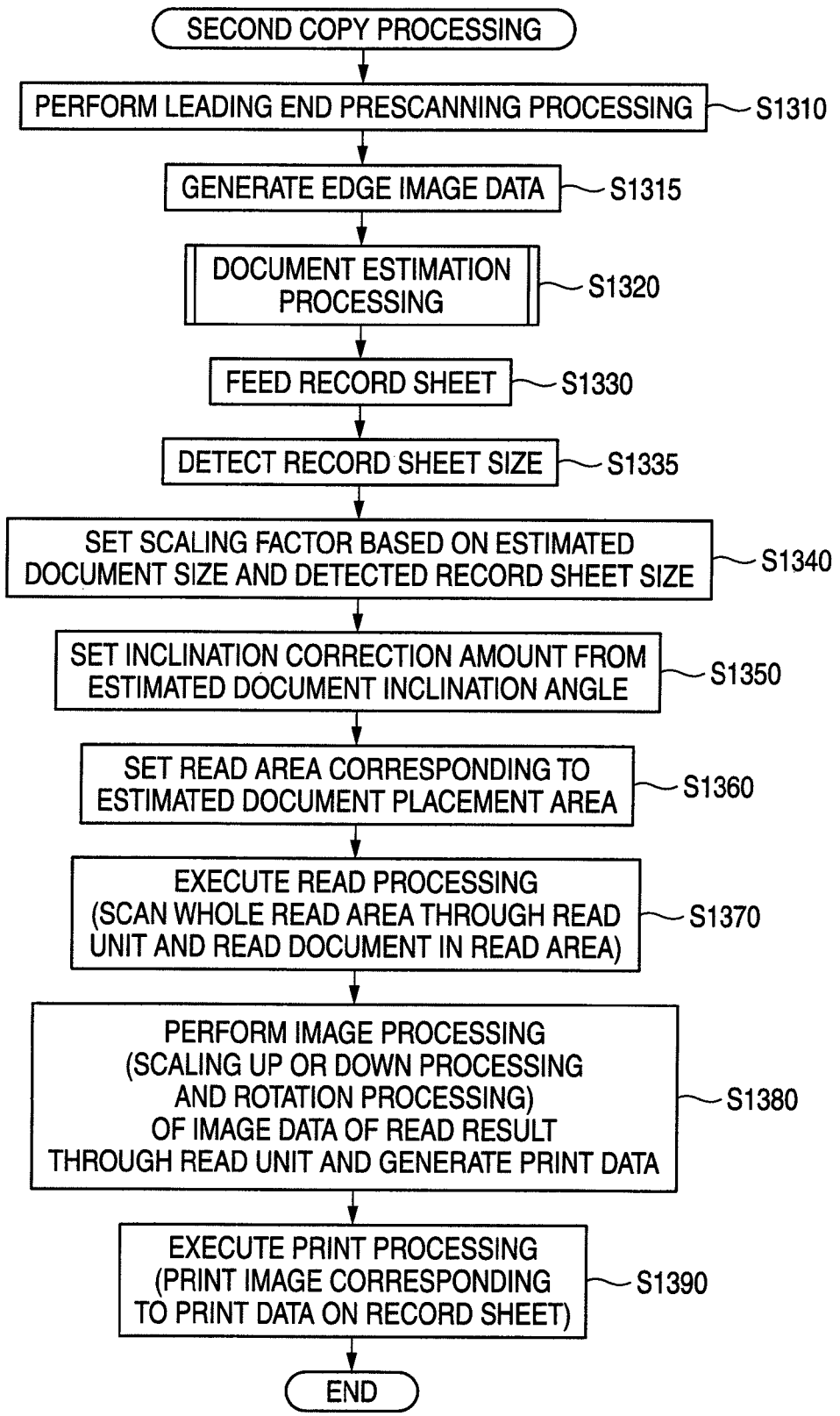
FIG. 17B is a flowchart to represent second copy processing.

Subsequently, the second copy processing executed at S1140 by the CPU 70 will be discussed. FIG. 17B is a flowchart to represent the first copy processing executed by the CPU 70.

When starting the second copy processing, the CPU 70 sets the document read start position to the lower end (Y=0) of the readable area R0 and the document read termination position to a position (Y=YPRE) at a predetermined distance from the lower end of the readable area R0 predetermined at the design stage, thereby setting a part of the readable area R0 to the read area, and causes the image read unit 10 to execute the prescanning operation through the read control unit 20 (S1310: Leading end prescanning processing).

Figure 18:
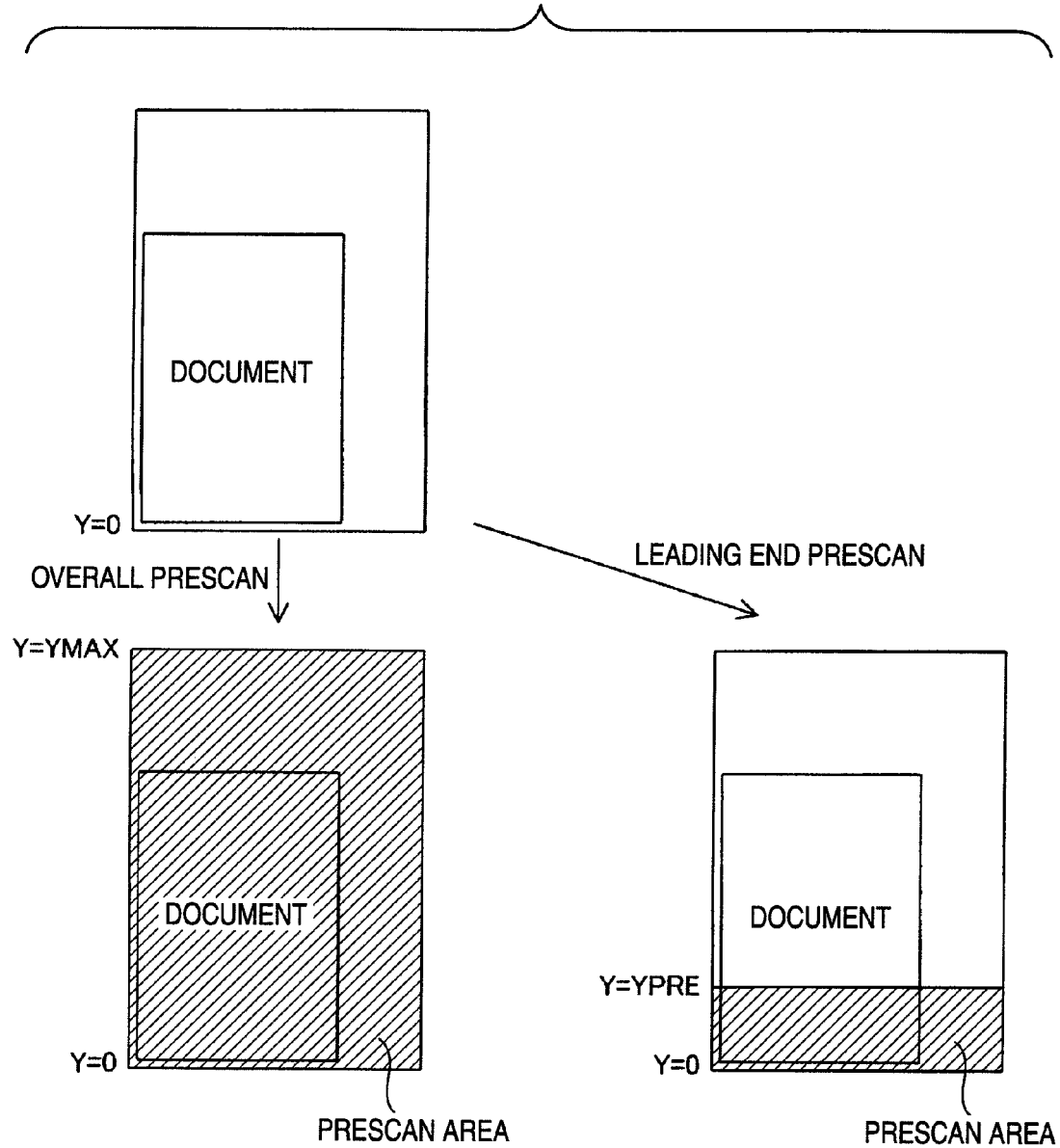
FIG. 18 is a schematic representation to represent a read area of whole prescanning processing and a read area of leading end prescanning processing.

FIG. 18 is a schematic representation to represent the difference between the read area of the overall prescanning processing executed in the first copy processing and the read area of the leading end prescanning processing executed in the second copy processing. As shown in FIG. 18, in the second copy processing, the image read unit 10 is caused to execute the prescanning operation from the lower end of the readable area R0 to a point at a predetermined distance from the lower end of the readable area R0 to tire inside of the readable area R0 (in the third exemplary embodiment, to a point at a distance of 30 mm from the lower end of the readable area R0) rather than caused to execute the prescanning operation over the whole readable area R0 as in the first copy processing.

When thus completing the processing at S1310, the CPU 70 executes edge detection processing for the prescan image data (prescanning result) recorded in the RAM 80 and generates edge image data corresponding to the image data (S1315). That is, the CPU 70 passes the prescan image data recorded in the RAM 80 through an image filter for edge detection (such as differential filter) and converts the image data into edge image data.

Figure 19:
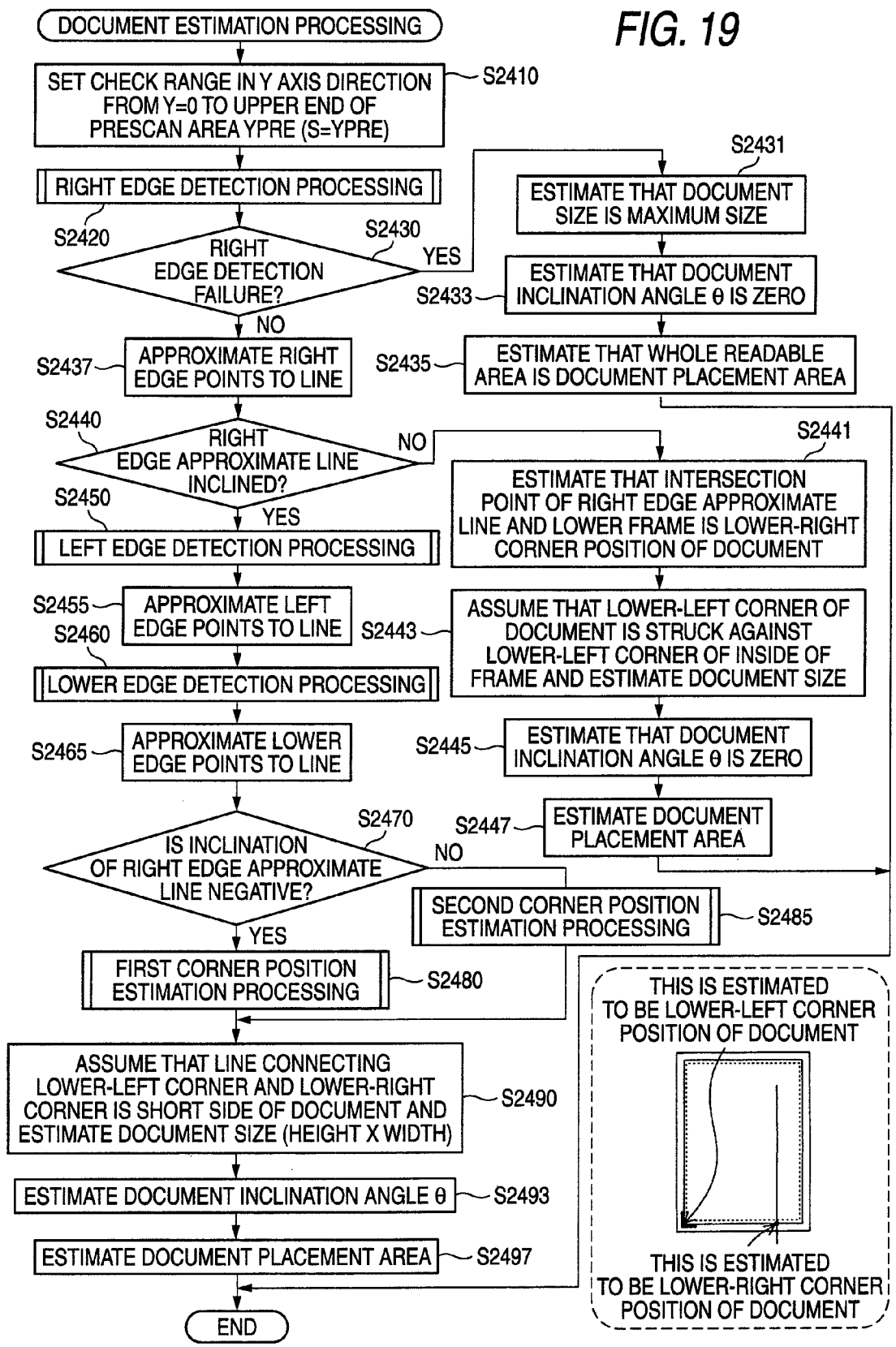
FIG. 19 is a flowchart to represent document estimation processing in the third exemplary embodiment of the invention, executed by the CPU.

Then, the CPU 70 sets the edge image data generated at S1315 to check target data and executes document estimation processing shown in FIG. 19 at S1320. Accordingly, the CPU 70 analyzes the edge image data and estimates the size (height×width) of the document placed on the document table 11a, the inclination angle θ of the document, and the placement area of the document on the document table 11a. Specifically, assuming that the document placed on the document table 11a is a quadrangular blank form with a given aspect ratio, the CPU 70 detects an edge of the document placed on the document table 11a, estimates the lower-left corner position and the lower-right corner position of the document from the detection result, and estimates the size of the document placed on the document table 11*a*, the inclination angle θ of the document, the placement area of the document tabled on the estimation result (described later in detail).

When exiting the processing at S1320, the CPU 70 executes S1330 to S1390 like S1230 to S1290.

However, at S1340, the CPU 70 sets the scaling factor to the scaling factor corresponding to the ratio between the document size and the record sheet size (for example, record sheet short side length÷document short side length) according to a predetermined calculation expression so that a copy image of the document is printed on the record sheet as it is scaled up according to the scaling factor corresponding to the ratio between the document size and the record sheet size (or is scaled down if the scaling factor is less titan 1) in the subsequent processing.

At S1350, the CPU 70 sets the inclination correction amount of the image data of the read result so that the copy image of the document is printed on the record sheet straightly from the document inclination angle θ estimated at S1320. At S1360, the CPU 70 sets the document read start position and the document read termination position based on information of the document placement area estimated at S1320, and makes the read area defined by the document read start position and the document read termination position correspond to the placement area of the document on the document table 11*a*.

Thus, in the second copy processing, the document size, the document inclination angle, and the document placement area are estimated based on the prescanning result of the partial area in the readable area R0 and from the result, the read area at the scanning time (S1370 executing time) is determined and the scaling factor and the inclination correction amount are also determined and the copy image of the document is printed on the record sheet in the size corresponding to the record sheet size.

Subsequently, the document estimation processing executed at S1320 by the CPU 70 will be discussed with FIG. 19. FIG. 19 is a flowchart to represent the document estimation processing executed by the CPU 70.

When starting the document estimation processing, the CPU 70 sets a variable S in YPER of the Y coordinate of the upper end of the prescan area described above (S=YPRE), thereby setting the check range in the Y axis direction from Y=0 to Y=S=YPRE (S2410). Then, the CPU 70 goes to S2420 and executes right edge detection processing shown in FIG. 6 in the same way as the first exemplary embodiment.

When thus exiting the right edge detection processing, the CPU 70 returns to the document estimation processing and goes to S2430 and determines whether or not the right edge detection results in failure in the immediately preceding right edge detection processing. Specifically, if there is no coordinate data registered as the document right edge data in tire immediately preceding right edge detection processing, the CPU 70 determines that the right edge detection results in failure; if there is coordinate data registered as the document right edge data, the CPU 70 determines that the right edge detection results in success.

However, exceptionally, if the coordinate data registered as the document right edge data exists in the proximity of the left end (Y=0) of the readable area R0, it may be assumed that the coordinate data of the left edge (edge points representing the left end of the document) is erroneously registered as the document right edge data and even if there is coordinate data registered as the document right edge data, it may be determined that the right edge detection results in failure.

As the case where the right edge detection results in failure, the case where the document size is larger than the Size of the document table 11*a* and the right end of the document protrudes from the document table 11*a* or the like can be named.

If the CPU 70 determines that the right edge detection results in failure (YES at S2430), the CPU 70 goes to S2431 and estimates that the size (height×width) of the document placed on the document table 11*a* is the maximum size (the size corresponding to the readable area R0) of the document that can be placed on the document table 11*a* (S2431), estimates that the inclination angle θ of the document is zero (θ=0) (S2433), and estimates that the whole readable area R0 is the placement area of the document (S2435). After S2435, the CPU 70 exits the document estimation processing.

In contrast, if the CPU 70 determines that the right edge detection results in success (NO at S2430), the CPU 70 goes to S2437 and approximates the points indicated by the document right edge data determined in the right edge detection processing to a line and calculates an approximate line of the points indicated by the document right edge data (which will be hereinafter represented as "right edge approximate line").

Then, the CPU 70 goes to S2440 and determines whether or not the right edge approximate line is inclined larger than a predetermined angle with respect to the Y axis. In the third exemplary embodiment, specifically, the CPU 70 determines whether or not the right edge approximate line is inclined larger than 0.5 degrees with respect to the Y axis.

If the CPU 70 determines that the inclination of the right edge approximate line is equal to or less than the predetermined angle (NO at S2440), the CPU 70 assumes that the document is struck against the lower-left corner of the inside of the frame 13*a* and is placed correctly on the document table 11*a*, and estimates that the intersection point of the right edge approximate line and the lower end margin of the document table 11*a* (in other words, the inside of the lower side of the frame 13*a* (which will be hereinafter represented as "lower frame")) is the lower-right corner position of the document (S2441), as shown at the right of FIG. 19.

After S441, the CPU 70 assumes that the lower-left corner position of the document is the point of the lower-left corner of the document table 11*a* (in other words, the lower-left corner of the inside of the frame 13*a*), and estimates the document size. Specifically, assuming that the document placed on the document table 11*a* is a rectangular blank form, the CPU 70 estimates that the length from the lower-left corner position of the document to the lower-right corner position of the document estimated at S2441 is the short side length (width) of the document and estimates that √2 times the short side length is the long side length (height) of the document (S2443). The reason why it is estimated that √2 times the short side length of the document is the long side length of the document is that the ratio of the short side length of the blank form: the long side length is 1:√2.

After S2443, the CPU 70 goes to S2445 and estimates that the inclination angle θ of tire document placed on the document table 11*a* is zero (in other words, estimates that the document is not inclined) and derives the coordinates of the positions of the upper-left corner and the upper-right corner of the document from the relationship among the lower-left corner position, the estimated lower-right corner position, the document size, and the document inclination angle θ. Accordingly, the CPU 70 estimates that the sides of a quadrangle formed by connecting the four concerns are the outer margin of the document and estimates that the area surrounded by the outer margin is the placement area of the document (S2447).

That is, if the lower-left corner of the document is struck against the lower-left corner of the inside of the frame 13*a* and in this state, the long side of the document of the estimated size is placed in parallel with the Y axis and the short side of the document is placed in parallel with the X axis, it is estimated that the area where the document covers the read glass 11 is the placement area of the document (S2447). Then, the CPU 70 exits the document estimation processing.

In contrast, if the CPU 70 determines that the right edge approximate line is inclined larger than the predetermined angle with respect to the Y axis (YES at S2440), the CPU 70 goes to S2450 and executes left edge detection processing shown in FIG. 10 in the same way as the first exemplary embodiment.

When thus exiting the left edge detection processing, the CPU 70 returns to the document estimation processing and goes to S2455 and approximates the points indicated by the document left edge data determined in the left edge detection processing to a line and calculates an approximate line of the points indicated by the document left edge data (which will be hereinafter represented as "left edge approximate line"). Then, the CPU 70 goes to S2460.

However, if there is no coordinate data registered as the document left edge data in the immediately preceding left edge detection processing, the CPU 70 determines that the left edge detection results in failure and goes to S2460 without calculating the left edge approximate line. In addition, if all or a part of the coordinate data registered as the document left edge data is also registered as the document right edge data, it may be assumed that the coordinate data of the right edge (edge points representing the right end of the document) is erroneously registered as the document left edge data and even if there is coordinate data registered as the document left edge data, it may be determined that the left edge detection results in failure and the CPU 70 may go to S2460 without calculating the left edge approximate line.

At S2460, the CPU 70 executes lower edge detection processing shown in FIG. 11 in the same way as the first exemplary embodiment.

When thus exiting the lower edge detection processing, the CPU 70 returns to the document estimation processing and goes to S2465 and approximates the points indicated by the document lower edge data determined in the lower edge detection processing to a line and calculates an approximate line of the points indicated by the document lower edge data (which will be hereinafter represented as "lower edge approximate line"). Then, the CPU 70 goes to S2470. However, if there is no coordinate data registered as the document lower edge data in the immediately preceding lower edge detection processing, the CPU 70 determines that the lower edge detection results in failure and goes to S2470 without calculating the lower edge approximate line.

At S2470, the CPU 70 determines whether or not inclination A of right edge approximate line $Y = A \cdot X + B$ is negative ($A < 0$). If the CPU 70 determines that the inclination A of the right edge approximate line is negative (YES at S2470), the CPU 70 executes first corner position estimation processing shown in FIG. 12 (S2480); if the CPU 70 determines that the inclination A of the right edge approximate line is not negative (NO at S2470), the CPU 70 executes second corner position estimation processing shown in FIG. 15 (S2485).

Figure 20:
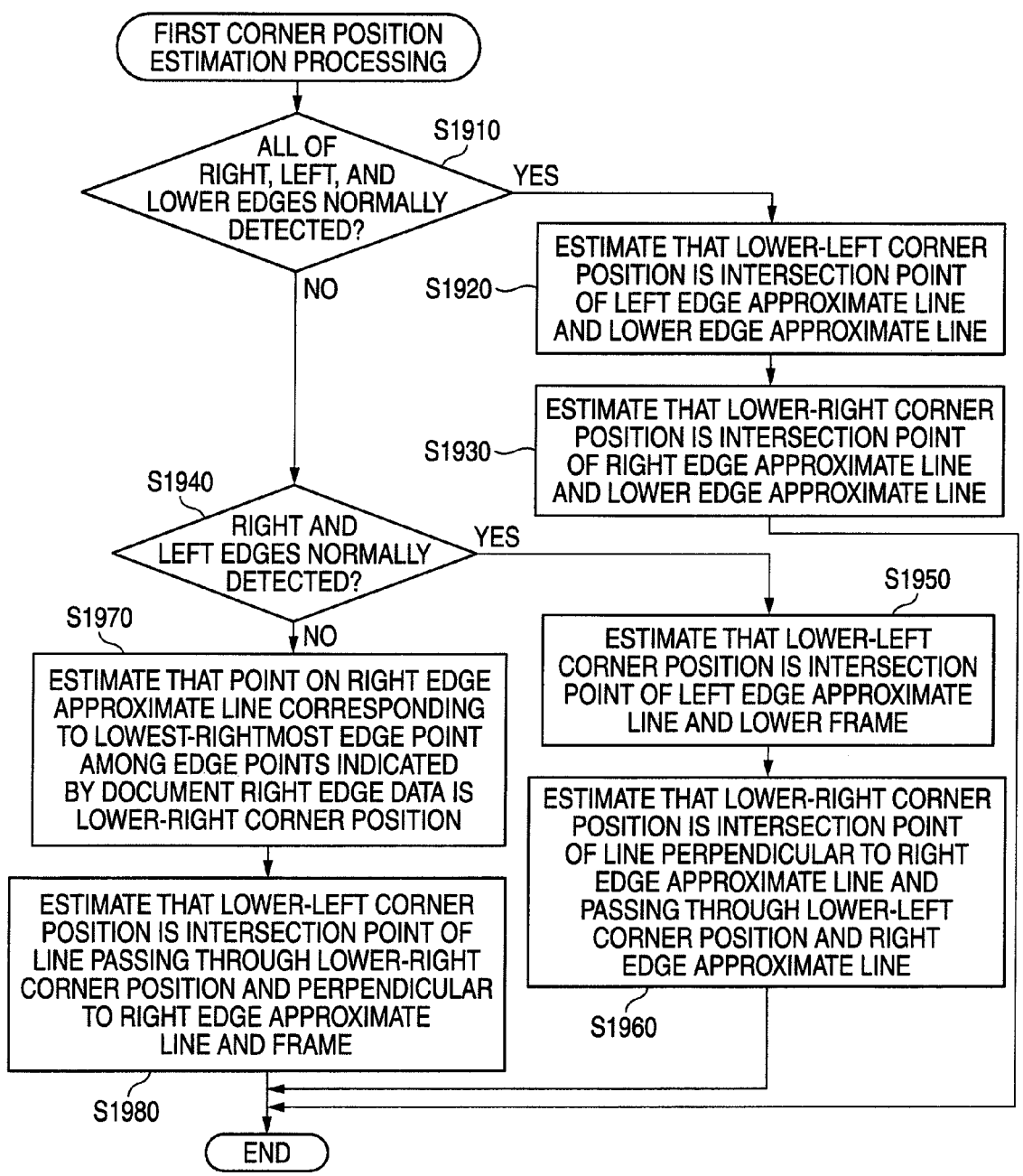
FIG. 20 is a flowchart to represent first corner position estimation processing executed by the CPU.

FIG. 20 is a flowchart to represent the first corner position estimation processing executed by the CPU 70. When starting the first corner position estimation processing at S2480, the CPU 70 determines whether all of the right edge, the left edge, and the lower edge have been normally detected at S2420, S2450, and S2460 (S1910).

Specifically, if detection of any of the right edge, the left edge, or the lower edge results in failure, the determination at S1910 is NO. Even if detection of all of the right edge, the left edge, and the lower edge results in success, if the right edge approximate line and the lower edge approximate line which should be orthogonal to each other are not orthogonal to each other, it is determined that all of the right edge, the left edge, and the lower edge are not normally detected.

Likewise, if the right edge approximate line and the left edge approximate line which should be parallel to each other are not parallel to each other, it is also determined that all of the right edge, the left edge, and the lower edge are not normally detected. Otherwise, the determination at S1910 is YES.

When the CPU 70 executes S1910 according to the determination technique and determines that all of the right edge, the left edge, and the lower edge are normally detected (YES at S1910), the CPU 70 estimates that the lower-left corner position of the document is the intersection point of the left edge approximate line and the lower edge approximate line and calculates the coordinate value of the position (S1920) and further estimates that the lower-right corner position of the document is the intersection point of the right edge approximate line and the lower edge approximate line and calculates the coordinate value of the position (S1930). Then, the CPU 70 exits the first corner position estimation processing. FIG. 12 is a schematic representation to show an estimation method of a document lower-left corner position Ka and a document lower-right corner position Kb when the determination at S1910 is YES. In the figure, an open circle represents an edge point and filled circles represent the corner positions Ka and Kb.

In contrast, if the CPU 70 determines that all of the right edge, the left edge, and the lower edge are not normally detected (NO at S1910), the CPU 70 goes to S1940 and determines whether or not both of the right edge and the left edge are normally detected.

Specifically, if detection of the right edge or the left edge results in failure, the determination at S1940 is NO. Even if detection of the right edge and the left edge results in success, if the right edge approximate line and the left edge approximate line which should be parallel to each other are not parallel to each other, it is also determined that both of the right edge and the left edge are not normally detected, Otherwise, the determination at S1940 is YES.

When the CPU 70 executes S1940 according to the determination technique and determines that both of the right edge and the left edge are normally detected (YES at S1940), the CPU 70 goes to S1950 and estimates that the lower-left corner position of the document is the intersection point of the left edge approximate line and the lower end margin of the document table 11*a* (namely, the inside of the lower frame) and calculates the coordinate value of the position. Then, the CPU 70 estimates that the lower-right corner position of the document is the intersection point of a line perpendicular to the right edge approximate line and passing through the estimated lower-left corner position and the right edge approximate line and calculates the coordinate value of the position (S1960).

Figure 21A:
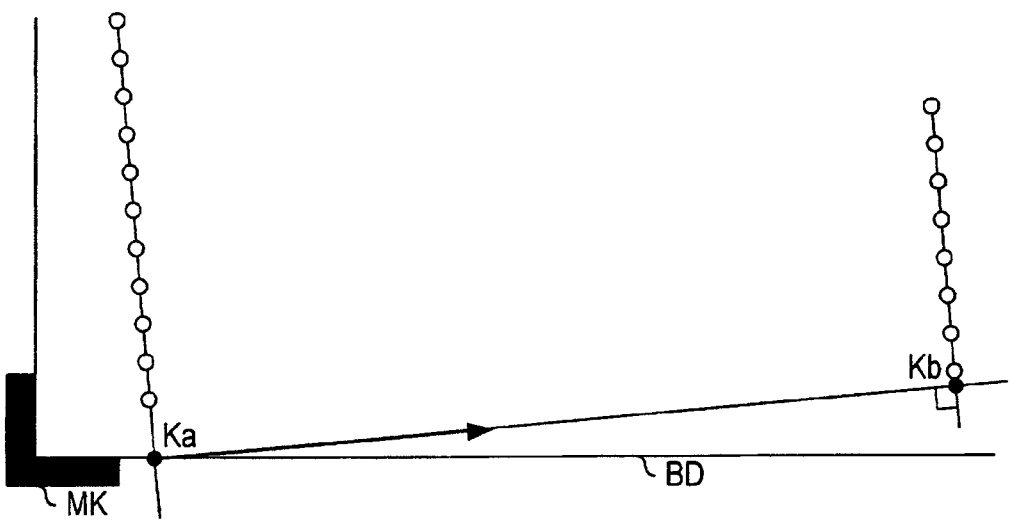
FIGS. 21A and 21B are schematic representations each to show an estimation method of the document lower-left corner position and the document lower-right corner position.

FIG. 21A is a schematic representation to show an estimation method of the document lower-left corner position Ka and the document lower-right corner position Kb when the determination at S1940 is YES. The reason why it is estimated at S1950 that the lower-left corner position of tire document is the intersection point of the left edge approximate line and the lower end margin of the document table 11*a* (namely, the inside of the lower frame) is that if the document is inclined to the left, the possibility that the lower-left corner of the document may strike against a step on the boundary between the lower end margin of the document table 11*a* and the inside of the lower frame is high. From such a reason, in the exemplary embodiment, when the lower edge cannot normally be detected, the lower-left corner position of the document is estimated by assuming that tire lower-left corner of the document strikes against the step on the boundary between the lower end margin of the document table 11*a* and the inside of the lower frame.

When thus completing the processing at S1960, the CPU 70 exits the first corner position estimation processing.

In contrast, if the CPU 70 determines at S1940 that both of the right edge and the left edge are not normally detected (NO at S1940), the CPU 70 goes to S1970 and estimates that the point on the right edge approximate line corresponding to the lowest-rightmost edge point on the document table 11*a* among the edge points indicated by the document right edge data is the lower-right corner position of the document, and calculates the coordinate value of the position. At S1970, the intersection point at which a line orthogonal to the right edge approximate line extended from the edge point indicated by the document right edge data to the right edge approximate line crosses the right edge approximate line, the intersection point of the rightmost edge point on the right edge approximate line may be handled as "the point on the right edge approximate line corresponding to the lowest-rightmost edge point."

After S1970, the CPU 70 estimates that the lower-left corner position of the document is the intersection point of a line passing through the estimated lower-right corner position and perpendicular to the right edge approximate line and the end margin of the document table 11*a* (the inside of the frame) and calculates the coordinate value of the position (S1980). Then, the CPU 70 exits the first corner position estimation processing.

Figure 21B:
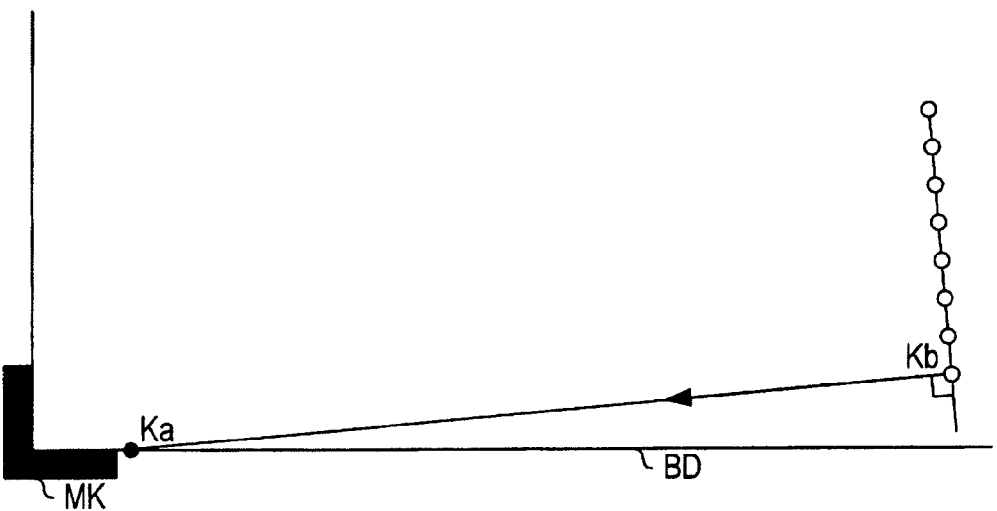

FIG. 21B is a schematic representation to show an estimation method of the document lower-left corner position Ka and the document lower-right corner position Kb when the determination at S1940 is NO. The reason why the lower-left corner position and the lower-right corner position of the document are estimated using the document right edge data at S1970 and S1980 is that the document strike position is set in the lower-left corner of the inside of the frame 13*a* and an unreadable area exists in the proximity of the end margin of the document table 11*a* and thus the right edge can be detected most correctly among the right edge, the left edge, and the lower edge and the most likely data that can be trusted most among the document right edge data, the document left edge data, and the document lower edge data is the document right edge data. From such a reason, in the third exemplary embodiment, the document right edge data is most trusted and the document size and the document inclination angle δ are estimated based on the document right edge data and the right edge approximate line.

Figure 22:
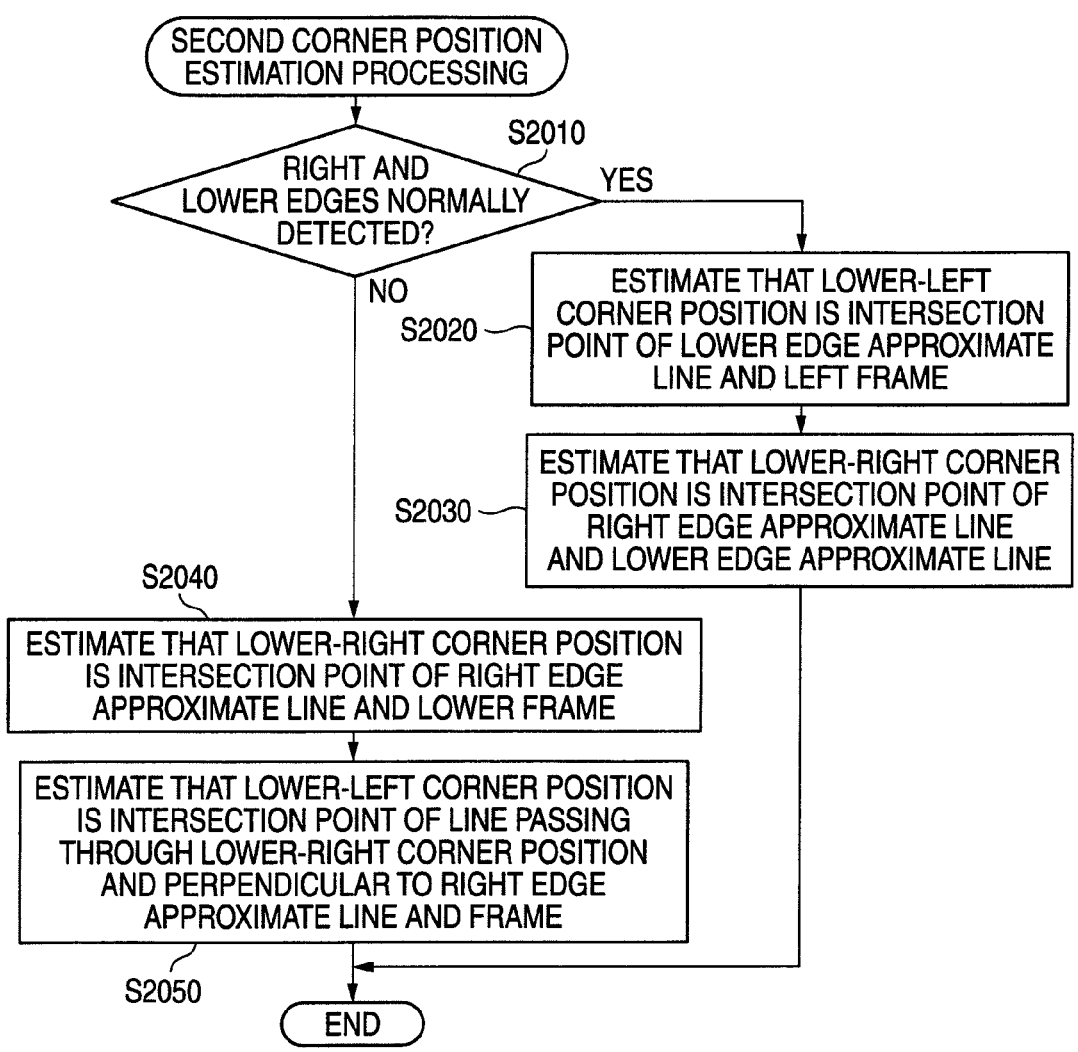
FIG. 22 is a flowchart to represent second corner position estimation processing executed by the CPU.

Subsequently, the second corner position estimation processing executed at S2485 by the CPU 70 will be discussed. FIG. 22 is a flowchart to represent the second corner position estimation processing executed by the CPU 70. When starting the second corner position estimation processing, first the CPU 70 determines whether or not both of the right edge and the tower edge have been normally detected at S2420 and S2460 (S2010).

Specifically, if detection of the right edge or the lower edge results in failure, the determination at S2010 is NO. Even if detection of both of the right edge and the lower edge results in success, if the right edge approximate line and the lower edge approximate line which should be orthogonal to each other are not orthogonal to each other, it is determined that both of the right edge and the lower edge are not normally detected. Otherwise, the determination at S2010 is YES.

Figure 23A:
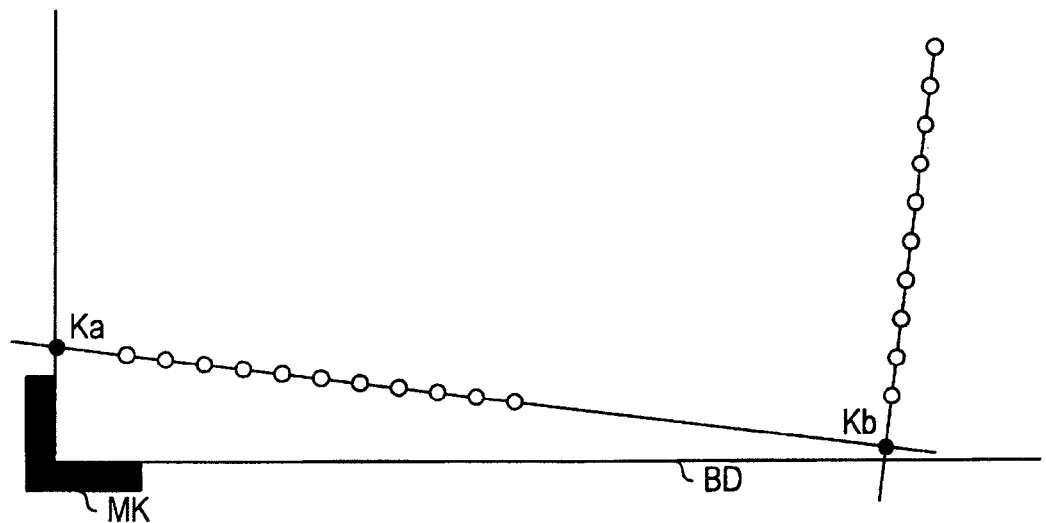
FIGS. 23A and 23B are schematic representations each to show an estimation method of the document lower-left corner position and the document lower-right corner position.

In the second corner position estimation processing, the lower-left corner position and the lower-right corner position of the document are estimated without using the detection result of the left edge. The reason why the corner positions of the document are estimated according to the technique is as follows: If the document is inclined to the right, the possibility that the right end of the document may fit in a sufficient length in the prescan area as shown in FIG. 23A is high and the likelihood or accuracy of the document right edge data is very high; while, the possibility that the left end of the document may not fit in a sufficient length in the prescan area is high and the likelihood or accuracy of the document left edge data is low as compared with that of the document right edge data or the document lower edge data.

When the CPU 70 executes S2010 according to the determination technique and determines that both of the right edge and the lower edge are normally detected (YES at S2010), the CPU 70 estimates that the lower-left corner position of the document is the intersection point of the lower edge approximate line and the left end margin of the document table 11*a* (the inside of the frame) and calculates the coordinate value of the position (S2020) and further estimates that the lower-right corner position of the document is the intersection point of the right edge approximate line and the lower edge approximate line and calculates the coordinate value of the position (S2030). Then, the CPU 70 exits tire second corner position estimation processing. FIG. 23A is a schematic representation to show an estimation method of the document lower-left corner position Ka and the document lower-right corner position Kb when the determination at S2010 is YES.

In contrast, if the CPU 70 determines that both of the right edge and the lower edge are not normally detected (NO at S2010), the CPU 70 goes to S2040 and estimates that the lower-right corner position of the document is the intersection point of the right edge approximate line and the lower end margin of the document table 11*a* (the inside of the lower frame) and calculates the coordinate value of the position. Then, the CPU 70 estimates that the lower-left corner position of the document is the intersection point of a line passing through the estimated lower-right corner position and perpendicular to the right edge approximate line and the end margin of the document table 11*a* (the inside of the frame) and calculates the coordinate value of the position (S2050). Then, the CPU 70 exits the second corner position estimation processing.

Figure 23B:
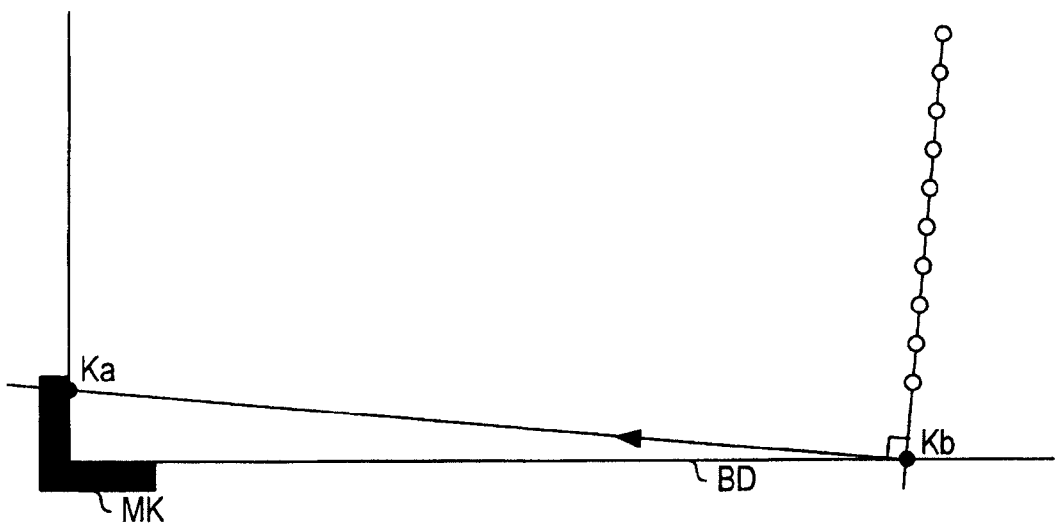

FIG. 23B is a schematic representation to show an estimation method of the document lower-left corner position Ka and the document lower-right corner position Kb when the determination at S2010 is NO. If the document is inclined to the right, the possibility that the lower-right corner of the document may strike against the step on the boundary BD between the lower end margin of the document table 11*a* and the inside of the lower frame is high. Thus, in the third exemplary embodiment, when the lower edge cannot normally be detected, the lower-right corner position of the document is estimated by assuming that the lower-right corner of the document strikes against the step on the boundary BD between the lower end margin of the document table 11*a* and the inside of the lower frame.

When thus exiting the first or second corner position estimation processing (S2480, S2485), the CPU 70 returns to the document estimation processing and goes to S2490 and estimates the document size based on information of the corner position estimated at S2480 or S2485. That is, assuming that the document placed on the document table 11*a* is a rectangular blank form, the CPU 70 estimates that the length from the lower-left corner position of the document to the lower-right corner position of the document estimated as described above is tire short side length (width) of the document and estimates that √2 times the short side length is the long side length (height) of the document.

After S490, the CPU 70 estimates the inclination angle θ of the document with the right edge approximate line as the reference. That is, the CPU 70 estimates that the angle of the right edge approximate line with respect to the Y axis is the inclination angle θ of the document (S2493).

Then, the CPU 70 goes to S2497 and estimates the placement area of the document tabled on the information of the corner positions, the document size, and the document inclination angle θ estimated as described above. Specifically, the CPU 70 derives the upper-left corner position and the upper-right corner position of the document from the information of the lower-left corner position, the lower-right corner position, the document inclination angle θ, and the document size estimated as described above, thereby estimating the outer margin of the document and estimating that the area surrounded by the outer margin of the document is the placement area of the document. After S2497, the CPU exits the document estimation processing and returns to the second copy processing and executes S1330 and the later steps.

That is, the CPU 70 sets the scaling factor and the inclination correction amount based on the information of the estimated document size and the estimated document inclination angle θ (S1340 and S1350) and also sets the document read start position and the document read termination position based on the information of the estimated document placement area, thereby setting the read area corresponding to the document placement area (S1360). The CPU 70 conveys the read unit in the read area, reads an image reflected on the read area through the read unit, and performs scaling up or down and rotation processing of the image data recorded in the RAM 80 as the read result in response to the preset scaling factor and inclination correction amount, thereby generating image data for print (S1380). The CPU 70 uses the image data as print data and executes print processing about the print data (S1390), thereby printing a copy image of the document on the record sheet. Then, the CPU 70 exits the second copy processing and returns to the main routine of the copy control processing and then completes the processing corresponding to tire external entered copy command.

The configuration of the multi-function device 1 of the third exemplary embodiment has been described. According to the multi-function device 1, when an "automatic scaling/inclination correction" copy command is entered, a part of the readable area R0 is prescanned and the document state (the document size, the document inclination, and the document placement area) is estimated based on the read result.

Therefore, according to the third exemplary embodiment, when the "automatic scaling/inclination correction" copy command is entered, the prescanning operation can be completed at higher speed than the prescanning technique of the whole readable area R0 as in the "borderless" copy and the document state can be estimated efficiently.

In the third exemplary embodiment, when a "borderless" copy command is entered, the whole readable area R0 is prescanned and the document state is estimated based on the result, because precise estimating of the document state as much as possible is preferred to high speed of processing to appropriately realize the "borderless" copy from the purpose of the copy command.

That is, in the third exemplary embodiment, the operation mode is switched in response to a user's request and if precise state estimation is required, the overall prescanning processing is executed and the document state is estimated; if precise state estimation is not required, the leading end prescanning processing is executed and the document state is estimated, so that harmony between preciseness and rapidity of processing is produced. Therefore, according to the multi-function device 1, the convenience of the user can be more enhanced than was previously possible.

In the third exemplary embodiment, to estimate the document state in the document estimation processing, the state of the document placed on the document table 11a is estimated by assuming that the document P placed on the document table 11a is a blank form. Therefore, if a blank form is placed on the document table 11a, the document size, tire document inclination, and the document placement area can be precisely estimated simply by prescanning a part of tire readable area R0, and the read area, the scaling factor, and the inclination correction amount can be appropriately set based on the estimation result and an appropriate copy image can be printed on a record sheet.

Specifically, in the third exemplary embodiment, the prescan image data provided by performing the leading end prescanning processing is converted into edge image data, the edge points corresponding to the right edge, the left edge, and the lower edge are extracted from the edge image data, and the corner positions of tire document are estimated from the approximate lines.

Specifically, in the third exemplary embodiment, when it is considered that the right edge approximate line is inclined and the document is not precisely placed and when it is considered that the likelihood of the right edge approximate line, the left edge approximate line, and the lower edge approximate line is high, the intersection point of the right edge approximate line and the lower edge approximate line is estimated to be the lower-right corner position and the intersection point of the left edge approximate line and the lower edge approximate line is estimated to be the lower-left corner position.

Therefore, according to the third exemplary embodiment, the corner positions of the document can be appropriately estimated and the document state (the size, etc.,) can be estimated if a corner of the document does not appear in the prescanning result as the document is not precisely placed and a corner of the document is broken or is outside the readable area, etc., as well as if the whole image of the document does not appear in the prescan image data.

In the third exemplary embodiment, since the end part of the document table 11a is outside the readable area, if the lower-left corner of the document P is precisely struck against the lower-left corner of the inside of the frame 13a, the left edge and the lower edge of the document cannot be detected. Therefore, in the third exemplary embodiment, if the document inclination is a minute amount, the document size, etc., is estimated only using the right edge approximate line. If the document inclination is a considerable amount, the left edge and the lower edge may be unable to be precisely detected.

In contrast, in the third exemplary embodiment, since the mark MK allows the user to strike a document as an indication, if the document is inclined, it is hard to consider that the document placement state largely shifts from the correct document placement state. If the document is inclined to the left, the possibility that the lower-left corner of the document may strike against the step on the boundary BD between the document table 11a and the frame 13a is high; if tire document is inclined to the right, the possibility that the lower-right corner of the document may strike against tire step is high.

Thus, in the third exemplary embodiment, when the document is inclined and when the right edge, the left edge, and the lower edge cannot precisely be detected, it is assumed that the detection result of the right edge is most correct; if the document is inclined to the left, it is assumed that the lower-left corner of the document strikes against the step on the boundary between the document table 11a and the frame 13a and if the document is inclined to the right, it is assumed that tire lower-right corner of the document strikes against the Step and the lower-left corner position and the lower-right corner position of the document are estimated.

Therefore, according to the third exemplary embodiment, if the right edge, the left edge, and the lower edge cannot precisely be detected, the document size, the document inclination, and the document placement area can be estimated correctly for the most part.

A partial prescanning unit of the invention is implemented as S1310 executed by the CPU 70 and the processing of the read control unit 20, and a corner estimation unit is implemented as S1315 executed by the CPU 70 and S2410 to S2485 in the document estimation processing (S1320). In addition, a document estimation unit is implemented as S2490 to S2497, and a read area determination unit is implemented as S1360 executed by the CPU 70.

An overall prescanning unit of the invention is implemented as S1210 executed by the CPU 70 and the processing of the read control unit 20, a subdocument estimation unit is implemented as S1215 and S1220, and a switching unit is implemented as S1110 and S1130.

In the exemplary embodiment, the document inclination angle θ is found from the right edge approximate line (S2493). However, at S2493, the angle which the line connecting the lower-left corner and the lower-right corner of the document forms with the X axis may be found as the document inclination angle θ based on the position coordinates of the lower-left corner and the lower-right corner of the document estimated in the first or second corner position estimation processing.

The invention is not limited to the above-described exemplary embodiments and can be embodied in various forms. In the description of the exemplary embodiments, the invention is applied to the digital multi-function device 1 including the contact image sensor as the read unit by way of example, but is not limited to an image reading apparatus including a contact image sensor as a read unit.

What is claimed is:

1. An image reading comprising:
   a document table that is transparent;
   a read unit that reads a document placed on the document table, through the document table, so as to generate image data representing the read image of the document;
   an extraction unit that converts the image data of the read result of the read unit into edge image data representing an edge image and extracts edge points satisfying a predetermined condition as edge points corresponding to a side of the document placed on the document table from the edge image data;
   an outer margin recognition unit that approximates the edge points corresponding to each side of the document extracted by the extraction unit to an approximate line so as to recognize an outer margin of the document; and
   a likelihood evaluation unit that evaluates the likelihood of the outer margin recognized by the outer margin recognition unit based on a distribution of the edge points in a margin side area of the document table, the margin side area being an area outside of the approximate line.

2. The image reading apparatus according to claim 1, wherein the likelihood evaluation unit calculates the amount of the edge points distributed in the margin side area of the document table from the outer margin of the document recognized by the outer margin recognition unit,
   wherein, if the calculated amount of the edge points exceeds a threshold value, the likelihood evaluation unit evaluates the likelihood of the outer margin recognized by the outer margin recognition unit as low, and
   wherein, if tire calculated amount of the edge points is equal to or less than the threshold value, the likelihood evaluation unit evaluates the likelihood of the outer margin as high.

3. The image reading apparatus according to claim 1, further comprising:
   a prescanning unit, which conveys the read unit in a partial area of a readable area of the document table that can be read through the read unit, and which controls the read unit to execute read operation in the partial area,
   wherein the extraction unit is configured to:
      convert the image data of the read result of the read unit into edge image data representing an edge image; and
      extract edge points satisfying a predetermined condition as edge points corresponding to a side of the document placed on the document table from the edge image data.

4. The image reading apparatus according to claim 3,
   wherein the document table has a substantially quadrangular shape, and one specific corner of four corners defined as a position with which a corner of the document is to be matched, and
   wherein the prescanning unit assumes that an area from an end margin of the document table forming one side of the document table extending from the specific corner on the document table to a position at a predetermined distance from the end margin of the document table to the inside of the document table, the area corresponding to the readable area, is the partial area.

5. The image reading apparatus according to claim 1, further comprising:
   a document size estimation unit that estimates the size of the document placed on the document table,
   wherein, if the likelihood evaluation unit evaluates the likelihood as high, the document size estimation unit estimates the size of the document placed on the document table from the outer margin of the document recognized by the outer margin recognition unit, and
   wherein, if the likelihood evaluation unit evaluates the likelihood as low, the document size estimation unit estimates that the size of the document placed on the document table is a predetermined size.

6. The image reading apparatus according to claim 3,
   wherein the extraction unit extracts the edge points corresponding to each of three sides of the document placed on the document table as the side of the document placed on the document table,
   wherein the outer margin recognition unit recognizes that two intersection points of three lines to which the edge points corresponding to the sides extracted by the extraction unit are approximated are corners of the document placed on the document table,
   wherein the image reading apparatus further comprises:
      a document size estimation unit that estimates the size of the document placed on the document table,
      wherein, if the likelihood evaluation unit evaluates the likelihood as high, the document size estimation unit estimates the size of the document placed on the document table based on the distance between the two intersection points recognized as the corners of the document by the outer margin recognition unit on the assumption that the document placed on the document table is a blank form, and wherein, if the likelihood evaluation unit evaluates the likelihood as low, the document size estimation unit estimates that the size of the document placed on the document table is a predetermined size.

7. The image reading apparatus according to claim 4, wherein the extraction unit extracts the edge points corresponding to the side of the document placed on the document table opposed to the side of the document table extending from the specific corner on the document table, wherein the likelihood evaluation unit calculates the occupation amount of the edge points in the area of the edge image data corresponding to the area surrounded by the approximate line of the edge points corresponding to the side of the document placed on the document table opposed to the side of the document table extending from the specific corner on the document table and the outer margin of the document table as the amount of the edge points distributed in the margin side area of the document table from the outer margin of the document recognized by the outer margin recognition unit, wherein, if the calculated amount of the edge points exceeds a threshold value, the likelihood evaluation unit evaluates the likelihood of the outer margin recognized by the outer margin recognition unit as low, and wherein, if the calculated amount of tire edge points is equal to or less than the threshold value, the likelihood evaluation unit evaluates the likelihood of the outer margin as high.

8. The image reading apparatus according to claim 4, further comprising:

a read area determination unit that determines the read area of the read unit based on information of the document size estimated by the document size estimation unit; and a scanning unit, which conveys the read unit in the read area determined by the read area determination unit, and which controls the read unit to execute read operation so as to generate image data representing a read image of the document placed on the document table.

9. An image reading apparatus comprising:

a document table that is transparent and that includes an end margin forming one side of the document table;

a read unit that reads a document placed on the document table, through the document table, so as to generate image data representing the read image of the document;

an extraction unit that converts the image data of the read result of the read unit into edge image data representing an edge image and extracts edge points satisfying a predetermined condition as edge points corresponding to a side of the document placed on the document table from the edge image data;

an outer margin recognition unit that approximates the edge points corresponding to each side of the document extracted by the extraction unit to an approximate line so as to recognize an outer margin of the document; and a likelihood evaluation unit that evaluates the likelihood of the outer margin recognized by the outer margin recognition unit, wherein a specific part of the end margin of the document table is defined as a reference line with which a side of the document is matched, and wherein the likelihood evaluation unit evaluates the likelihood of the outer margin recognized by the outer margin recognition unit based on the position relationship between the approximate line and the reference line.

10. The image reading apparatus according to claim 9, wherein the outer margin recognition unit recognizes the outer margin of the document that is Opposed to the reference line, wherein, if the outer margin of the document recognized by the outer margin recognition unit is at a predetermined distance or longer from the reference line, the likelihood evaluation unit evaluates the likelihood as low, and wherein, if the outer margin of the document recognized by the outer margin recognition unit is not at the predetermined distance or longer from the reference line, the likelihood evaluation unit evaluates the likelihood as high.

11. The image reading apparatus according to claim 10, wherein the document table has a substantially quadrangular shape, and two sides of four sides of tire document table extending in orthogonal directions from a specific corner are defined as the reference lines, wherein the likelihood evaluation unit determines whether or not the outer margin of the document recognized by the outer margin recognition unit is at a predetermined distance or longer from the reference line for each of the two reference lines, wherein, if the likelihood evaluation unit determines that the outer margin of the document recognized by the outer margin recognition unit is at the predetermined distance or longer from neither of the two reference lines, the likelihood evaluation unit evaluates the likelihood as high, and wherein, if the likelihood evaluation unit determines that the outer margin of the document recognized by the outer margin recognition unit is at the predetermined distance or longer from either of the two reference lines, the likelihood evaluation unit evaluates the likelihood as low.

12. The image reading apparatus according to claim 9, further comprising:

a prescanning unit, which conveys tire read unit in a partial area of a readable area of the document table that can be read through the read unit, the readable area belonging to a rectangular area from one side defined as the reference line, of the four sides of the document table made quadrangular to a position at a predetermined distance from the one side to the inside of the document table, and which controls the read unit to execute read operation in the partial area, wherein the extraction unit is configured to:

convert the image data of the read result of the read unit provided by the operation of the prescanning unit into edge image data representing an edge image; and extract edge points satisfying a predetermined condition as edge points corresponding to a side of the document placed on the document table from the edge image data.

13. Tire image reading apparatus according to claim 9, further comprising:

a document size estimation unit that estimates the size of the document placed on the document table, wherein, if the likelihood evaluation unit evaluates the likelihood as high, the document size estimation unit estimates the size of the document placed on the document table from the outer margin of the document recognized by the outer margin recognition unit, and wherein, if the likelihood evaluation unit evaluates the likelihood as low, the document size estimation unit estimates that the size of the document placed on the document table is a predetermined size.

14. The image reading apparatus according to claim 12, wherein tire extraction unit extracts the edge points corresponding to each of three sides of tire document placed on the document table as the side of the document placed on the document table, wherein the outer margin recognition unit recognizes that two intersection points of three lines to which the edge points corresponding to the sides extracted by the extraction unit are approximated are corners of the document placed on the document table, wherein the image reading apparatus further comprises:
a document size estimation unit that estimates the size of the document placed on the document table, wherein, if the likelihood evaluation unit evaluates the likelihood as high, the document size estimation unit estimates the size of the document placed on the document table based on tire distance between the two intersection points recognized as the corners of the document by the outer margin recognition unit on tire assumption that the document placed on the document table is a blank form, and wherein, if the likelihood evaluation unit evaluates the likelihood as low, the document size estimating unit estimates that the size of the document placed on the document table is a predetermined size.

15. The image reading apparatus according to claim 13, further comprising:
a read area determination unit that determines the read area of the read unit based on information of tire document size estimated by the document size estimation unit; and
a scanning unit, which conveys the read unit in the read area determined by the read area determination unit, and which controls the read unit to execute read operation so as to generate image data representing a read image of the document placed on the document table.

* * * * *